(12) United States Patent
Matono et al.

(10) Patent No.: US 7,180,705 B2
(45) Date of Patent: Feb. 20, 2007

(54) THIN FILM MAGNETIC HEAD CAPABLE OF REDUCING EXPANSION AND BENDING OF A RECORDING PATTERN, METHOD OF MANUFACTURING THE SAME AND MAGNETIC RECORDING APPARATUS

(75) Inventors: Naoto Matono, Saku (JP); Shigeru Shoji, Tokyo (JP); Ken-ichi Takano, Tokyo (JP)

(73) Assignees: TDK Corporation, Tokyo (JP); SAE Magnetics (H.K.) Ltd., Hong Kong (CN)

( * ) Notice: Subject to any disclaimer, the term of this patent is extended or adjusted under 35 U.S.C. 154(b) by 488 days.

(21) Appl. No.: 10/405,244

(22) Filed: Apr. 3, 2003

(65) Prior Publication Data

US 2003/0193742 A1    Oct. 16, 2003

(30) Foreign Application Priority Data

Apr. 10, 2002   (JP)   ............................. 2002-108303

(51) Int. Cl.
*G11B 5/147*   (2006.01)

(52) U.S. Cl. ..................................... 360/126
(58) Field of Classification Search ............... 360/125, 360/126
See application file for complete search history.

(56) References Cited

U.S. PATENT DOCUMENTS

| | | | | |
|---|---|---|---|---|
| 4,078,300 A | * | 3/1978 | Lazzari ..................... | 29/603.15 |
| 4,639,810 A | * | 1/1987 | Sakai ......................... | 360/125 |
| 4,768,121 A | * | 8/1988 | Nakashima et al. ........ | 360/125 |
| 4,803,582 A | * | 2/1989 | Sakai ......................... | 360/119 |
| 4,858,048 A | * | 8/1989 | Hayakawa et al. ......... | 360/121 |
| 4,873,599 A | * | 10/1989 | Sueoka ...................... | 360/126 |
| 5,073,836 A | * | 12/1991 | Gill et al. ................... | 360/317 |
| 5,157,570 A | * | 10/1992 | Shukovsky et al. ........ | 360/126 |
| 5,225,953 A | * | 7/1993 | Wada et al. ................ | 360/126 |
| 5,606,478 A | * | 2/1997 | Chen et al. ................. | 360/126 |
| 5,668,689 A | * | 9/1997 | Schultz et al. ............. | 360/317 |
| 5,995,341 A | * | 11/1999 | Tanaka et al. .............. | 360/125 |
| 6,101,068 A | * | 8/2000 | Ohtomo et al. ............ | 360/126 |
| 6,163,442 A | * | 12/2000 | Gill et al. ................... | 360/317 |
| 6,259,583 B1 | * | 7/2001 | Fontana et al. ............ | 360/126 |
| 6,504,675 B1 | * | 1/2003 | Shukh et al. ............... | 360/125 |
| 6,721,131 B2 | * | 4/2004 | Litvinov et al. ............ | 360/125 |
| 6,791,796 B2 | * | 9/2004 | Shukh et al. ............... | 360/126 |
| 6,813,115 B2 | * | 11/2004 | Van der Heijden et al. | 360/125 |

\* cited by examiner

*Primary Examiner*—David Davis
(74) *Attorney, Agent, or Firm*—Oliff & Berridge, PLC

(57) ABSTRACT

Provided is a thin film magnetic head capable of reducing expansion and bending of a recording pattern resulting from a skew so as to improve recording performance. A main pole layer comprises a laminate including a bottom main pole layer being disposed on a medium-incoming side and having a first saturated magnetic flux density and a top main pole layer being disposed on a medium-outgoing side and having a second saturated magnetic flux density larger than the first saturated magnetic flux density. When magnetic flux flows in the main pole layer, magnetic flux saturation occurs in the bottom main pole layer with a smaller saturated magnetic flux density, however, no magnetic flux saturation occurs in the top main pole layer with a larger saturated magnetic flux density, so the magnetic flux flows mainly in the top main pole layer on a priority basis. Writing by the main pole layer is mainly performed by the top main pole layer on the medium-outgoing side, so compared with the case where the main pole layer has a large saturated magnetic flux density as a whole, expansion of the recording pattern resulting from the skew can be reduced.

14 Claims, 33 Drawing Sheets

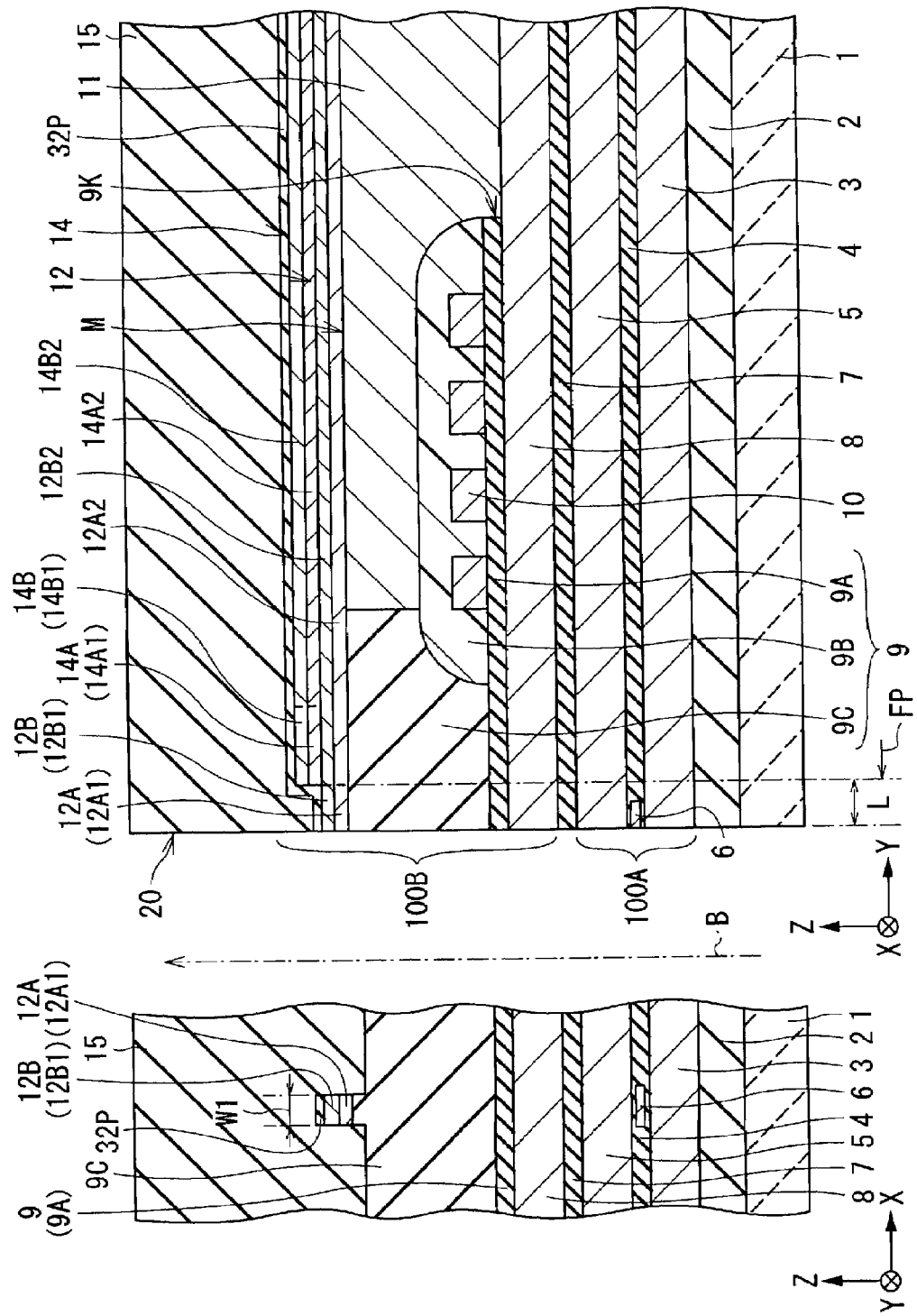

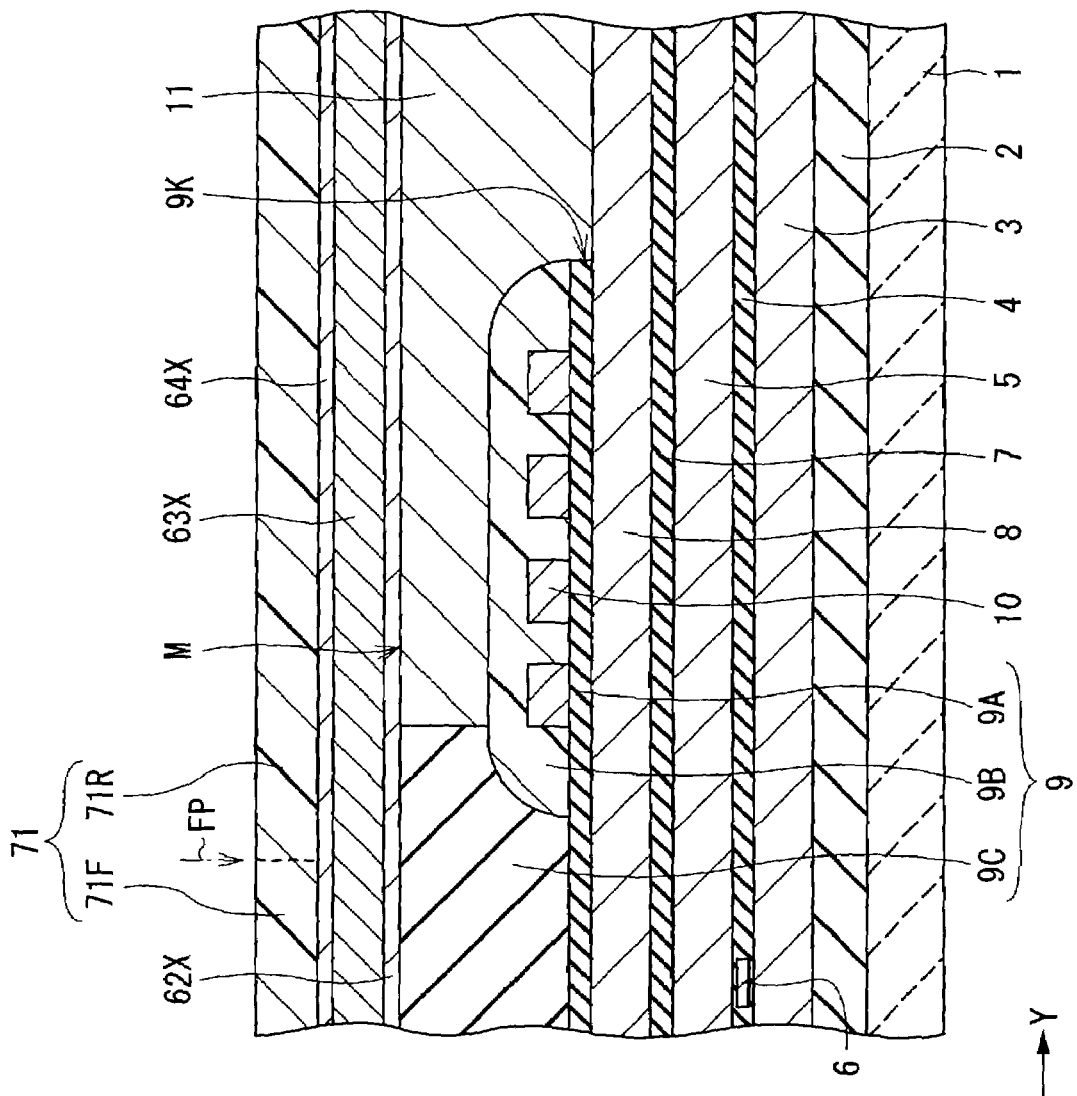
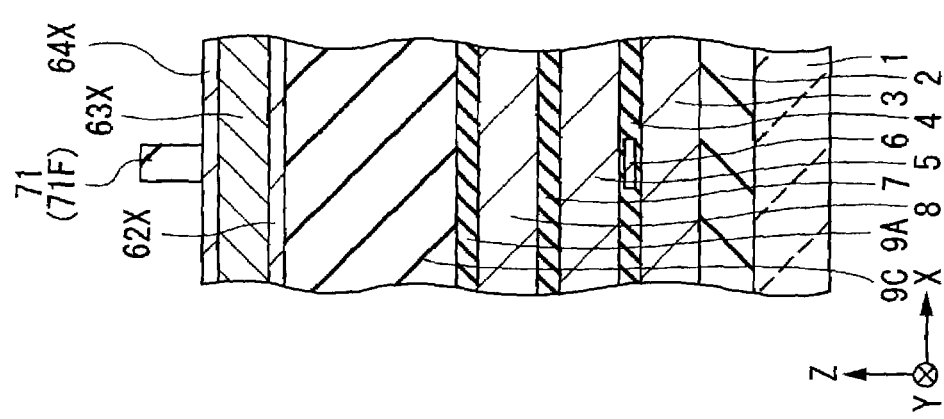

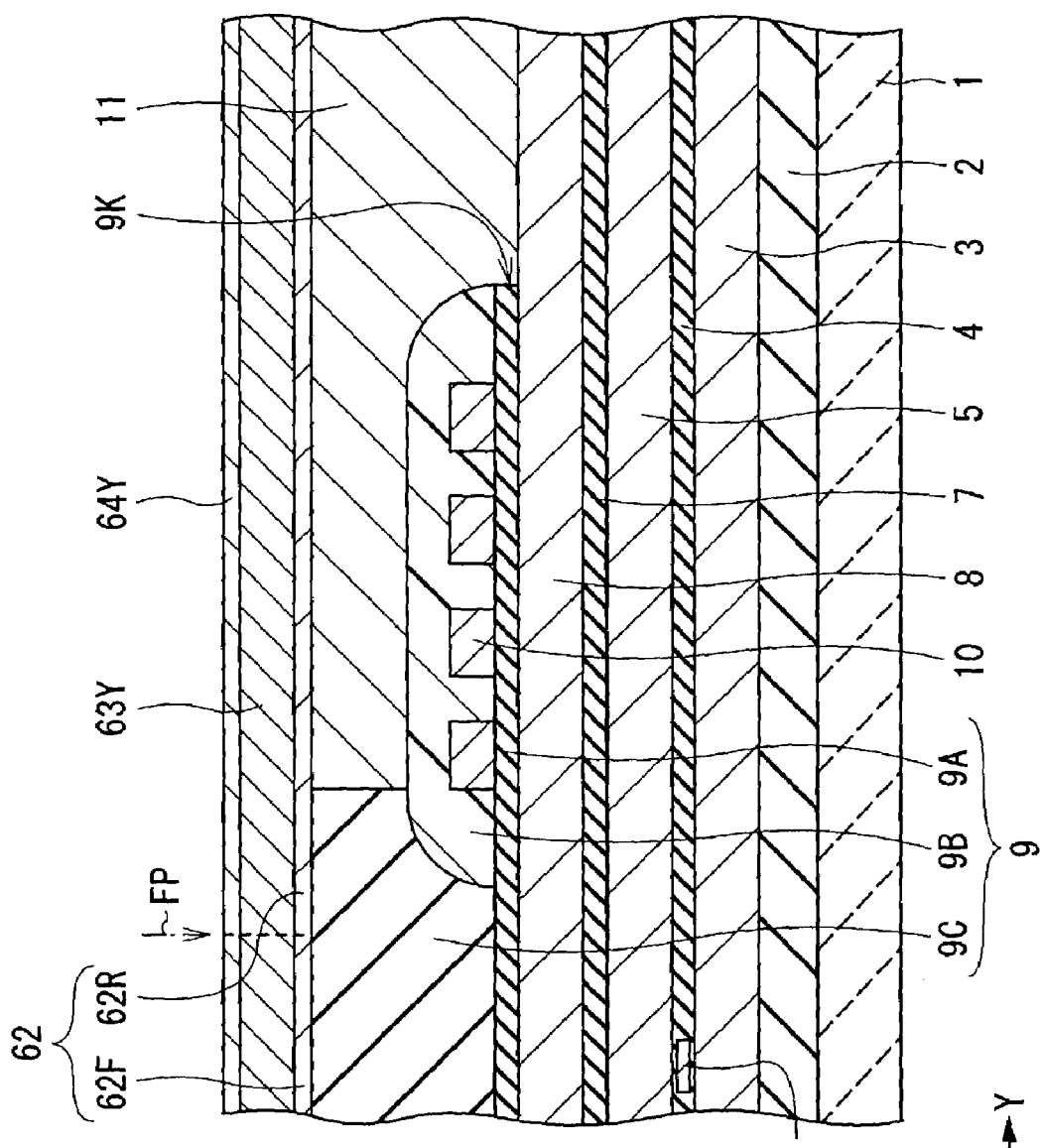
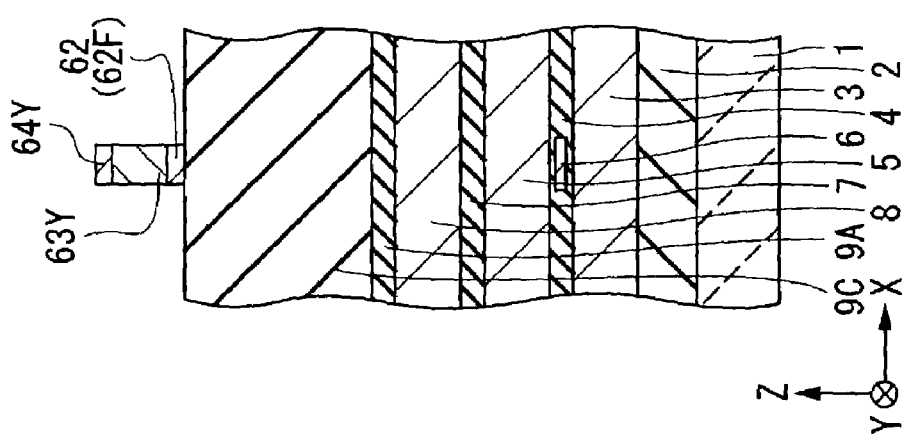
FIG. 32B
FIG. 32A

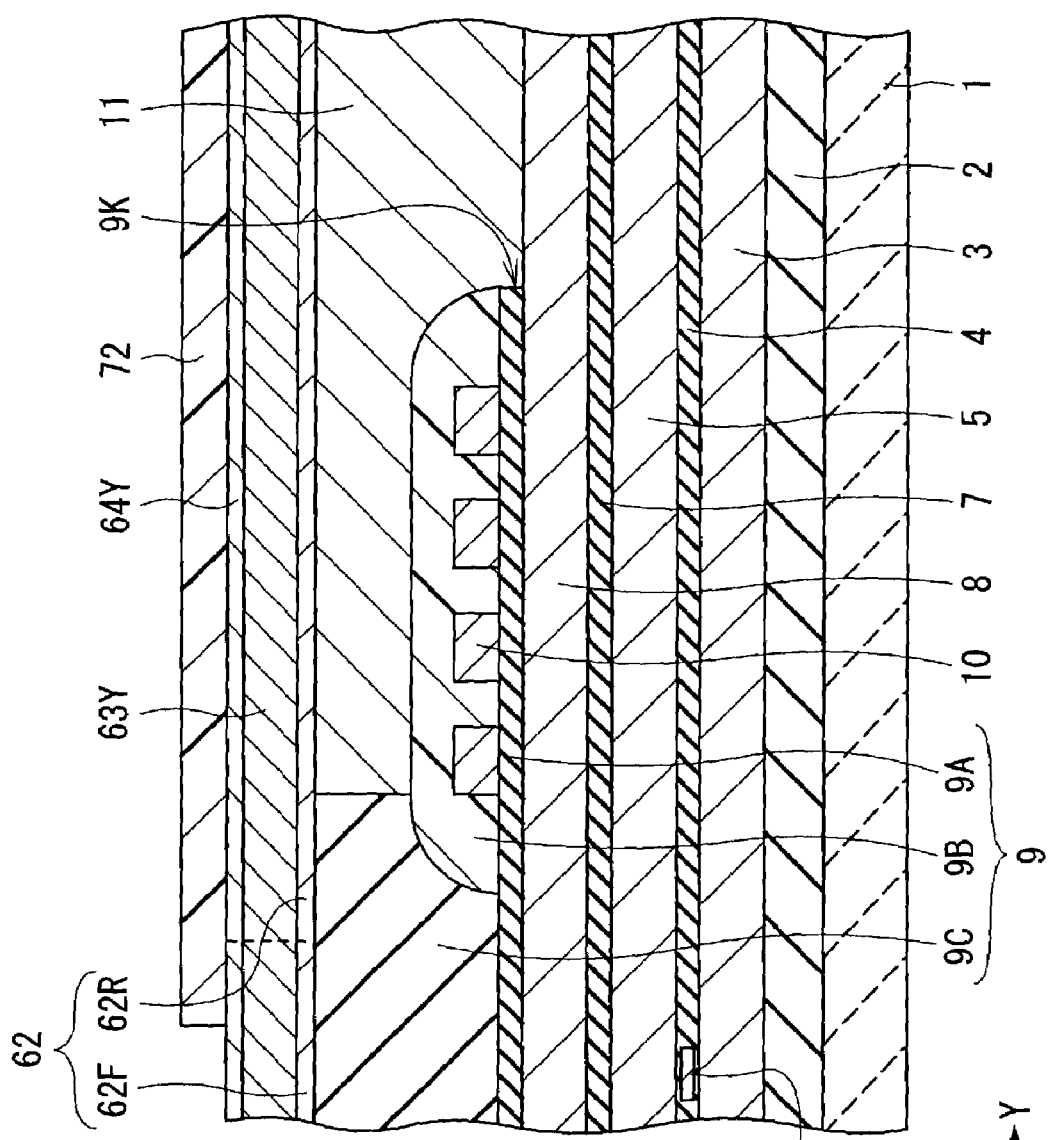
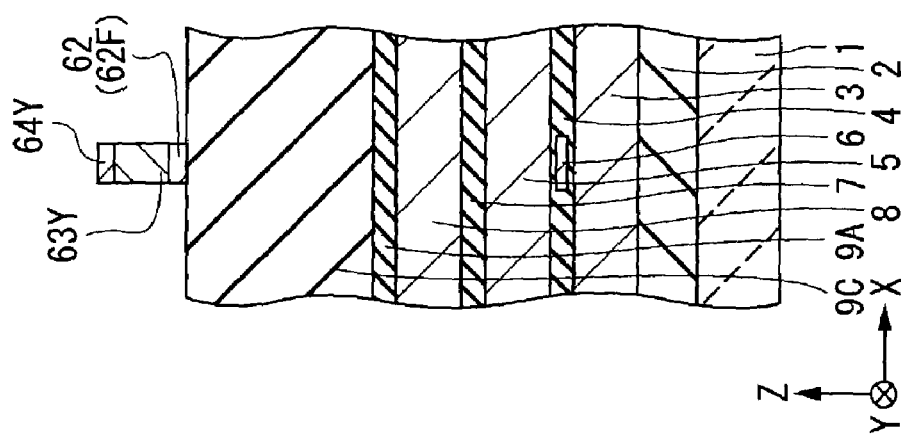
FIG. 33B
FIG. 33A

THIN FILM MAGNETIC HEAD CAPABLE OF REDUCING EXPANSION AND BENDING OF A RECORDING PATTERN, METHOD OF MANUFACTURING THE SAME AND MAGNETIC RECORDING APPARATUS

BACKGROUND OF THE INVENTION

1. Field of the Invention

The present invention relates to a thin film magnetic head comprising at least an inductive magnetic transducer for recording, a method of manufacturing the same, and a magnetic recording apparatus such as, for example, a hard disk drive which comprises the thin film magnetic head.

2. Description of the Related Art

In recent years, magnetic recording apparatuses such as, for example, hard disk drives have been in widespread use as recording sources of various information. In the development of hard disk drives, an improvement in performance of thin film magnetic heads has been sought in accordance with an increase in the areal density of a magnetic recording medium (hereinafter simply referred to as "recording medium"), that is, a hard disk. As magnetic recording systems applicable to thin film magnetic heads, for example, a longitudinal recording system that a signal magnetic field is oriented in an in-plane direction of a recording medium (a longitudinal direction) and a perpendicular recording system that the signal magnetic field is oriented in a direction perpendicular to a surface of the recording medium are well-known. At present, the longitudinal recording system is widely used, but in consideration of market forces in accordance with an improvement in areal density, the perpendicular recording system instead of the longitudinal recording system holds promise for future, because the perpendicular recording system can obtain an advantage that higher liner recording density can be achieved, and a recording medium in which data has been already recorded has resistance to thermal decay effects.

As recording modes using the perpendicular recording system, for example, (1) a mode of using a head (ring type head) facing each other with a gap in between on a side of an end and being magnetically coupled to each other on a side of the other end, and a single-layer recording medium and (2) a mode of using a head (single pole type head) being disposed perpendicular to a recording medium and a two-layer recording medium have been proposed. In these modes, based upon a point that the mode using a combination of the single pole type head and the two-layer recording medium has superior resistance to thermal decay, the mode becomes a focus of attention as a mode which can improve the performance of thin film magnetic heads.

In order to improve the recording performance of the perpendicular recording system thin film magnetic head, for example, it is required to reduce an influence of a problem resulting from a skew of the head as much as possible. The skew means that during operation of the hard disk drive, the thin film magnetic head is disposed so as to be inclined in a direction tangential to the circumference of a hard disk. When the head is skewed, mainly resulting from a structural factor of the thin film magnetic head, expansion or bending of a recording pattern may occur. When the expansion or the bending of the recording pattern occurs, a cross talk to an adjacent track occurs, thereby an error rate during reproducing increases, so the recording performance declines.

However, in a conventional perpendicular recording system thin film magnetic head, in consideration of a movement of areal density which is expected to be rapidly increased more and more in future, measures to reduce the expansion and the bending of the recording pattern when the skew occurs is still not sufficient. Further, when the thin film magnetic head is designed with consideration for reduction in the expansion and the bending of the recording pattern resulting from the skew, it is important that with consideration for mass productivity of the thin film magnetic head, the thin film magnetic head can be manufactured as easily as possible without complicating manufacturing techniques.

SUMMARY OF THE INVENTION

In view of the foregoing, it is a first object of the invention to provide a thin film magnetic head capable of reducing expansion and bending of a recording pattern resulting from a skew so as to improve recording performance.

Moreover, it is a second object of the invention to provide a method of manufacturing a thin film magnetic head capable of manufacturing the thin film magnetic head of the invention as easily as possible.

Further, it is a third object of the invention to provide a magnetic recording apparatus capable of improving recording performance.

A thin film magnetic head according to the invention is used for a magnetic recording apparatus comprising a recording medium moving to a predetermined direction of medium movement, and the thin film magnetic head comprises: a thin film magnetic coil generating magnetic flux; and a pole layer emitting the magnetic flux generated in the thin film coil to the recording medium, wherein the pole layer comprises a main pole layer having an end surface exposed to a recording-medium-facing surface facing the recording medium, and a uniform width portion determining a recording track width of the recording medium, and the main pole layer comprises a laminate including a first main pole layer portion being disposed on a medium-incoming side in the direction of medium movement and having a first saturated magnetic flux density, and a second main pole layer portion being disposed on a medium-outgoing side in the direction of medium movement and having a second saturated magnetic flux density larger than the first saturated magnetic flux density.

Incidentally, "a predetermined direction of medium movement" means a direction in which the recording medium moves relatively to the thin film magnetic head. When the movement of the recording medium toward the direction of medium movement is considered as a flow, "a medium-outgoing side" means a side where the flow outgoes, on the other hand, "a medium-incoming side" means a side where the flow incomes.

In a method of manufacturing a thin film magnetic head according to the invention, the thin film magnetic head is used for a magnetic recording apparatus comprising a recording medium moving to a predetermined direction of medium movement, and the thin film magnetic head comprises a thin film magnetic coil generating magnetic flux and a pole layer emitting the magnetic flux generated in the thin film coil to the recording medium. Further, a step of forming the pole layer includes a step of forming a main pole layer constituting a part of the pole layer so as to have an end surface exposed to a recording-medium-facing surface facing the recording medium, and a uniform width portion determining a recording track width of the recording medium. Further, the main pole layer is formed so as to comprise a laminate including a first main pole layer portion being disposed on a medium-incoming side in the direction of medium movement and having a first saturated magnetic flux density, and a second main pole layer portion being disposed on a medium-outgoing side in the direction of medium movement and having a second saturated magnetic flux density larger than the first saturated magnetic flux density.

In the thin film magnetic head or the method of manufacturing the same according to the invention, in recording, writing is performed mainly by the second main pole layer portion with a larger saturated magnetic flux density on the medium-outgoing side in the main pole layer.

A magnetic recording apparatus according to the invention comprises a recording medium; and a thin film magnetic head magnetically recording information on the recording medium, and the thin film magnetic head comprises a thin film coil generating magnetic flux, and a pole layer emitting the magnetic flux generated in the thin film coil to the recording medium, wherein the pole layer comprises a main pole layer having an end surface exposed to a recording-medium-facing surface facing the recording medium, and a uniform width portion determining a recording track width of the recording medium, and the main pole layer comprises a laminate including a first main pole layer portion being disposed on a medium-incoming side in a direction of medium movement and having a first saturated magnetic flux density, and a second main pole layer portion being disposed on a medium-outgoing side in the direction of medium movement and having a second saturated magnetic flux density larger than the first saturated magnetic flux density.

In the magnetic recording apparatus according to the invention, information is magnetically recorded on the recording medium by the thin film magnetic head of the invention.

Other and further objects, features and advantages of the invention will appear more fully from the following description.

BRIEF DESCRIPTION OF THE DRAWINGS

FIGS. 7A and 7B are sectional views of another modification to the thin film magnetic head according to the first embodiment of the invention;

FIGS. 31A and 31B are sectional views for describing one step in a method of manufacturing the thin film magnetic head according to the third embodiment of the invention;

FIGS. 32A and 32B are sectional views for describing a step following the step of FIGS. 31A and 31B;

FIGS. 33A and 33B are sectional views for describing a step following the step of FIGS. 32A and 32B;

DETAILED DESCRIPTION OF THE PREFERRED EMBODIMENTS

Preferred embodiments of the present invention will be described in more detail below referring to the accompanying drawings.

[First Embodiment]

Figures 1A, 1B:
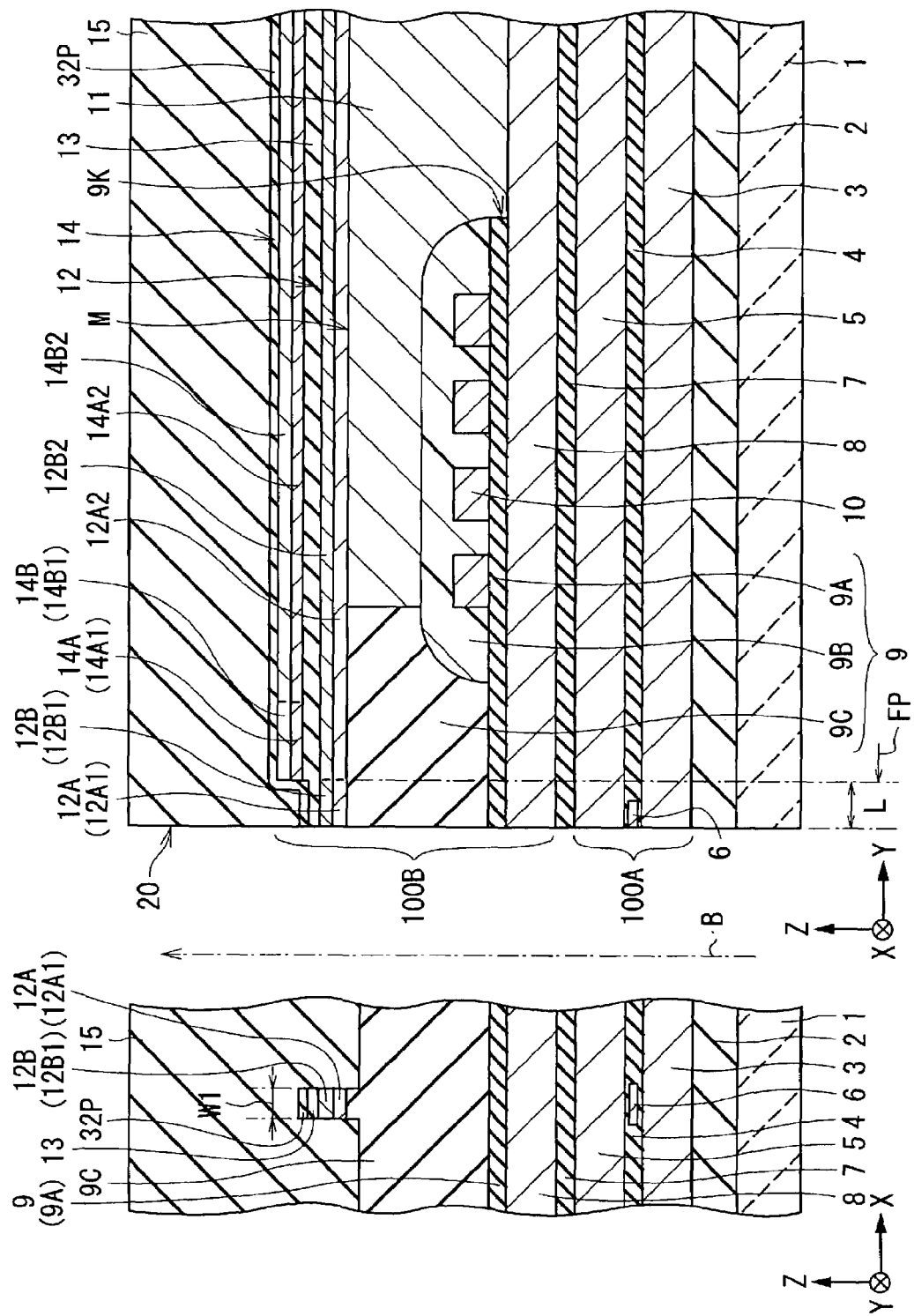
FIGS. 1A and 1B are sectional views of a thin film magnetic head according to a first embodiment of the invention.
Figure 2:
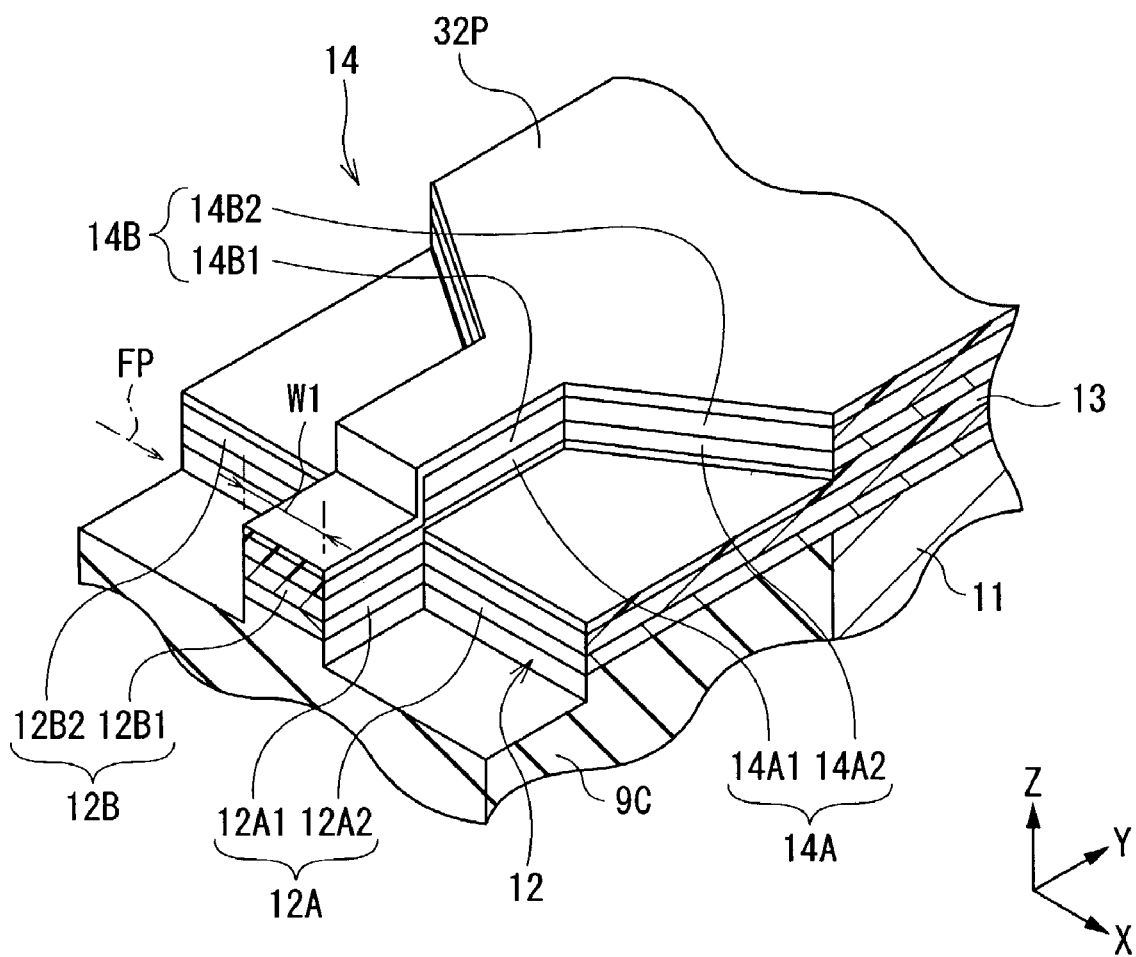
FIG. 2 is an enlarged perspective view of a main part of the thin film magnetic head shown in FIGS. 1A and 1B.
Figure 3:
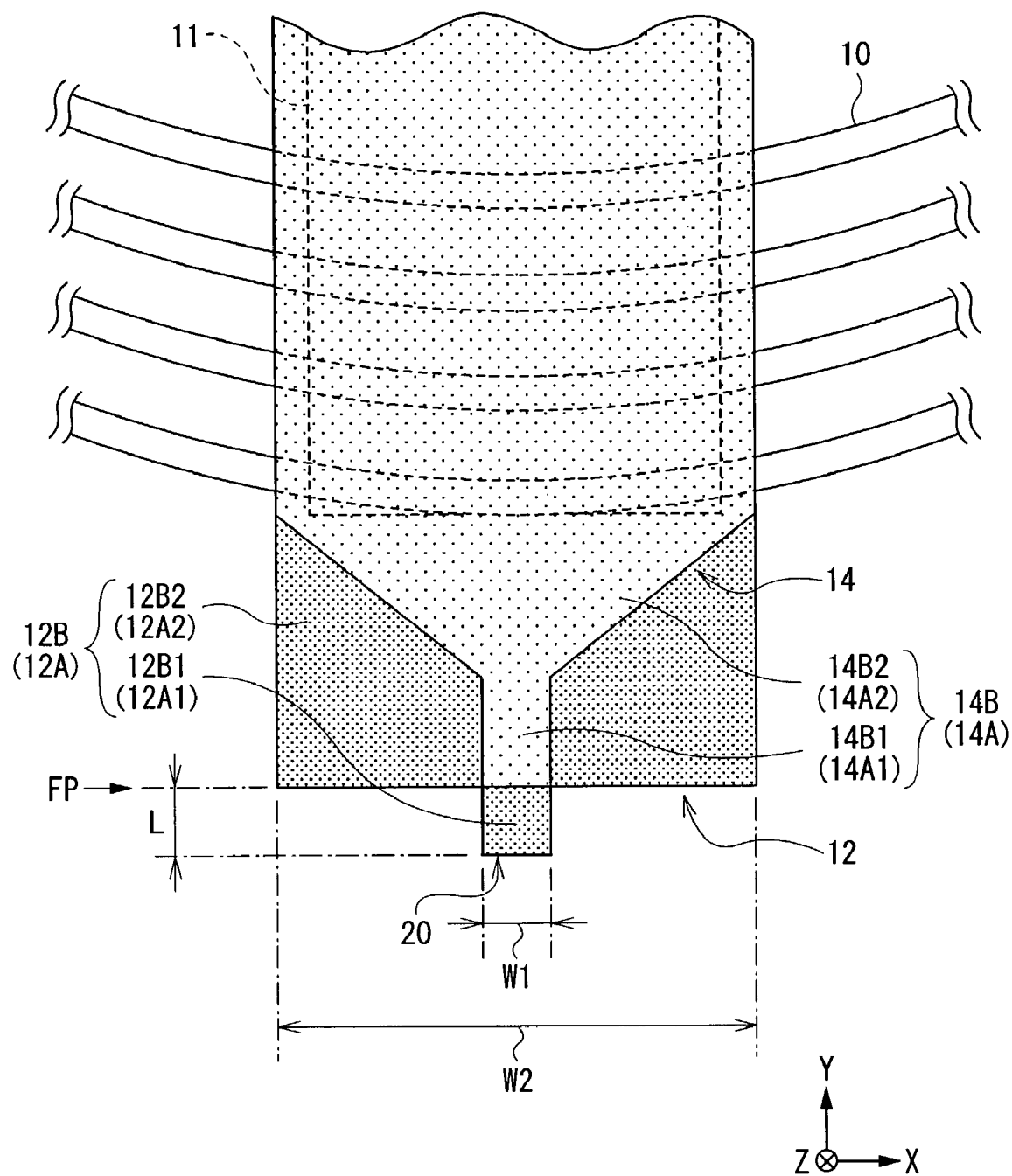
FIG. 3 is an enlarged plan view of the main part of the thin film magnetic head shown in FIGS. 1A and 1B.

At first, referring to FIGS. 1A through 3, a structure of a thin film magnetic head according to a first embodiment of the invention will be described below. FIGS. 1A and 1B show sectional views of the thin film magnetic head, and FIG. 1A shows a sectional view parallel to an air bearing surface, and FIG. 1B shows a sectional view perpendicular to the air bearing surface. FIGS. 2 and 3 show an enlarged perspective view and an enlarged plan view of a main part of the thin film magnetic head shown in FIGS. 1A and 1B, respectively. An up arrow B in FIGS. 1A and 1B indicates a direction in which a recording medium (not shown) moves relative to the thin film magnetic head, that is, a direction of movement of the recording medium (direction of medium movement).

In the following description, a distance in an X-axis direction, a distance in a Y-axis direction and a distance in a Z-axis direction in FIGS. 1A through 3 are expressed as "a width", "a length" and "a thickness", respectively. Further a side closer to the air bearing surface in the Y-axis direction is expressed as "front or frontward", and the opposite side is expressed as "rear or rearward". In FIGS. 4 through 39, these directions and sides are expressed as the same.

The thin film magnetic head according to the embodiment is mounted to, for example, a magnetic recording apparatus such as a hard disk drive. The thin film magnetic head is a composite head capable of implementing two functions of recording and reproducing. As shown in FIGS. 1A and 1B, the thin film magnetic head comprises a laminate including an insulating layer 2 made of, for example, aluminum oxide ($Al_2O_3$; hereinafter simply referred to as "alumina"), a reproducing head 100A using a magnetoresistive (MR) effect to perform reproducing, a non-magnetic layer 7 made of, for example, alumina, a recording head 100B performing recording by a perpendicular recording system and an overcoat layer 15 made of, for example, alumina or the like in this order on a substrate 1 made of a ceramic material such as AlTiC ($Al_2O_3$—TiC).

The reproducing head 100A comprises, for example, a bottom shield layer 3, a shield gap film 4 and a top shield layer 5 laminated in this order. An MR device 6 as a reproducing device is buried in the shield gap film 4 so that a surface of the MR device 6 is exposed to a recording-medium-facing surface (air bearing surface) 20 facing a recording medium.

The bottom shield layer 3 and the top shield layer 5 are made of, for example, a magnetic material such as a nickel iron alloy (NiFe; hereinafter simply referred to as "Permalloy (trade name)"; Ni: 80% by weight, Fe: 20% by weight) with a thickness of approximately 1.0 µm to 2.0 µm. The shield gap film 4 is provided to electrically separate the MR device 6 from its surroundings, and is made of, for example, a non-conductive and non-magnetic material such as alumina. The MR device 6 uses, for example, a giant magnetoresistive (GMR) effect, a tunneling magnetoresistive (TMR) effect or the like.

The recording head 100B comprises, for example, a return yoke 8, a thin film coil 10 for generating magnetic flux buried in a gap layer 9 with an aperture 9K, a yoke 11 magnetically coupled to the return yoke 8 in the aperture 9K, a main pole layer 12 magnetically coupled to the return yoke 8 through the yoke 11, an auxiliary pole layer 14 sandwiching a non-magnetic layer 13 with the main pole layer 12 in a region where the auxiliary pole layer 14 and the main pole layer 12 face each other, and a non-magnetic layer pattern 32P laminated in this order. Further, in FIG. 3, the non-magnetic layer 13 and the non-magnetic layer pattern 32P are not shown, and in order to draw a clear distinction between the main pole layer 12 and the auxiliary pole layer 14, the main pole layer 12 is indicated by dark hatching, and the auxiliary pole layer 14 is indicated by light hatching.

The return yoke 8 is provided mainly to deliver magnetic flux emitted to outside from the main pole layer 12 to the recording head 100B. The return yoke 8 is made of, for example, a magnetic material such as Permalloy (Ni: 80% by weight, Fe: 20% by weight) with a thickness of approximately 1.0 µm to 5.0 µm.

The gap layer 9 comprises a gap layer portion 9A being disposed on the return yoke 8 and having the aperture 9K, a gap layer portion 9B disposed on the gap layer portion 9A so as to coat gaps between windings of the thin film coil 10 and their surroundings, and a gap layer portion 9C partially coating the gap layer portions 9A and 9B. The gap layer portion 9A is made of, for example, a non-conductive and non-magnetic material such as alumina with a thickness of approximately 0.1 µm to 1.0 µm. The gap layer portion 9B is made of, for example, a photoresist (photosensitive resin) exhibiting liquidity by heating, a spin-on glass (SOG) or the like. The gap layer portion 9C is made of, for example, a non-conductive and non-magnetic material such as alumina and silicon oxide ($SiO_2$) with a larger thickness than that of the gap layer portion 9B.

The yoke 11 is provided mainly to magnetically couple the return yoke 8 to the main pole layer 12, and is made of, for example, a magnetic material such as Permalloy (Ni: 80% by weight, Fe: 20% by weight). For example, a position of a surface of the yoke 11 in a height direction coincides with a position of a surface of the gap layer portion 9C in the same height direction, that is, the surfaces of the yoke 11 and the gap layer portion 9C constitute a flat surface M.

The thin film coil 10 is made of, for example, a high-conductive material such as copper (Cu), and has a winding structure in a spiral shape while regarding a coupling portion between the return yoke 8 and the yoke 11 as a center. In FIGS. 1A, 1B and 3, only a part of a plurality of windings constituting the thin film coil 10 is shown.

A laminate including the main pole layer 12, the non-magnetic layer 13 and the auxiliary pole layer 14 in this order is provided mainly to contain the magnetic flux generated in the thin film coil 10 and emit the magnetic flux to the recording medium (not shown). Herein, the laminate including the main pole layer 12, the non-magnetic layer 13 and the auxiliary pole layer 14 corresponds to a specific example of "a pole layer" in the invention.

The main pole layer 12 is a part which becomes a main flow path of magnetic flux, and has a thickness of approximately 0.1 µm to 0.5 µm. The main pole layer 12 extends rearward from the air bearing surface 20, and comprises a laminate including two portions which form the same plane shapes, that is, a bottom main pole layer 12A disposed on a medium-incoming side and a top main pole layer 12B disposed on a medium-outgoing side in this order from the viewpoint of a positional relationship between the main pole layer 12 and the auxiliary pole layer 14 with reference to a position where the non-magnetic layer 13 is disposed. When the movement of the recording medium toward a direction B of medium movement is considered as a flow, "a medium-incoming side" means a side where the flow incomes, and is generally called "a leading side". On the contrary, "a medium-outgoing side" means a side where the flow outgoes, and is generally called "a trailing side". Herein, for example, a side near the gap layer 9 (a bottom side in the drawing) and a side far from the gap layer 9 (a top side in the drawing) in a Z-axis direction in the drawing is "the medium-incoming side" and "the medium-outgoing side", respectively. The bottom main pole layer 12A is made of a material with a first saturated magnetic flux density J1, for example, Permalloy (Ni: 80% by weight, Fe: 20% by weight), a cobalt-iron-nickel alloy (CoFeNi) or the like with approximately 1.0 T (Tesla) to 1.8 T. The top main pole layer 12B is made of a material with a second saturated magnetic flux density J2 larger than the first saturated magnetic flux density J1 (J2>J1), for example, an iron-cobalt alloy (FeCo), an iron-nitride-based alloy (Fe—M—N; M is a metal element of Group 4A, 5A, 6A 3B or 4B), a nitride of any of these alloys or the like with approximately 2.0 T or over. The top main pole layer 12B with a larger saturated magnetic flux density than that of the bottom main pole layer 12A is a part which becomes a main magnetic flux emitting path, and the thickness thereof is, for example, approximately 70% or less of the whole thickness of the main pole layer 12. Herein, the bottom main pole layer 12A corresponds to a specific example of "a first main pole layer portion" in the invention, and the top main pole layer 12B corresponds to a specific example of "a second main pole layer portion" in the invention.

The bottom main pole layer 12A includes, for example, a front end portion 12A1 with a fixed minute width W1 and a rear end portion 12A2 with a larger width W2 than that of the front end portion 12A1 (W2>W1) in this order from the air bearing surface 20. The top main pole layer 12B includes, for example, a front end portion 12B1 and a rear end portion 12B2 corresponding to the front end portion 12A1 and the rear end portion 12A2 constituting the bottom main pole layer 12A, respectively. The front end portions 12A1 and 12B1 are exposed to the air bearing surface 20, and the thicknesses W1 thereof determine a recording track width of the recording medium. The rear end portions 12A2 and 12B2 are a main magnetic flux containing portion where the magnetic flux generated in the thin film coil 10 is contained, and have a width which gradually increases in a front portion and a uniform width (for example, W2) in a rear portion. A position where the width of the main pole layer 12 expands, that is, a flare point FP is determined by front edges of the rear end portions 12A2 and 12B2. A region of the gap layer portion 9C frontward of the flare point FP except for a portion corresponding to the front end portions 12A1 and 12B1 is partially dug down. Herein, an aggregate of the front end portions 12A1 and 12B1 corresponds to a specific example of "a uniform width portion" in the invention.

The auxiliary pole layer 14 is an auxiliary magnetic flux containing portion for containing the magnetic flux generated in the thin film coil 10 so as to supply the magnetic flux mainly to the front end portion 12B1 of the top main pole layer 12B, and has a thickness of approximately 0.1 μm to 0.6 μm. The auxiliary pole layer 14 is disposed in a region recessed by a predetermined distance (recessed distance L=approximately 0.2 μm to 1.0 μm) from the air bearing surface 20 on the medium-outgoing side of the main pole layer 12. The auxiliary pole layer 14 extends rearward from the flare point FP, and comprises, for example, a laminate including two portions which form the same plane shapes, that is, a bottom auxiliary pole layer 14A disposed on the medium-incoming side and a top auxiliary pole layer 14B disposed on the medium-outgoing side in this order. The top auxiliary pole layer 14B is made of a material with a third saturated magnetic flux density J3, for example, the material with the first saturated magnetic flux density J1 as in the case of the bottom main pole layer 12A. The bottom auxiliary pole layer 14A is made of a material with a fourth saturated magnetic flux density J4 larger than the third saturated magnetic flux density J3 (J4>J3. The fourth saturated magnetic flux density J4 is larger than, for example, the first saturated magnetic flux density J1, and more specifically is equal to the second saturated magnetic flux density J2. Herein, the top auxiliary pole layer 14B corresponds to a specific example of "a first auxiliary pole layer portion" in the invention, and the bottom auxiliary pole layer 14A corresponds to a specific example of "a second auxiliary pole layer portion" in the invention.

The bottom auxiliary pole layer 14A includes, for example, a front end portion 14A1 with a uniform width W1 and a rear end portion 14A2 with a larger width W2 than that of the front end portion 14A1 in order from the flare point FP, and os completely separated from the top main pole layer 12B2 by the non-magnetic layer 13. The top auxiliaty pole layer 14B includes, for example, a front end portion 14B1 and a rear end portion 14B2 corresponding to the front end portion 14A1 the rear end portion 14A2 constituting the bottom auxiliary pole layer 14A, respectively. The rear end portions 14A2 and 14B2 have, for example, a width which gradually increases in a front portion and a uniform width (W2) in a rear portion.

The non-magnetic layer 13 mainly functions as a stopper layer for inhibiting the progress of etching when the main pole layer 12 is formed, and is disposed between the top main pole layer 12B and the bottom auxiliary pole layer 14A so as to separate these layers. A function of the non-magnetic layer 13 as a stopper layer will be described in more detail later. The non-magnetic layer 13 is made of, for example, alumina or the like with a thickness of approximately 0.015 μm to 0.65 μm. The non-magnetic layer 13 has substantially the same plane shape as that of the main pole layer 12.

The non-magnetic layer pattern 32P mainly functions as a stopper layer for inhibiting the progress of etching when the auxiliary pole layer 14 is formed. A function of the non-magnetic layer pattern 32P as a stopper layer will be described in more detail later. The non-magnetic layer pattern 32P is made of, for example, alumina or the like, and has substantially the same plane shape as that of the auxiliary pole layer 14.

Next, referring FIGS. 1A through 3, actions of the thin film magnetic head will be described below.

In the thin film magnetic head, in recording information, when a current flows into the thin film coil 10 of the recording head 100B through an external circuit (not shown), magnetic flux is generated in the thin film coil 10. The magnetic flux generated at this time is contained in the main pole layer 12 through the yoke 11 and is also contained in the auxiliary pole layer 14 through the non-magnetic layer 13. The magnetic flux contained in the main pole layer 12 flows from the rear end portion 12A2 to the front end portion 12A1 in the bottom main pole layer 12A, and from the rear end portion 12B2 to the front end portion 12B1 in the top main pole layer 12B. At this time, in accordance with a decreasing width of the main pole layer 12 (W2 to W1), magnetic flux saturation occurs in the bottom main pole layer 12A with a smaller saturated magnetic flux density (the first saturated magnetic flux density J1), however, no magnetic flux saturation occurs in the top main pole layer 12B with a larger saturated magnetic flux density (the second saturated magnetic flux density J2>the first saturated magnetic flux density J1), so the magnetic flux flows mainly in the top main pole layer 12B on a priority basis into the front end portion 12B1. On the other hand, the magnetic flux contained in the auxiliary pole layer 14 flows from the rear end portion 14A2 to the front end portion 14A1 in the bottom auxiliary pole layer 14A, and the rear end portion 14B2 to the front end portion 14B1 in the top auxiliary pole layer 14B. At this time, like the main pole layer 12, magnetic flux saturation occurs in the top auxiliary pole layer 14B with a smaller saturated magnetic flux density (the third saturated magnetic flux density J3), however, no magnetic flux saturation occurs in the bottom auxiliary pole layer 14A with a larger saturated magnetic flux density (the fourth saturated magnetic flux density J4>the third saturated magnetic flux density J3), so the magnetic flux flows mainly in the bottom auxiliary pole layer 14A on a priority basis into the front end portion 14A1, and after the magnetic flux is concentrated on the neighborhood of a front end of the front end portion 14A1, the magnetic flux passes through the non-magnetic layer 13 again so as to flow into the front end portion 12B1 of the top main pole layer 12B. The magnetic flux flowing into the front end portion 12B1 is concentrated on a trailing side portion of the front end portion 12B1. The magnetic flux concentrated on the trailing side portion of the front end portion 12B1 is emitted so as to generate a magnetic field (perpendicular magnetic field) in a direction perpendicular to a surface of the recording medium (perpendicular direction). Then, the perpendicular magnetic field magnetizes the recording medium in a perpendicular direction so that information is recorded on the recording medium.

On the contrary, in reproducing, when a sense current flows into the MR device 6 of the reproducing head 100A, the resistance of the MR device 6 is changed depending upon a signal magnetic field for reproducing from the recording medium. A change in the resistance is detected as a change in the sense current so that the information recorded on the recording medium is read out.

As described above, in the thin film magnetic head according to the embodiment, the main pole layer 12 comprises the laminate including the bottom main pole layer 12A being disposed on the medium-incoming side and having the first saturated magnetic flux density J1 and the top main pole layer 12B being disposed on the medium-outgoing side and having the second saturated magnetic flux density J2 larger than the first saturated magnetic flux density J1, so expansion of a recording pattern resulting from a skew can be reduced so as to improve recording performance because of the following reason.

Figure 4:
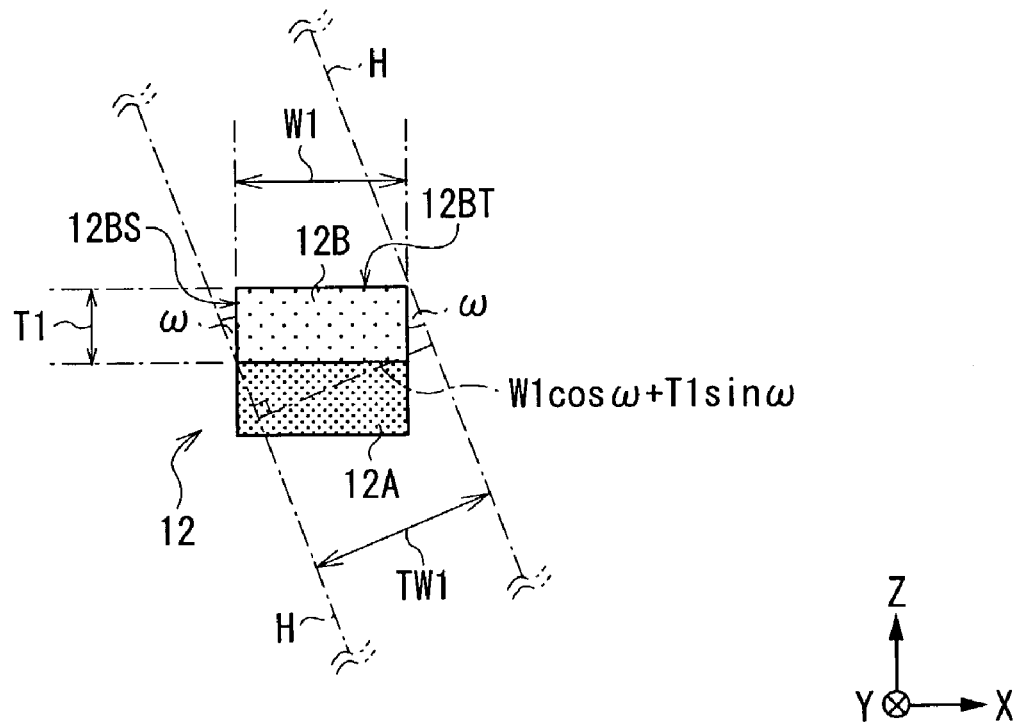
FIG. 4 is an illustration for describing an advantage of the thin film magnetic head according to the first embodiment of the invention.
Figure 5:
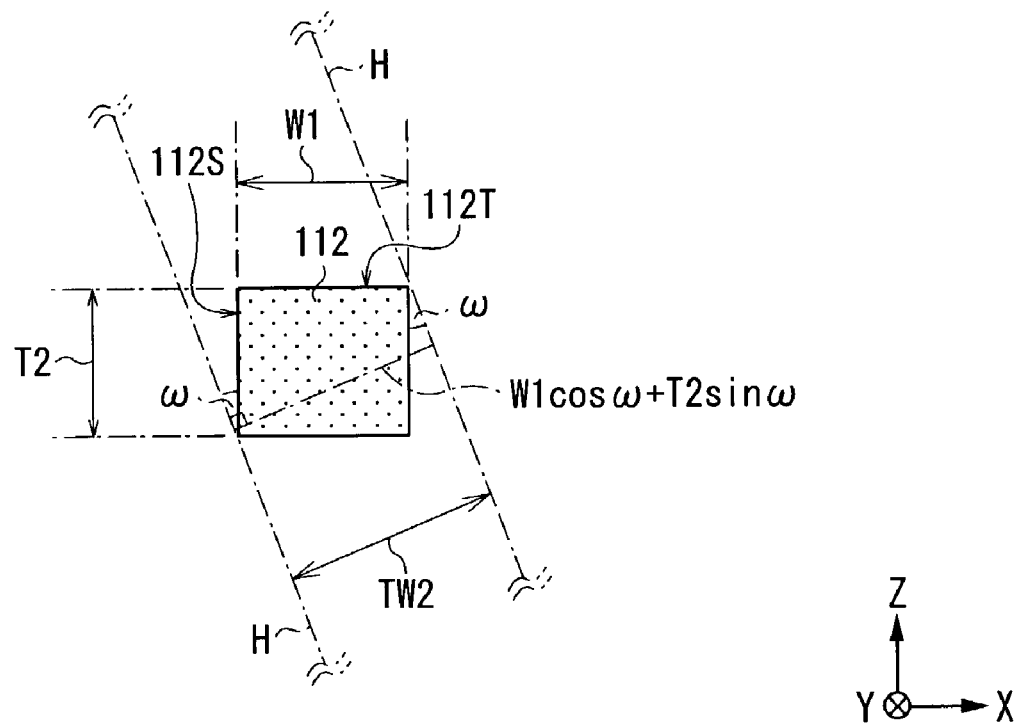
FIG. 5 is an illustration for describing a disadvantage of a thin film magnetic head as a comparative example to the thin film magnetic head according to the first embodiment of the invention.

FIG. 4 is an illustration for describing an advantage of the thin film magnetic head according to the embodiment, and shows an enlarged view of a front end surface of the main pole layer 12 (the bottom main pole layer 12A and the top main pole layer 12B). FIG. 5 is an illustration for describing a disadvantage of a thin film magnetic head as a comparative example to the embodiment, and shows a front end surface of a main pole layer 112 corresponding to the main pole layer 12. The main pole layer 112 has the same structure as the main pole layer 12 except that, for example, the bottom main pole layer 12A and the top main pole layer 12B are integrated (with the width W1), and the main pole layer 112 has the second saturated magnetic flux density J2 as a whole. In FIGS. 4 and 5, a top side and a bottom side in the Z-axis direction in the drawings are considered as the medium-outgoing side (trailing side) and the medium-incoming side (leading side), respectively.

In the comparative example (refer to FIG. 5), the main pole layer 112 has the second saturated magnetic flux density J2 as a whole, and the saturated magnetic flux density of the whole main pole layer 112 is large, so when the head is skewed during operation of the thin film magnetic head, writing to the recording medium by the main pole layer 112 is performed by the whole main pole layer 112, that is, an edge 112T on the medium-outgoing side and a side edge 112S in the main pole layer 112. In this case, where a thickness of the front end surface of the main pole layer 112 is T2, when the side edge 112S of the main pole layer 112 is inclined at an angle (skew angle) $\omega$ in a direction H tangential to the circumference of the recording medium, a substantial recording track width TW2 is expressed as TW2=W1 cos $\omega$+T2 sin $\omega$.

On the other hand, in the embodiment (refer to FIG. 4), the top main pole layer 12B in the main pole layer 12 has the second saturated magnetic flux density J2, so only the top main pole layer 12B has a larger saturated magnetic flux density. Thereby, as described above, the bottom main pole layer 12A in which magnetic flux saturation occurs hardly ever functions as a magnetic flux emitting path, and the top main pole layer 12B functions as a main magnetic flux emitting path. Therefore, writing by the main pole layer 12 when the head is skewed is performed by only the top main pole layer 12B, that is, an edge 12BT on the medium-outgoing side and an side edge 12BS in the top main pole layer 12B. In this case, where a thickness of the front end surface of the top main pole layer 12B is T1, when the head is skewed at the same skew angle $\omega$ as in the case of the comparative example, a substantial recording track width TW1 is expressed as TW1=W1 cos $\omega$+T1 sin $\omega$. In other words, compared between the recording track widths TW1 and TW2, the thicknesses T1 and T2 have a relationship of T1<T2, so the recording track width TW1 according to the embodiment is smaller than the recording track width TW2 according to the comparative example (TW1<TW2). Therefore, in the embodiment, the expansion of the recording pattern resulting from the skew can be reduced more than in the comparative example, thereby recording performance can be improved.

Further, in the embodiment, on the basis of the above-described structural characteristics of the main pole layer 12, compared with the comparative example, bending of the recording pattern resulting from the skew can be reduced because of the following reason.

In order to secure a stable recording property, it is preferable that the recording pattern has a linear shape by nature, however, when the head is skewed, the recording pattern may be bended resulting from the magnetic flux emitted mainly from a side portion of the main pole layer. In this case, in order to stabilize the recording performance, it is required to reduce a bending phenomenon of the recording pattern as much as possible. In the above-described comparative example (refer to FIG. 5), the recording pattern is determined by the edge 112T (distance W1) on the medium-outgoing side and the side edge 112S (distance T2) in the main pole layer 112, on the other hand, in the embodiment (refer to FIG. 4), the recording pattern is determined by the edge 12BT (distance W1) on the medium-outgoing side and the side edge 12BS (distance T1) in the top main pole layer 12B. In other words, when a degree of bending of the recording pattern is compared between the comparative example and the embodiment, the distances T1 and T2 have a relationship of T1<T2, so in the embodiment, a length of the recording pattern resulting from the magnetic flux emitted from the side edge 12BS of the top main pole layer 12B is relatively shortened. Therefore, in the embodiment, bending of the recording pattern resulting from the skew can be reduced more than in the comparative example.

Further, in the embodiment, the rear end portions 12A2 and 12B2 with a large width in the main pole layer 12 are disposed at a minute recessed distance L (=approximately 0.2 μm to 1.0 μm) from the air bearing surface 20, so the flare point FP determined by positions where the rear end portions 12A2 and 12B2 are disposed is disposed closer to the air bearing surface 20. In this case, in the top main pole layer 12B, the magnetic flux contained in the rear end portion 12B2 is delivered to the neighborhood of the air bearing surface 20, then the magnetic flux is focused just before the magnetic flux is emitted from the front end portion 12B1 to outside. Therefore, compared with the case where the flare point FP is far from the air bearing surface 20, a larger amount of the magnetic flux is focused on the front end portion 12B1. Therefore, a generation intensity of the perpendicular magnetic field can be increased.

Moreover, in the embodiment, the auxiliary pole layer 14 disposed on the medium-outgoing side of the top main pole layer 12B is comprised in a region recessed from the air bearing surface 20 together with the top main pole layer 12B, so, as described above, the magnetic flux generated in the thin film coil 10 flows into the front end portion 12B1 in the main pole layer 12, and also flows into the front end portion 12B1 through the auxiliary pole layer 14. In other words, in spite of the fact that the auxiliary pole layer 14 is completely separated from the main pole layer 12 by the non-magnetic layer 13, the auxiliary pole layer 14 has a function of accessorily supplying the magnetic flux to the front end portion 12B1 which is a main magnetic flux emitting portion. Thereby, "a main magnetic flux incoming route" where the magnetic flux flows from the rear end portion 12B2 to the front end portion 12B1 in the top main pole layer 12B as well as "an auxiliary magnetic flux incoming route" where the magnetic flux flows from the auxiliary pole layer 14 to the front end portion 12B1 can be obtained, so compared with the case of including only the main pole layer 12 and not including the auxiliary pole layer 14, an amount of the magnetic flux supplied to the trailing side portion of the front end portion 12B1 is more increased. Therefore, a sufficient amount of the magnetic flux is supplied to the trailing side portion of the front end portion 12B1 so that an emitting amount of the magnetic flux is increased, and a magnetic field gradient becomes steeper, so in this point of view, the generation intensity of the perpendicular magnetic field can be increased.

Moreover, in the embodiment, when the auxiliary pole layer 14 comprises the laminate including the top auxiliary pole layer 14B being disposed on the medium-outgoing side and having the third saturated magnetic flux density J3 and the bottom auxiliary pole layer 14A being disposed on the medium-incoming side and having the fourth saturated magnetic flux density J4 larger than the third saturated magnetic flux J3, an amount of the magnetic flux contained in the bottom auxiliary pole layer 14A which functions as a main magnetic flux flow path in the auxiliary pole layer 14 is increased. Therefore, an amount of the magnetic flux supplied to the front end portion 12B1 of the top main pole layer 12B from the auxiliary pole layer 14 is increased, so the generation intensity of the perpendicular magnetic field can be increased. Further, as the magnetic flux contained in the auxiliary pole layer 14 is supplied to the top main pole layer 12B, the magnetic flux flowing in the auxiliary pole layer 14 does not directly contribute to generating a magnetic field for recording, so adverse effects to the recording medium resulting from the existence of the auxiliary pole layer 14, for example, direct writing to the recording medium by the auxiliary pole layer 14 can be prevented.

Further, in the embodiment, not only the bottom auxiliary pole layer 14A but also the top auxiliary pole layer 14B can function as "the auxiliary magnetic flux incoming route", but ability to supply the magnetic flux to the front end portion 12B1 is lower in the top auxiliary pole layer 14B than in the bottom auxiliary pole layer 14A. It is because the top auxiliary pole layer 14B is farther from the thin film coil 10 than the bottom auxiliary pole layer 14A, so the magnetic flux generated in the thin film coil 10 is less contained in the top auxiliary pole layer 14B than the bottom auxiliary pole layer 14A.

Figures 6A, 6B:
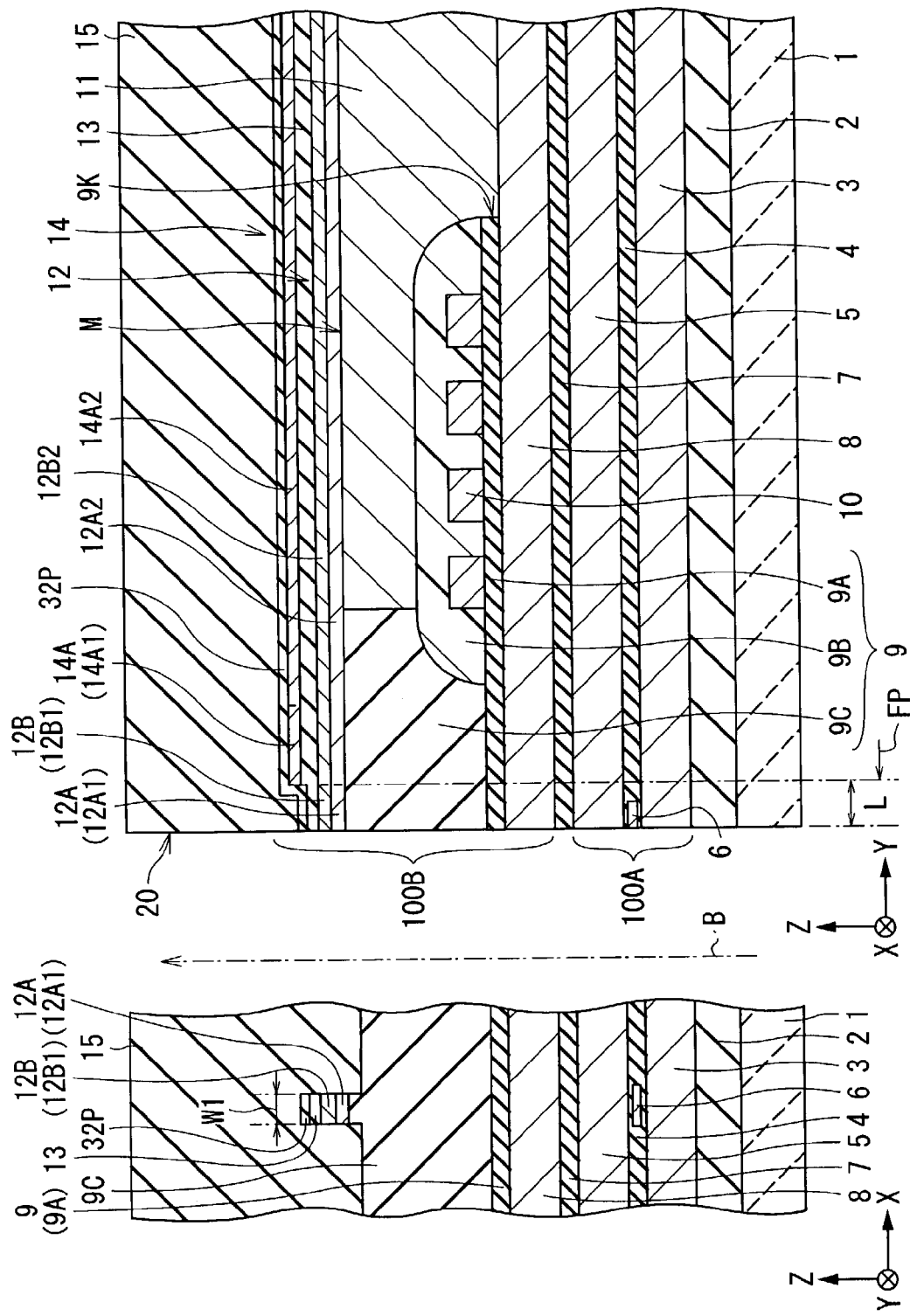
FIGS. 6A and 6B are sectional views of a modification to the thin film magnetic head according to the first embodiment of the invention.

In the embodiment, the auxiliary pole layer 14 is configured so as to have a two-layer structure including the bottom auxiliary pole layer 14A and the top auxiliary pole layer 14B, but it is not necessarily limited to this structure. As described above, in consideration of the ability of the auxiliary pole layer 14 to supply the magnetic flux to the front end portion 12B1, when a ratio of the ability of the top auxiliary pole layer 14B to supply the magnetic flux, the ratio contributing to the ability of the whole auxiliary pole layer 14 to supply the magnetic flux is extremely low, for example, as shown in FIGS. 6A and 6B, the auxiliary pole layer 14 may comprise only the bottom auxiliary pole layer 14A without the top auxiliary pole layer 14B. In this case, in the viewpoint of securing a containing amount of the magnetic flux, the auxiliary pole layer 14 is preferably made of a material with the second saturated magnetic flux density J2 as in the case of the top main pole layer 12B. Also in this case, substantially the same effects as those in the above embodiment can be obtained. Incidentally, the structure of the thin film magnetic head shown in FIGS. 6A and 6B is equivalent to that shown in FIGS. 1A and 1B, except for the above characteristic part.

Moreover, in the embodiment, the non-magnetic layer 13 is disposed between the main pole layer 12 and the auxiliary pole layer 14 so as to separate these layers, but it is not necessarily limited to this structure. For example, as shown in FIGS. 7A and 7B, the auxiliary pole layer 14 (bottom auxiliary pole layer 14A) may be disposed adjacent to the main pole layer 12 (top main pole layer 12B) without disposing the non-magnetic layer 13. In this case, the top main pole layer 12B and the bottom auxiliary pole layer 14A are adjacent to each other so that they are magnetically coupled to each other, so compared with the case where the non-magnetic layer 13 is disposed, the magnetic flux can smoothly flow between the main pole layer 12 and the auxiliary pole layer 14. However, as described above, the non-magnetic layer 13 functions as a stopper layer during formation of the main pole layer 12, so when the non-magnetic layer 13 is not disposed, it should be noted that a problem (reduction in thickness) during the formation of the main pole layer 12 may occur.

Moreover, in the embodiment, the top shield layer 5 and the return yoke 8 are separated from each other by the non-magnetic layer 7 to form indivial components, but it is not necessarily limited to this structure. For example, the top shield layer 5 and the return yoke 8 may be integrated without disposing the non-magnetic layer 7. In this case, a thickness of an integrated layer including the top shield layer 5 and the return yoke 8 (top shield layer-cum-return yoke) can be freely set, and it is preferably approximately 1.0 μm to 5.0 μm.

Next, referring to FIGS. 1A through 3, 8A through 18, a method of manufacturing the thin film magnetic head according to the embodiment will be described below. FIGS. 8A through 13B show sectional views of each step in the method of manufacturing the thin film magnetic head, and FIGS. 14 through 18 show perspective views corresponding to FIGS. 8A and 8B through 12A and 12B, respectively.

At first, the method of manufacturing the thin film magnetic head will be briefly described below, and then a method of forming a main part to which the method of manufacturing the thin film magnetic head according to the invention is applied, that is, a method of forming the laminate including the main pole layer 12, the non-magnetic layer 13 and the auxiliary pole layer 14 will be described in detail below. In the descriptions of the method of manufacturing the thin film magnetic head and the method of forming the main part, the materials, forming positions and structural characteristics of components will not be further described, because they have been already described in the above paragraphs.

The thin film magnetic head is manufactured through laminating each component in order mainly by use of existing thin film processes including film formation techniques such as sputtering, patterning techniques using photolithography, etching techniques such as dry etching and so on. In other words, at first, after the insulating layer 2 is formed on the substrate 1, the bottom shield layer 3, the shield gap film 4 burying the MR device 6, and the top shield layer 5 are laminated in this order on the insulating layer 2 so as to form the reproducing head 100A.

Next, after the non-magnetic layer 7 is formed on the reproducing head 100A, the return yoke 8, the gap layer 9 (the gap layer portions 9A, 9B and 9C) having the aperture 9K and burying the thin film coil 10, the yoke 11 coupled to the return yoke 8 in the aperture 9K, the main pole layer 12 (the bottom main pole layer 12A and the top main pole layer 12B) magnetically coupled to the return yoke 8 through the yoke 11, the non-magnetic layer 13, the auxiliary pole layer 14 (the bottom auxiliary pole layer 14A and the top auxiliary pole layer 14B) and the non-magnetic layer pattern 32P are laminated in this order on the non-magnetic layer 7 so as to form the recording head 100B.

Finally, after the overcoat layer 15 is formed on the recording head 100B, the air bearing surface 20 is formed through machining or polishing to complete the thin film magnetic head.

Figure 8B:
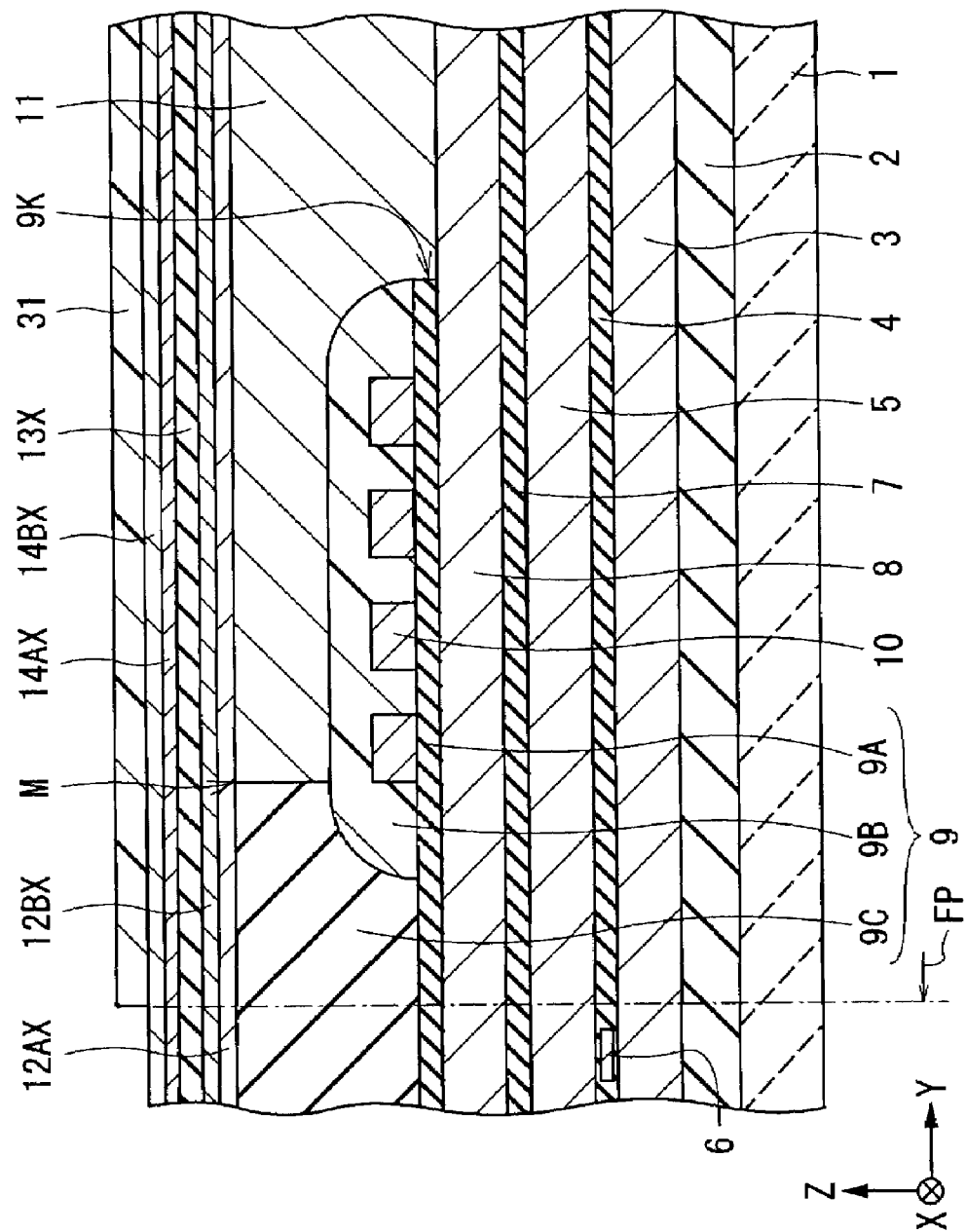
FIGS. 8A and 8B are sectional views for describing one step in a method of manufacturing the thin film magnetic head according to the first embodiment of the invention.
Figure 8A:
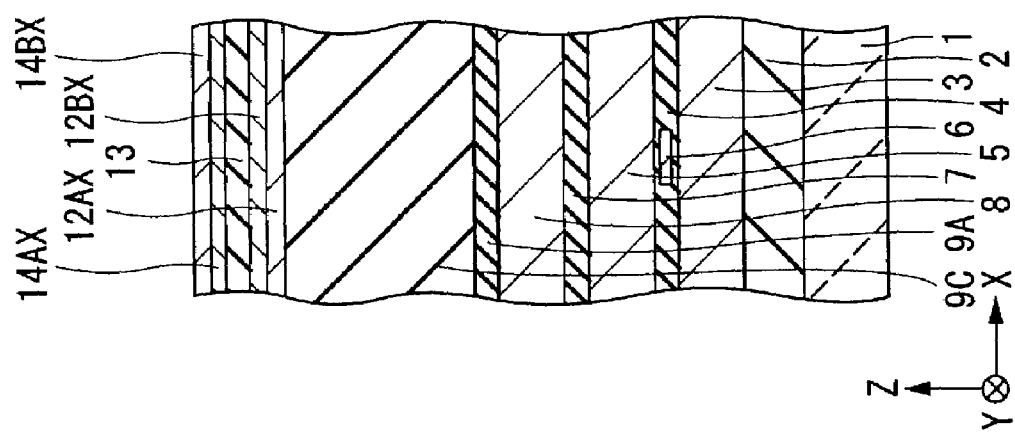
Figure 14:
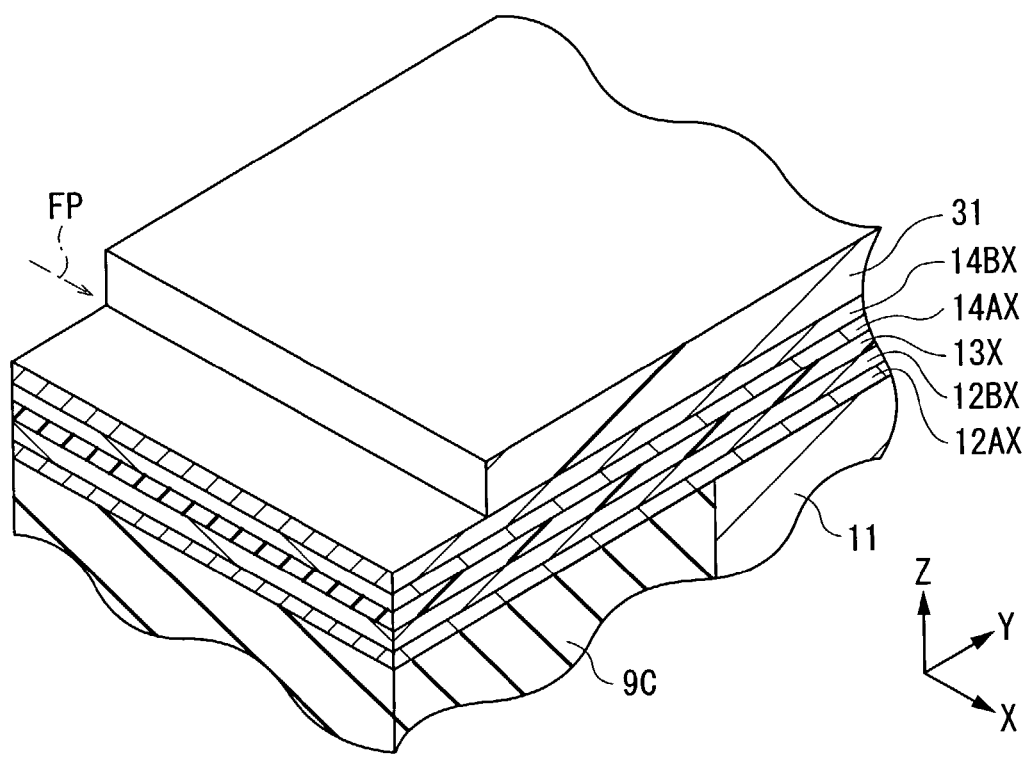
FIG. 14 is a perspective view corresponding to the sectional views shown in FIGS. 8A and 8B.

When the main part of the thin film magnetic head is formed, after the yoke 11 is formed so that the yoke 11 and the gap layer portion 9C constitute the flat surface M, at first, as shown in FIGS. 8A, 8B and 14, a precursory main pole layer 12AX, a precursory main pole layer 12BX, a precursory non-magnetic layer 13X made of, for example, alumina or the like, a precursory auxiliary pole layer 14AX and a precursory auxiliary pole layer 14BX are formed and laminated in this order on the flat surface M through, for example, sputtering. These precursory layers, that is, the precursory main pole layers 12AX and 12BX, the precursory non-magnetic layer 13X and the precursory auxiliary pole layers 14AX and 14BX are preparatory layers which become the bottom main pole layer 12A, the top main pole layer 12B, the non-magnetic layer 13, the bottom auxiliary pole layer 14A and the top auxiliary pole layer 14B through patterning in a later step, respectively. As a material of the precursory main pole layer 12AX, a material with the first saturated magnetic flux density J1, for example, Permalloy (Ni: 80% by weight, Fe: 20% by weight), a cobalt-iron-nickel alloy (CoFeNi) or the like with approximately 1.0 T to 1.8 T is used, and as a material of the precursory main pole layer 12BX, a material with the second saturated magnetic flux density J2 larger than the first saturated magnetic flux density J1, for example, an iron-cobalt alloy (FeCo), an iron-nitride-based alloy (Fe—M—N; M is a metal element of Group 4A, 5A, 6A, 3B and 4B), a nitride of any of these alloys or the like with approximately 2.0 T or over is used. Further, as a material of the precursory auxiliary pole layer 14BX, a material with the third saturated magnetic flux density J3, for example, a material with the first saturated magnetic flux density J1 as in the case of the material of the precursory main pole layer 12AX is used, and as a material of the precursory auxiliary pole layer 14AX, a material with the fourth saturated magnetic flux density J4 larger than the third saturated magnetic flux density J3, for example, a material with a saturated magnetic flux density larger than the first saturated magnetic flux density J1, more specifically a material with a saturated magnetic flux density equal to the second saturated magnetic flux density J2 is used.

Next, after a photoresist film (not shown) is formed on the precursory auxiliary pole layer 14BX, the photoresist film is patterned through photolithography so as to selectively form a mask layer 31 for etching as shown in FIGS. 8A, 8B and 14. The mask layer 31 is formed so as to coat a region of the precursory auxiliary pole layer 14BX rearward of the flare point FP (refer to FIGS. 1A through 3) of the main pole layer 12, which is finally formed, through adjusting an exposed area in the photoresist film during the photolithography. More specifically, for example, a front edge of the mask layer 31 is aligned so as to be capable of being recessed by the recessed distance L (=approximately 0.2 μm to 1.0 μm) from a position where the air bearing surface 20 is finally formed.

Figure 9B:
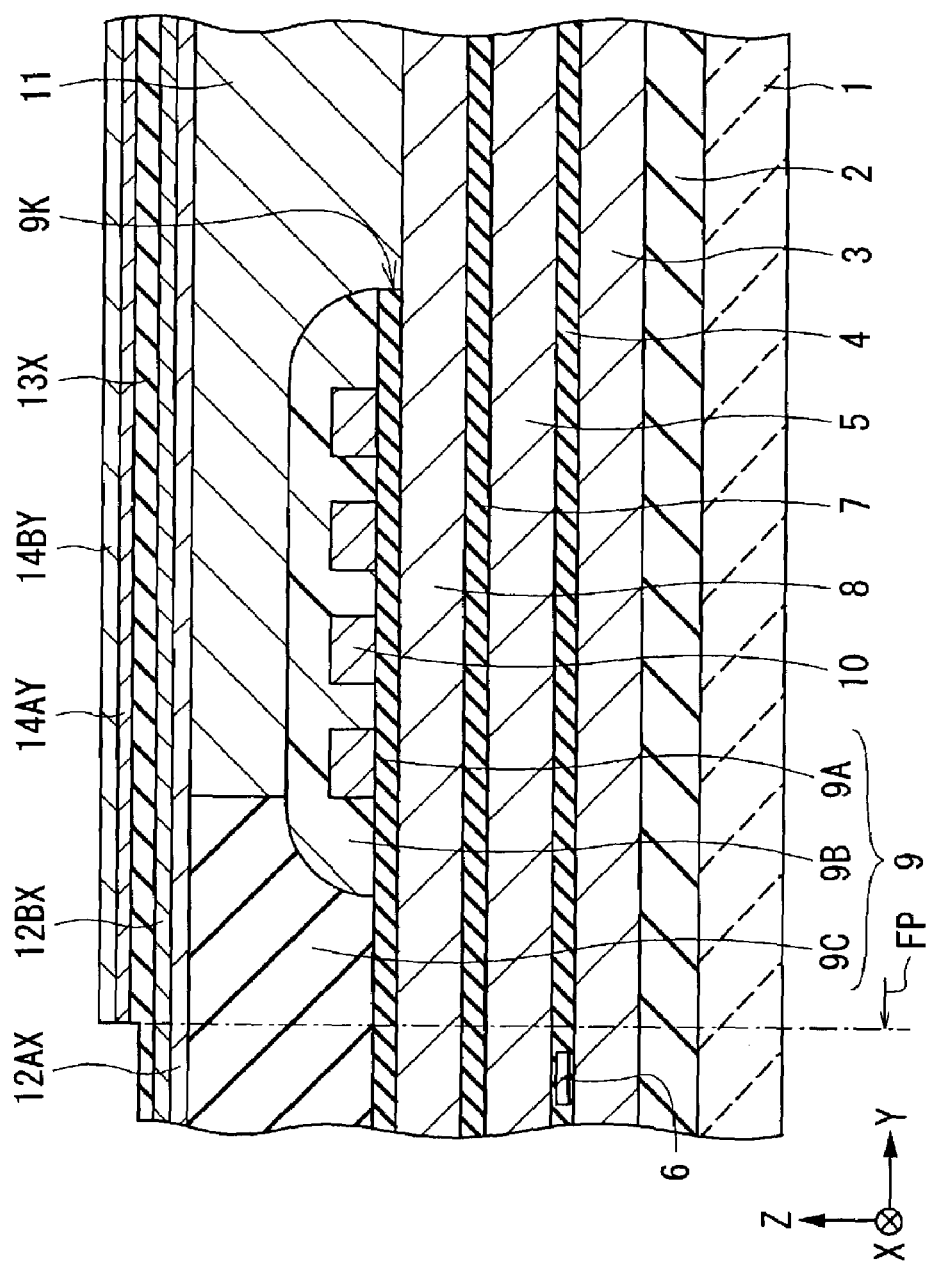
FIGS. 9A and 9B are sectional views for describing a step following the step of FIGS. 8A and 8B.
Figure 9A:
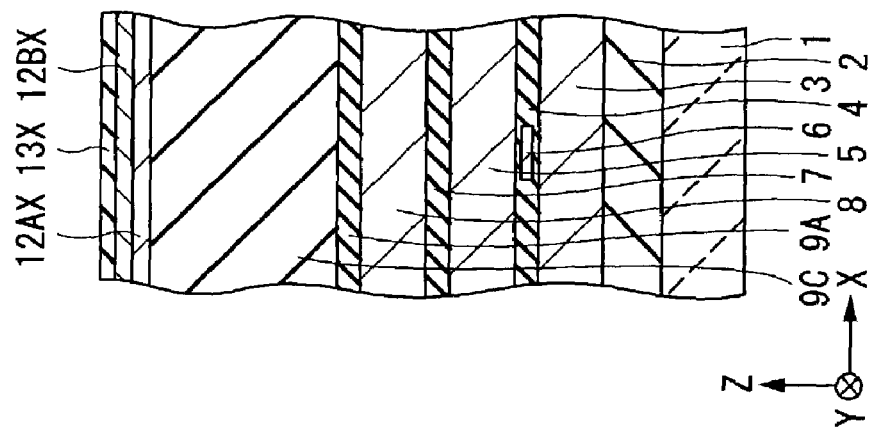
Figure 15:
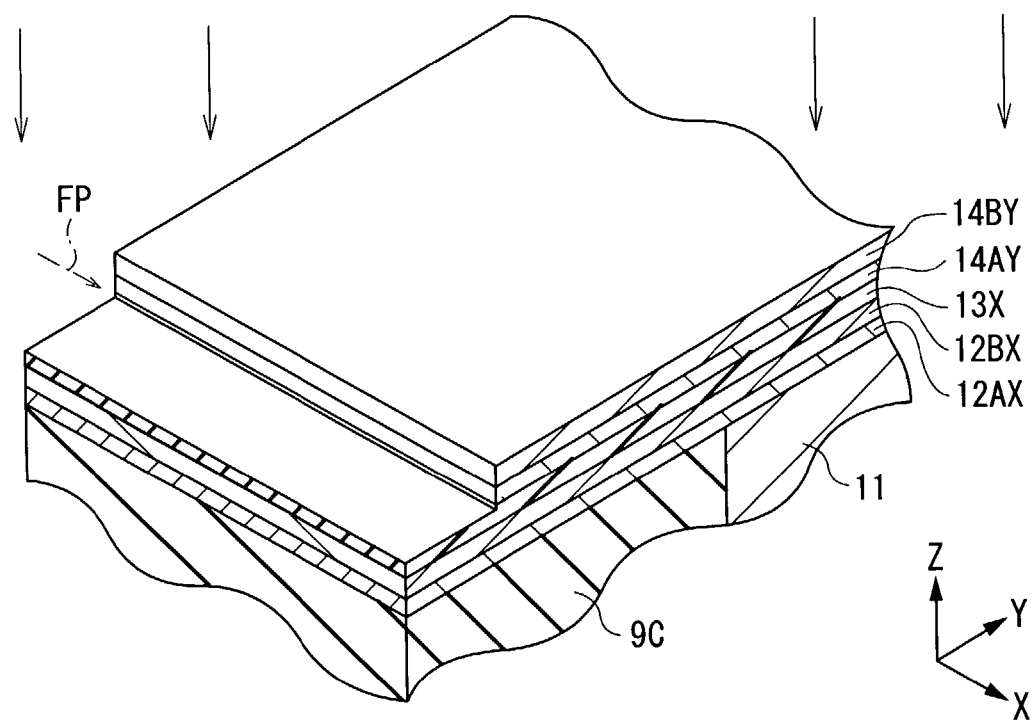
FIG. 15 is a perspective view corresponding to the sectional views shown in FIGS. 9A and 9B.

Then, the whole surface is etched through, for example, ion milling by use of the mask layer 31 so as to pattern the precursory auxiliary pole layers 14AX and 14BX. Regions of the precursory auxiliary pole layers 14AX and 14BX frontward of the flare point FP are selectively removed through etching so as to form precursory auxiliary pole layer patterns 14AY and 14BY as shown in FIGS. 9A, 9B and 15. When the precursory auxiliary pole layer patterns 14AY and 14BY are formed, the mask layer 31, together with the precursory auxiliary pole layers 14AX and 14BX, is etched, so etching is carried on until the mask layer 31 disappears. In this case, in a region which is not coated by the mask layer 31, the precursory non-magnetic layer 13X made of alumina with a slow etching rate functions as a stopper layer. In other words, in a region frontward of the flare point FP, after the precursory auxiliary pole layers 14AX and 14BX are removed, the precursory non-magnetic layer 13X is slightly etched and dug down. Thereby, excessive etching is prevented from being performed, so the precursory main pole layer 12BX which is not a subject to be etched is prevented from being etched. In the above description, etching is carried on until the mask layer 31 is removed when forming the precursory auxiliary pole layer patterns 14AY and 14BY, but it is not necessarily limited to this method. For example, in the case where the mask layer 31 is still remained when etching is finished at the time when the precursory auxiliary pole layer patterns 14AY and 14BY are formed, additional etching may be performed so as to selectively remove the remained mask layer 31.

Figure 10B:
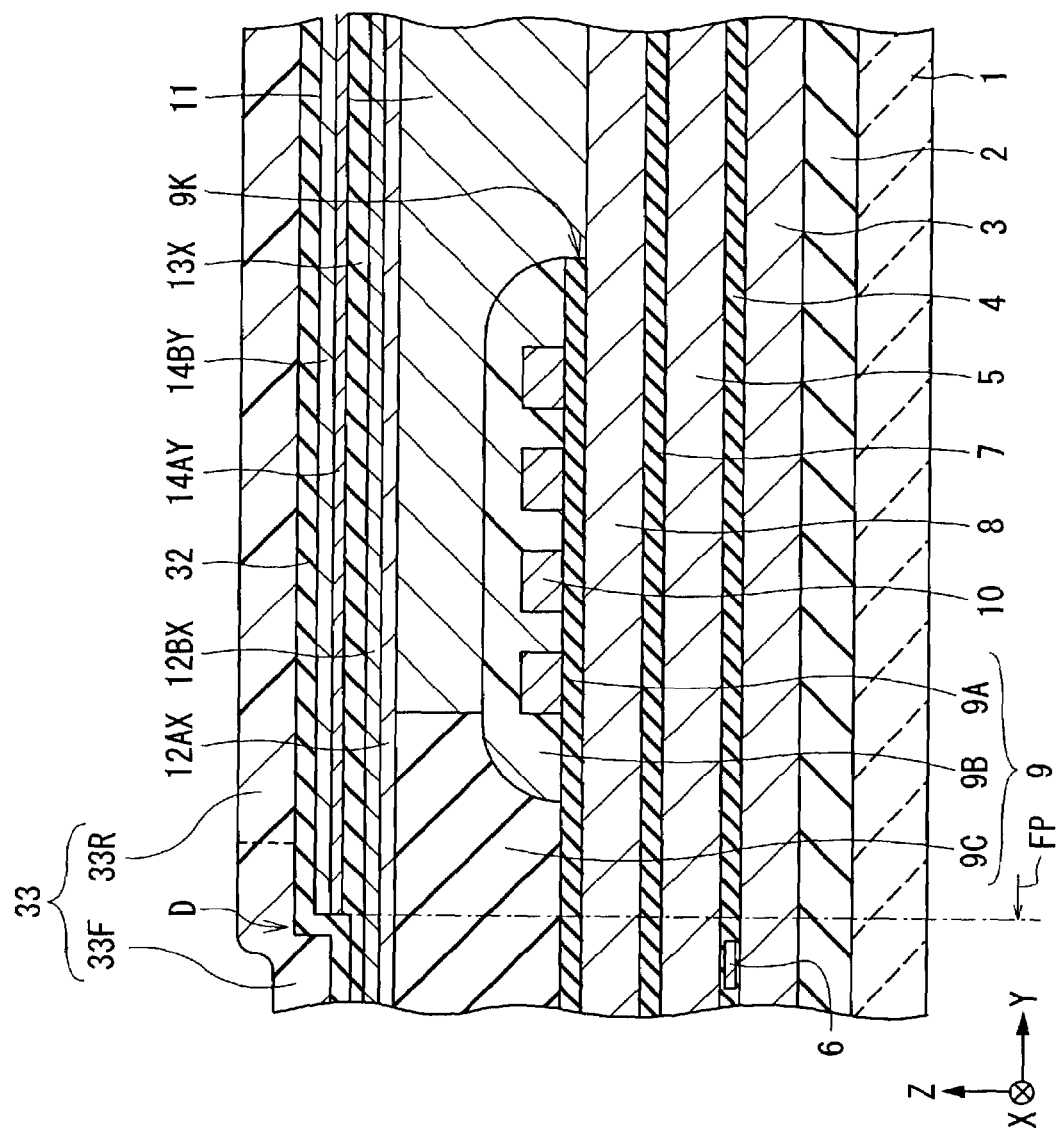
FIGS. 10A and 10B are sectional views for describing a step following the step of FIGS. 9A and 9B.
Figure 10A:
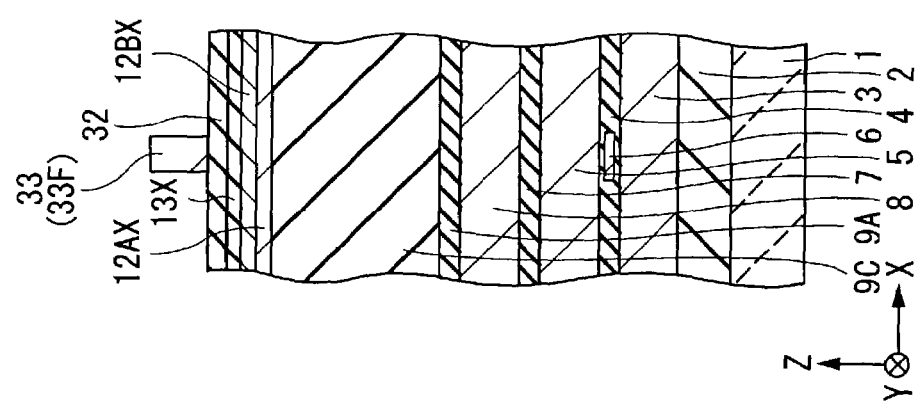
Figure 16:
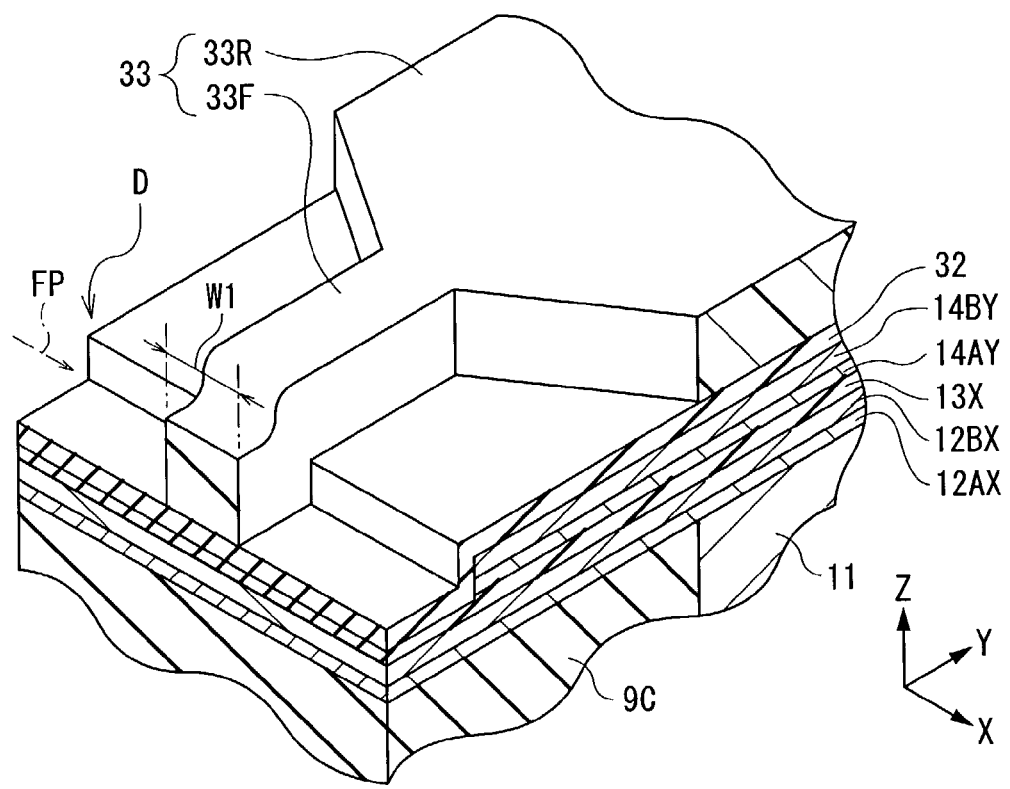
FIG. 16 is a perspective view corresponding to the sectional views shown in FIGS. 10A and 10B.

Next, as shown in FIGS. 10A, 10B and 16, the non-magnetic layer 32 made of, for example, alumina is formed through, for example, sputtering so as to coat an exposed surface of the precursory non-magnetic layer 13X and a surface of the precursory auxiliary pole layer pattern 14BY. The non-magnetic layer 32 is mainly used as a mask or a stopper when the precursory auxiliary pole layer patterns 14AY and 14BY and the precursory main pole layers 12AX and 12BX are patterned in a later step, and is formed so as to include a step portion D corresponding to a base structure comprising the precursory non-magnetic layer 13X and the precursory auxiliary pole layer patterns 14AY and 14BY.

Then, as shown in FIGS. 10A, 10B and 16, a mask layer 33 for etching is selectively formed of a photoresist film on the non-magnetic layer 32 through photolithography. The mask layer 33 is formed in a pattern shape including a front portion 33F with the same uniform width W1 as those of the front end portions 14A1 and 14B1 and a rear portion 33R with a larger width than that of the front portion 33F substantially corresponding to, for example, a plane shape of the auxiliary pole layer 14 (the bottom auxiliary pole layer 14A and the top auxiliary pole layer 14B) which is finally formed, and more specifically, the mask layer 33 is formed so that the front portion 33F extends rearward from a position where the air bearing surface 20 is formed in a later step through the step portion D.

Figures 11A, 11B:
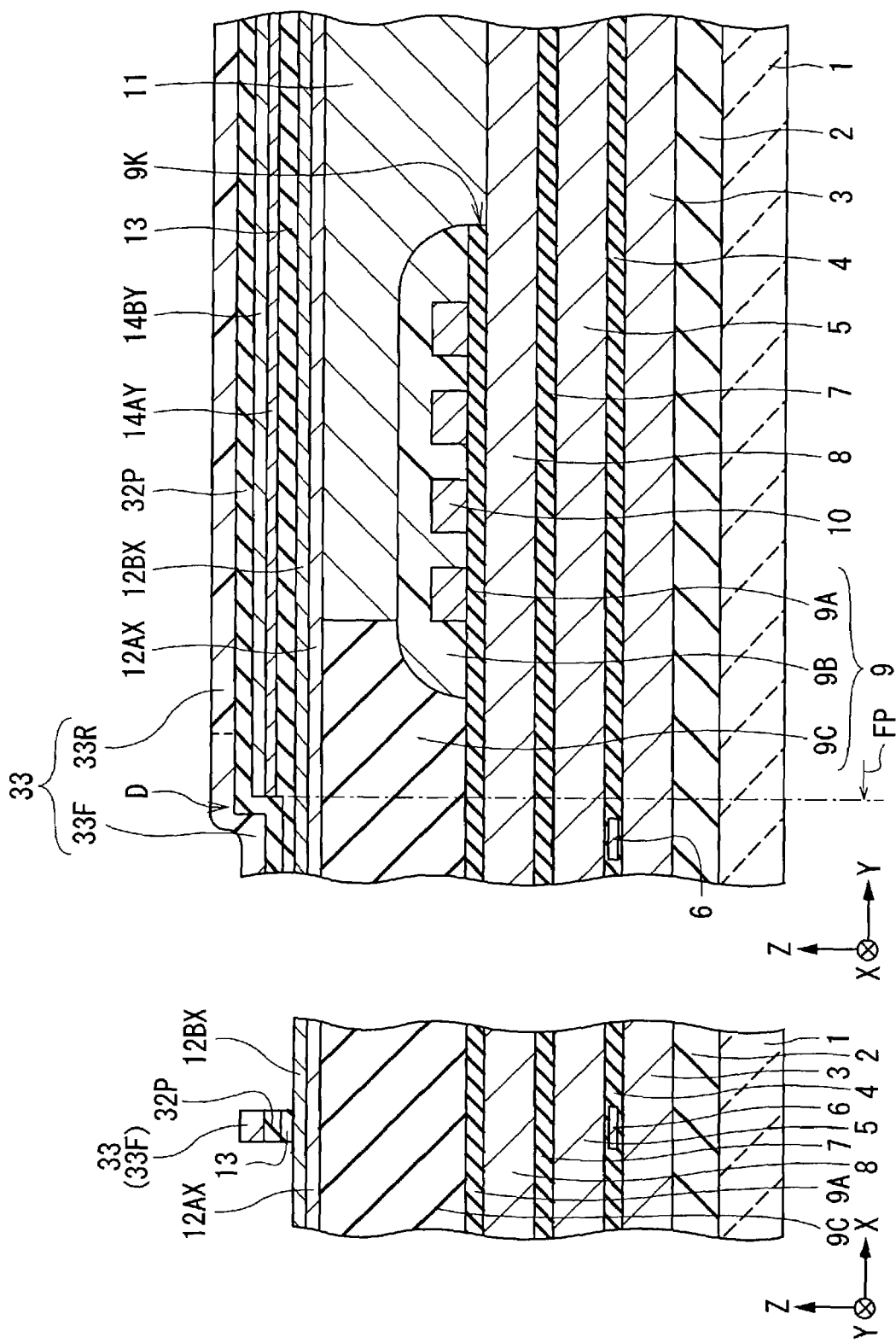
FIGS. 11A and 11B are sectional views for describing a step following the step of FIGS. 10A and 10B.
Figure 17:
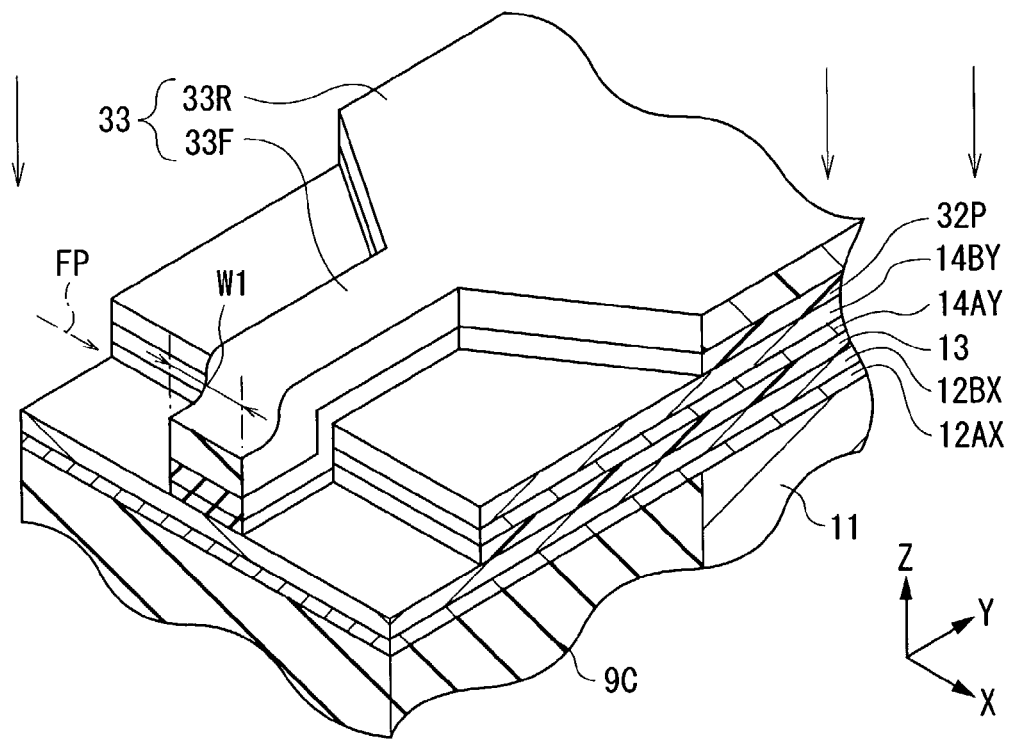
FIG. 17 is a perspective view corresponding to the sectional views shown in FIGS. 11A and 11B.

Then, the whole surface is etched through, for example, reactive ion etching (RIE) by use of the mask layer 33. As shown in FIGS. 11A, 11B and 17, the non-magnetic layer 32 is patterned through the etching so as to form substantially the same pattern shape as the mask layer 33, thereby the non-magnetic layer pattern 32P is formed.

Next, the whole surface is etched through, for example, RIE by use of the mask layer 33, the non-magnetic layer pattern 32P and the precursory auxiliary pole layer patterns 14AY and 14BY as masks so as to pattern the precursory non-magnetic layer 13X. As shown in FIGS. 11A, 11B and 17, a region of the precursory non-magnetic layer 13X except for a portion corresponding to the front portion 33F of the mask layer 33 in a region frontward of the flare point FP is selectively removed through the etching so as to form the non-magnetic layer 13. The mask layer 33 is also etched through the etching so that the thickness thereof is reduced.

Figure 12B:
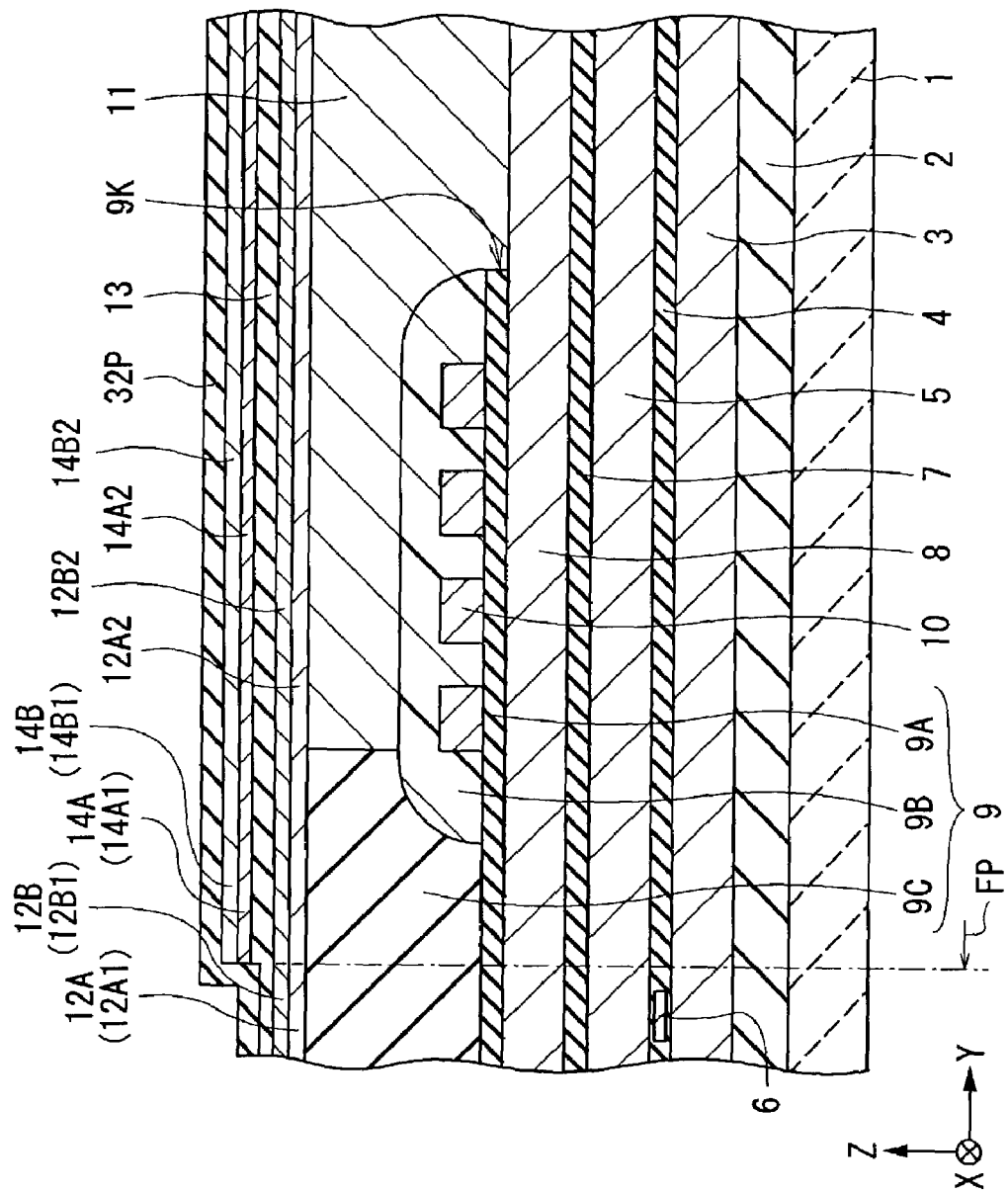
FIGS. 12A and 12B are sectional views for describing a step following the step of FIGS. 11A and 11B.
Figure 12A:
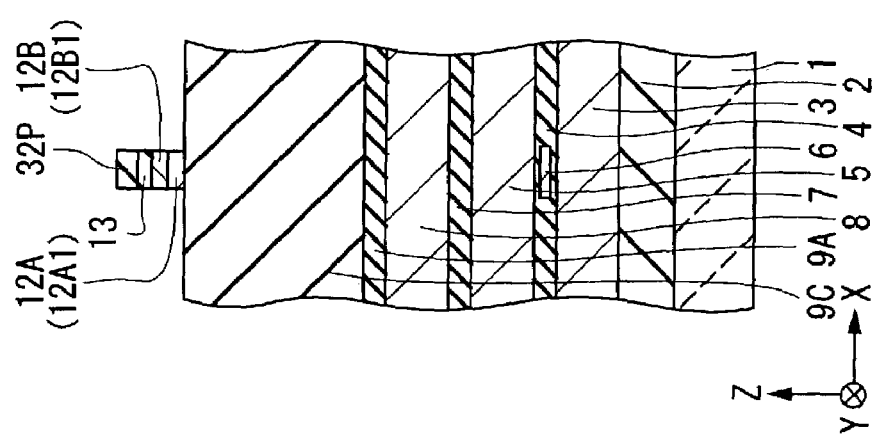
Figure 18:
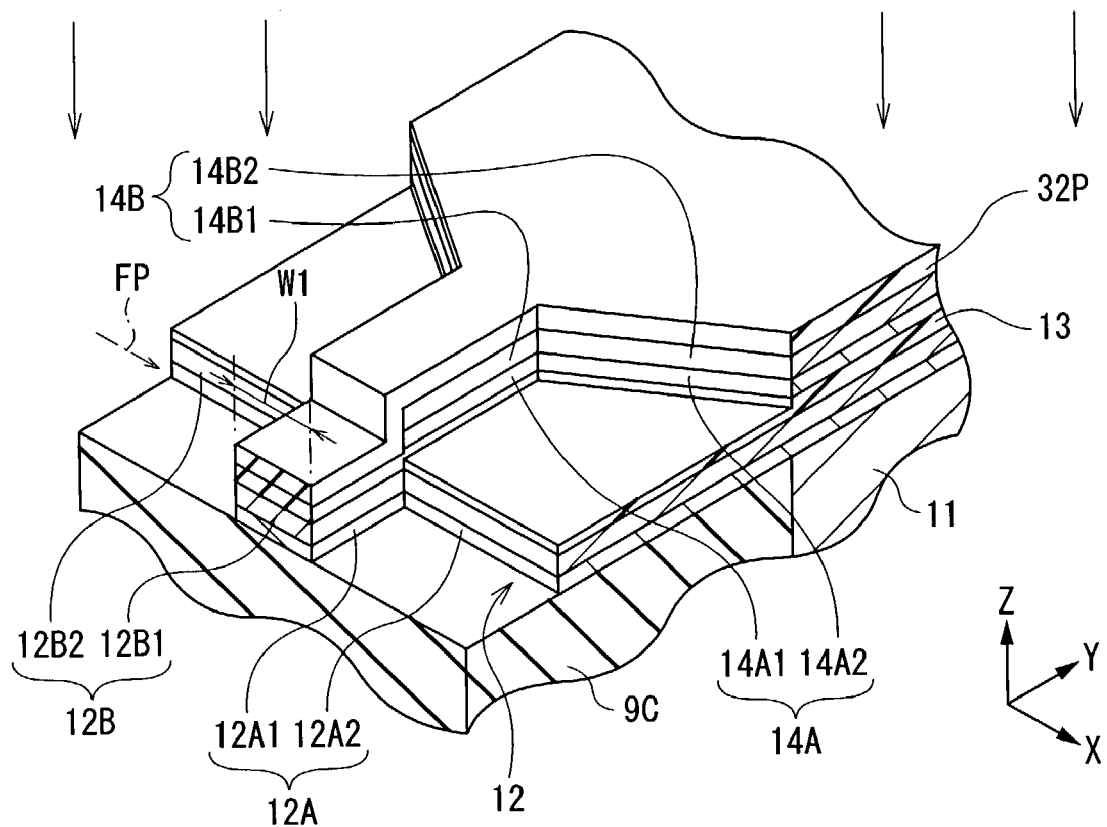
FIG. 18 is a perspective view corresponding to the sectional views shown in FIGS. 12A and 12B.

Then, the whole surface is continued to be etched through, for example, ion milling by use of the mask layer 33 and the non-magnetic layer pattern 32P as masks so as to pattern the precursory auxiliary pole layer patterns 14AY and 14BY. As shown in FIGS. 12A, 12B and 18, regions of the precursory auxiliary pole layer patterns 14AY and 14BY except for a portion corresponding to the mask layer 33 in a region rearward of the flare point FP is selectively removed through the etching, thereby, the bottom auxiliary pole layer 14A is formed so as to include the front end portion 14A1 and the rear end portion 14A2 in order from the flare point FP, and the top auxiliary pole layer 14B is formed so as to include the front end portion 14B1 and the rear end portion 14B2. At the same time when the bottom auxiliary pole layer 14A and the top auxiliary pole layer 14B are formed, the precursory main pole layers 12AX and 12BX are patterned by use of the mask layer 33, the non-magnetic layer pattern 32P and the precursory auxiliary pole layer patterns 14AY and 14BY as masks. Regions of the precursory main pole layers 12AX and 12BX except for a portion corresponding to the front portion 33F of the mask layer 33 in a region frontward of the flare point FP are selectively removed through the etching, thereby, the bottom main pole layer 12A is formed so as to include the front end portion 12A1 and the rear end portion 12A2 magnetically coupled to each other at the flare point FP, and the top main pole layer 12B is formed so as to include the front end portion 12B1 and the rear end portion 12B2. Thereby, the auxiliary pole layer 14 comprising a laminate including the bottom auxiliary pole layer 14A and the top auxiliary pole layer 14B and the main pole layer 12 comprising a laminate including the bottom main pole layer 12A and the top main pole layer 12B are formed so as to complete the laminate including the main pole layer 12 (the bottom main pole layer 12A and the top main pole layer 12B), the non-magnetic layer 13 and the auxiliary pole layer 14 (the bottom auxiliary pole layer 14A and the top auxiliary pole layer 14B). When the auxiliary pole layer 14 (the bottom auxiliary pole layer 14A and the top auxiliary pole layer 14B) is formed, the non-magnetic layer 13 functions as a stopper layer for etching, so a region of the non-magnetic layer 13 except for a portion corresponding to the non-magnetic layer pattern 32P is selectively dug down in partway. FIGS. 12A, 12B and 18 show a state that the mask layer 33 disappears through etching so that the non-magnetic layer pattern 32P is exposed.

Figures 13A, 13B:
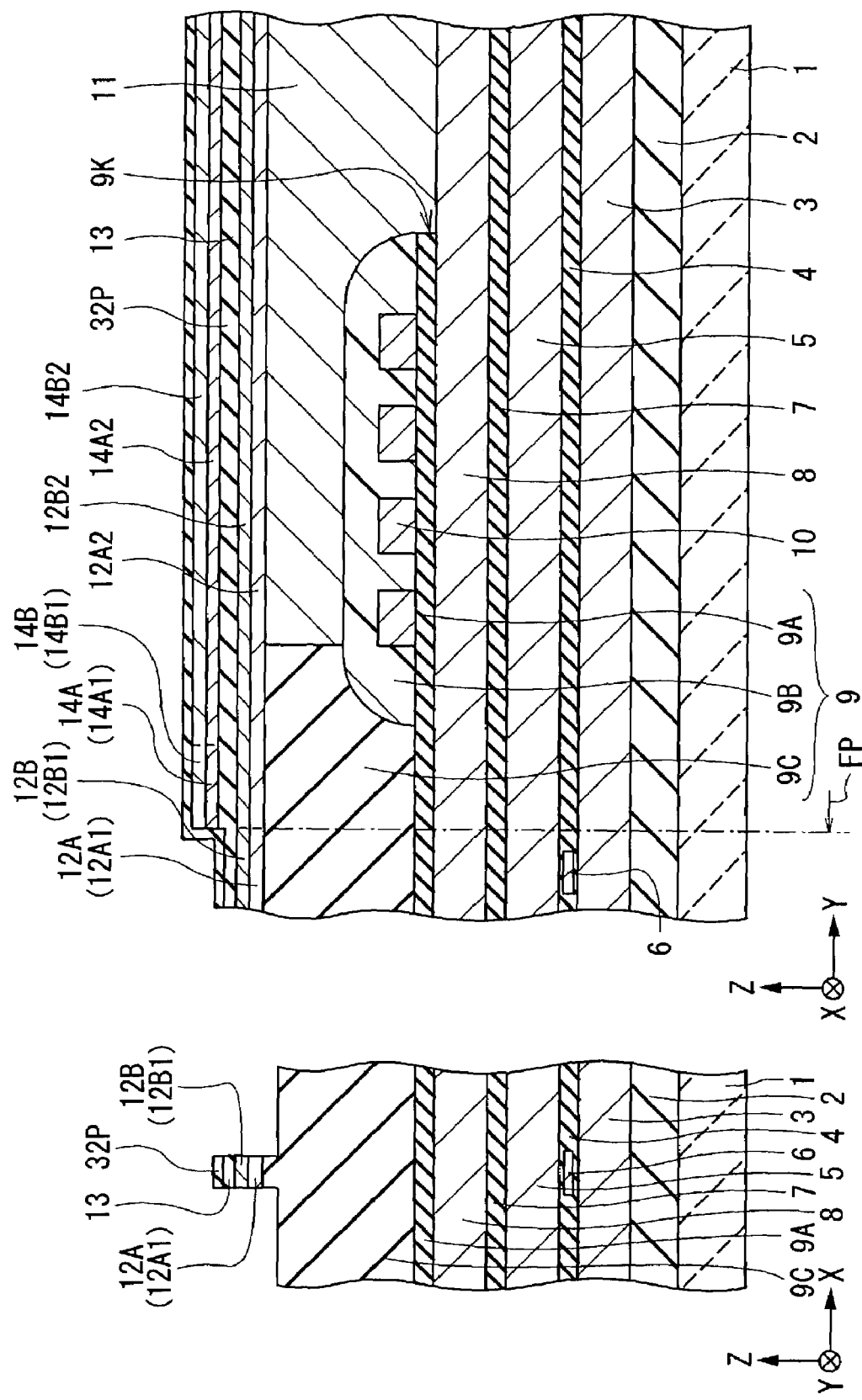
FIGS. 13A and 13B are sectional views for describing a step following the step of FIGS. 12A and 12B.

Finally, the whole surface is subsequently etched by use of the non-magnetic layer pattern 32P as a mask. As shown in FIGS. 13A, 13B and 2, through etching, the non-magnetic layer pattern 32P is etched and is reduced, and the gap layer portion 9C in the neighborhood of the front end portions 12A1 and 12B1 in a region frontward of the flare point FP is selectively dug down. Thereby, the laminate including the main pole layer 12, the non-magnetic layer 13 and the auxiliary pole layer 14 is completed.

In the above paragraphs, for convenience in description, it is described that the main pole layer 12 (the bottom main pole layer 12A and the top main pole layer 12B), the non-magnetic layer 13 and the auxiliary pole layer 14 (the bottom auxiliary pole layer 14A and the top auxiliary pole layer 14B) are completed at the time when patterning though etching is completed, however, in actuality, after patterning of the precursory main pole layers 12AX and 12BX, the precursory non-magnetic layer 13X and the precursory auxiliary pole layer patterns 14AY and 14BY is completed, the main pole layer 12, the non-magnetic layer 13 and the auxiliary pole layer 14 are finally completed through a step of forming the air bearing surface 20.

As described above, in the method of manufacturing the thin film magnetic head according to the embodiment, specifically as a method of forming the main pole layer 12 comprising the laminate including the bottom main pole layer 12A with the first saturated magnetic flux density J1 and the top main pole layer 12B with the second saturated magnetic flux density J2 larger than the first saturated magnetic flux density J1 in the laminate including the main pole layer 12, the non-magnetic layer 13 and the auxiliary pole layer 14, only the existing thin film processes including film formation techniques, patterning techniques and etching techniques are used, so the thin film magnetic head according to the embodiment which has a characteristic structure mainly in the main pole layer 12 and is capable of reducing expansion and bending of the recording pattern resulting from the skew can be easily manufactured.

In the embodiment, as an etching technique for patterning, ion milling or RIE is used, but it is not necessarily limited to this technique. For example, RIE may be used instead of ion milling, or ion milling may be used instead of RIE. Further, only either of ion milling or RIE may be used for all patterning steps.

Further, in the embodiment, after the precursory main pole layers 12AX and 12BX are formed, the precursory main pole layers 12AX and 12BX are patterned by use of the mask layers 31 and 33 and so on so as to form the bottom main pole layer 12A and the top main pole layer 12B, but it is not necessarily limited to this technique. For example, the bottom main pole layer 12A and the top main pole layer 12B may be formed through plating instead of the above forming technique.

[Second Embodiment]

Next, a second embodiment of the invention will be described below.

Figures 19A, 19B:
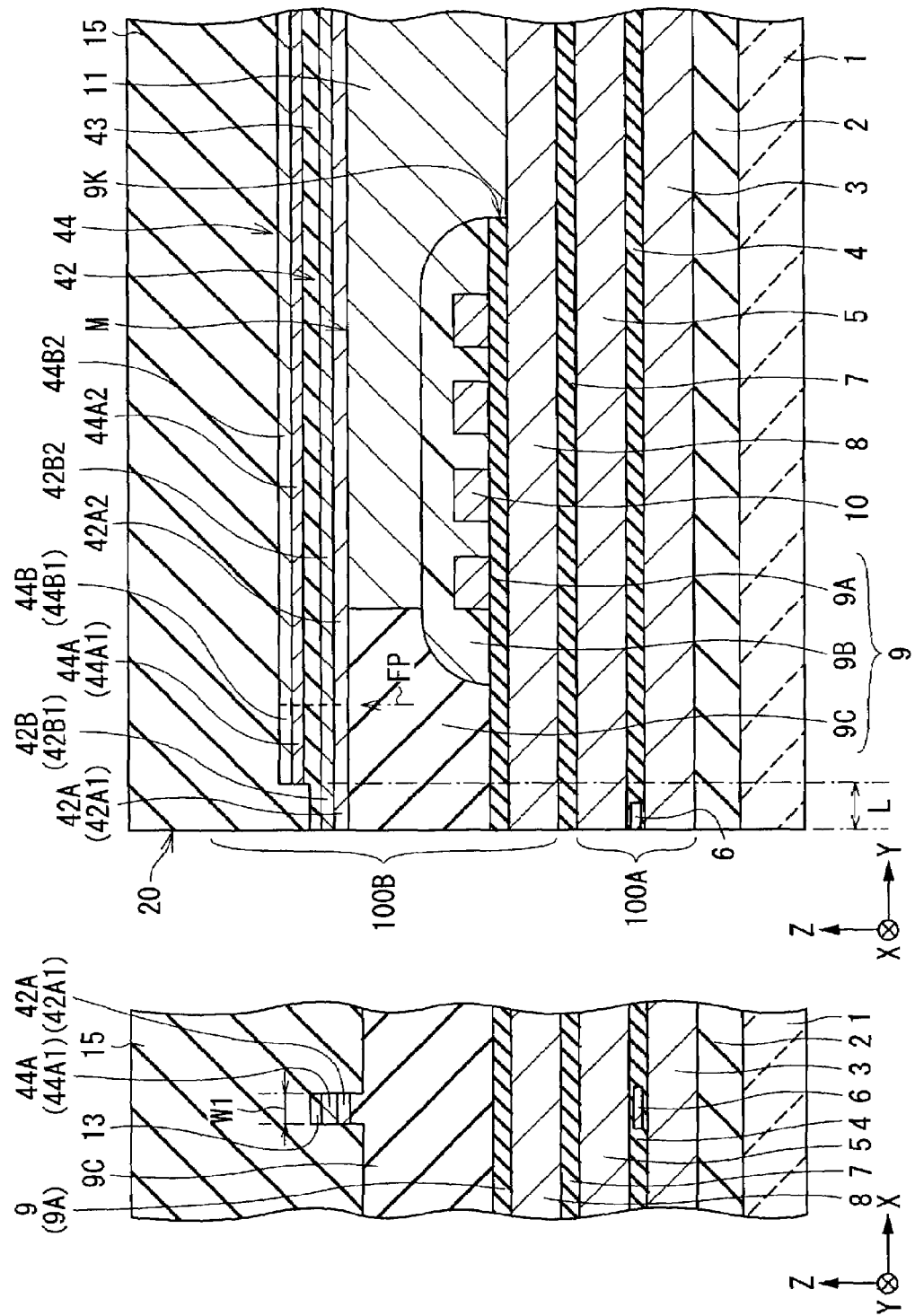
FIGS. 19A and 19B are sectional views of a thin film magnetic head according to a second embodiment of the invention.
Figure 20:
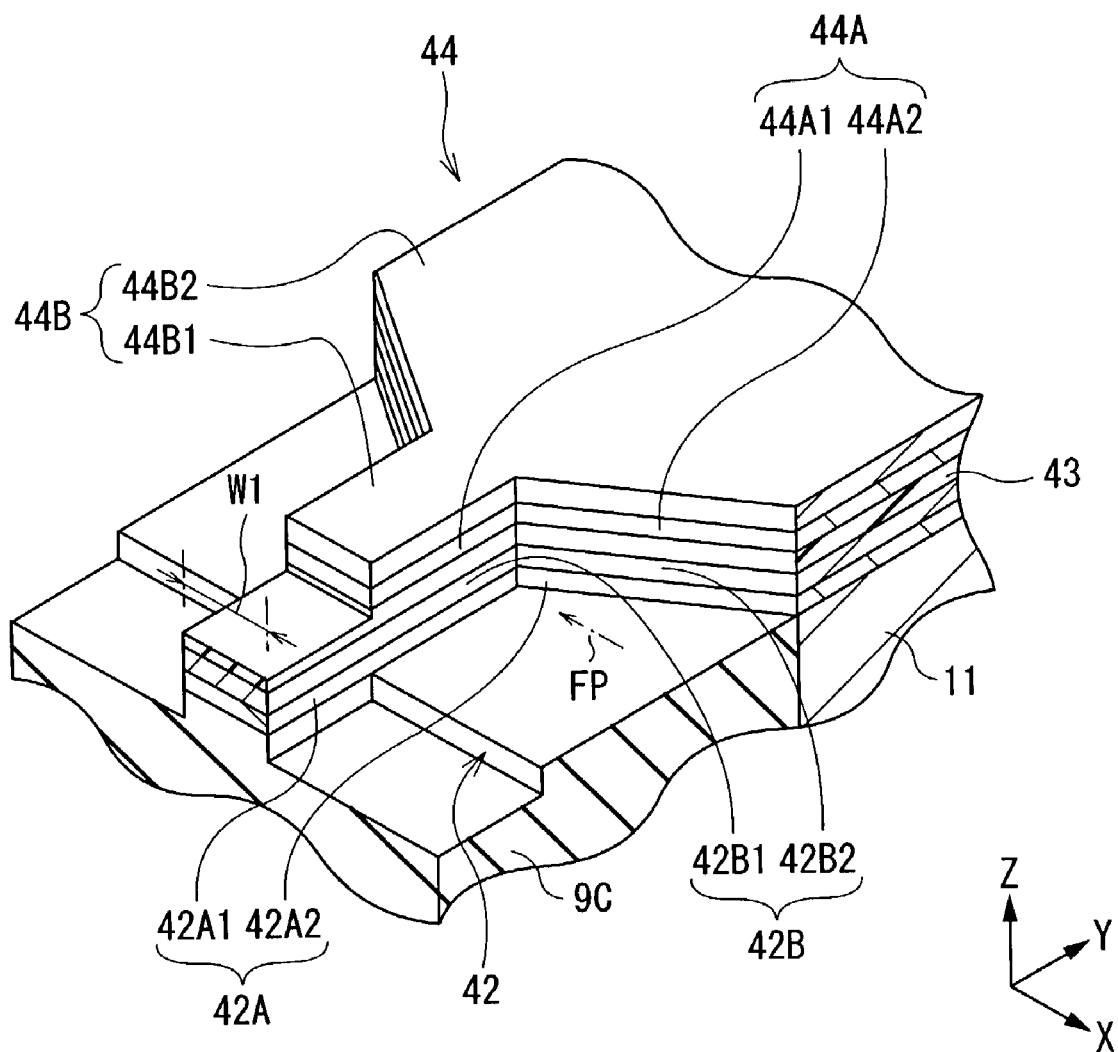
FIG. 20 is an enlarged perspective view of a main part of the thin film magnetic head shown in FIGS. 19A and 19B.
Figure 21:
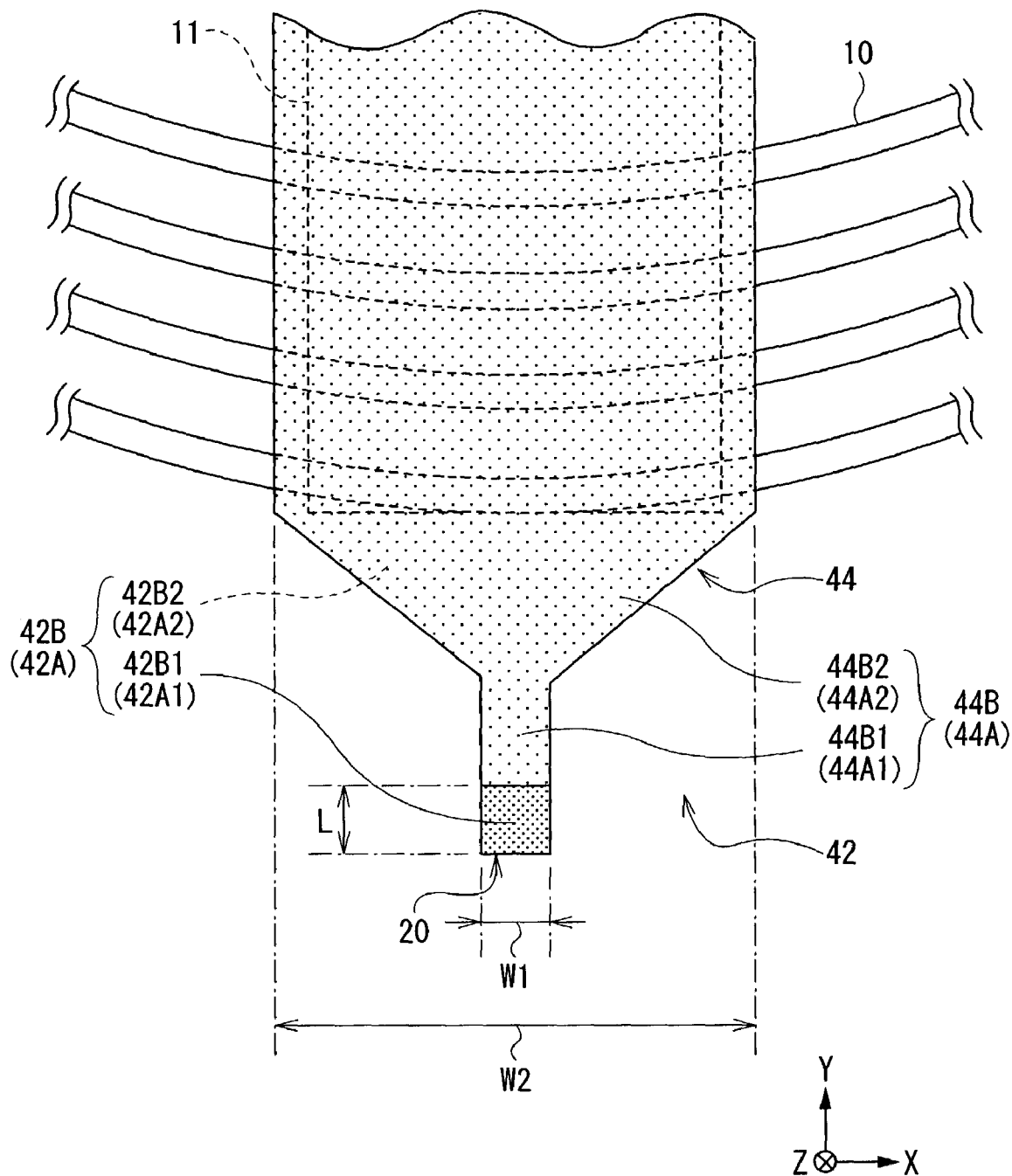
FIG. 21 is an enlarged plan view of the main part of thin film magnetic head shown in FIGS. 19A and 19B.

FIGS. 19A and 19B show sectional views of a thin film magnetic head according to the embodiment. FIG. 19A shows a sectional view parallel to the air bearing surface, and FIG. 19B shows a sectional view perpendicular to the air bearing surface. FIGS. 20 and 21 show an enlarged perspective view and an enlarged plan view of a main part of the thin film magnetic head shown in FIGS. 19A and 19B.

The thin film magnetic head has a structure equivalent to that of the first embodiment except that the recording head 100B comprises a laminate including a main pole layer 42 (a bottom main pole layer 42A and a top main pole layer 42B), a non-magnetic layer 43 and an auxiliary pole layer 44 (a bottom auxiliary pole layer 44A and a top auxiliary pole layer 44B) instead of the laminate including the main pole layer 12 (the bottom main pole layer 12A and the top main pole layer 12B), the non-magnetic layer 13 and the auxiliary pole layer 14 (the bottom auxiliary pole layer 14A and the top auxiliary pole layer 14B) described in the first embodiment. Herein, a laminate including the main pole layer 42, the non-magnetic layer 43 and the auxiliary pole layer 44 in this order corresponds to a specific example of "a pole layer" in the invention.

The main pole layer 42 corresponds to the main pole layer 12 in the first embodiment, and comprises two portions which form the same plane shapes, that is, the bottom main pole layer 42A disposed on the medium-incoming side and the top main pole layer 42B disposed on the medium-outgoing side laminated in this order. As in the case of the bottom main pole layer 12A and the top main pole layer 12B described in the first embodiment, the bottom main pole layer 42A is made of a material with the first saturated magnetic flux density J1 (approximately 1.0 T to 1.8 T), and the top main pole layer 42B is made of a material with the second saturated magnetic flux density J2 (approximately 2.0 T or over) larger than the first saturated magnetic flux density J1. Herein, the bottom main pole layer 42A corresponds to a specific example of "a first main pole layer portion" in the invention, and the top main pole layer 42B corresponds to a specific example of "a second main pole layer portion" in the invention.

The bottom main pole layer 42A includes, for example, a front end portion 42A1 and a rear end portion 42A2 in order from the air bearing surface 20, and the top main pole layer 42B includes, for example, a front end portion 42B1 and a rear end portion 42B2 corresponding to the front end portion 42A1 and the rear end portion 42A2 constituting the bottom main pole layer 42A, respectively. The front end portions 42A1 and 42B1 have the uniform width W1 determining the recording track width of the recording medium. The rear end portions 42A2 and 42B2 have a width which gradually increases in a front portion and a uniform width (W2) in a rear portion. The flare point FP is determined by front edges of the rear end portions 42A2 and 42B2. Herein, an aggregate of the front end portions 42A1 and 42B1 corresponds to a specific example of "a uniform width portion" in the invention.

The auxiliary pole layer 44 corresponds to the auxiliary pole layer 14 in the first embodiment, and has substantially the same structure as that of the auxiliary pole layer 14. In other words, the auxiliary pole layer 44 is disposed in a region recessed by the recessed distance L (=approximately 0.2 µm to 1.0 µm) from the air bearing surface 20 on the medium-outgoing side of the main pole layer 42, and comprises a laminate including two portions which form the same plane shapes, that is, the bottom auxiliary pole layer 44A disposed on the medium-incoming side and the top auxiliary pole layer 44B disposed on the medium-outgoing side in this order. As in the case of the bottom auxiliary pole layer 14A and the top auxiliary pole layer 14B described in the first embodiment, the top auxiliary pole layer 44B is made of a material with the third saturated magnetic flux density J3, for example, a material with the first saturated magnetic flux density J1 as in the case of the bottom main pole layer 42A, and the bottom auxiliary pole layer 44A is made of a material with the fourth saturated magnetic flux density J4 larger than the third saturated magnetic flux density J3, for example, a material with a saturated magnetic flux density larger than the first saturated magnetic flux density J1 and equal to the second saturated magnetic flux density J2. Herein, the top auxiliary pole layer 44B corresponds to a specific example of "a first auxiliary pole layer portion" in the invention, and the bottom auxiliary pole layer 44A corresponds to a specific example of "a second auxiliary pole layer portion" in the invention.

The bottom auxiliary pole layer 44A includes, for example, a front end portion 44A1 and a rear end portion 44A2 in order from the air bearing surface 20, and the top auxiliary pole layer 44B includes, for example, a front end portion 44B1 and a rear end portion 44B2 corresponding to the front end portion 44A1 and the rear end portion 44A2, respectively. A position where the width of the auxiliary pole layer 44 increases, that is, a position where the front end portions 44A1 and 44B1 are connected with the rear end portions 44A2 and 44B2 coincides with, for example, the flare point of the main pole layer 42.

The non-magnetic layer 43 has the same function as that of the non-magnetic layer 13 in the first embodiment, and has substantially the same plane shape as the main pole layer 42. The auxiliary pole layer 44 is separated from the main pole layer 42 by the non-magnetic layer 43.

Next, referring FIGS. 19A through 21, actions of the thin film magnetic head will be described below.

In the thin film magnetic head, mainly the same recording action as that of the first embodiment is performed. In other words, when magnetic flux is generated in the thin film coil 10, the magnetic flux is contained in the main pole layer 42, and is also contained in the auxiliary pole layer 44 through the non-magnetic layer 43. In accordance with a decreasing width of the main pole layer 42 (W2 to W1), magnetic flux saturation occurs in the bottom main pole layer 42A with a smaller saturated magnetic flux density, however, no magnetic flux saturation occurs in the top main pole layer 42B with a larger saturated magnetic flux density, so the magnetic flux contained in the main pole layer 42 flows in the top main pole layer 42B on a priority basis, and the magnetic flux flows into the front end portion 42B1. On the other hand, as in the case of the main pole layer 42, magnetic flux saturation occurs in the top auxiliary pole layer 44B with a smaller saturated magnetic flux density, however, no magnetic flux saturation occurs in the bottom auxiliary pole layer 44A with a larger saturated magnetic flux density, so after the magnetic flux contained in the auxiliary pole layer 44 flows in the bottom auxiliary pole layer 44A on a priority basis so as to be concentrated on the front end portion 44A1, the magnetic flux passes through the non-magnetic layer 43 again so as to flow into the front end portion 42B1 of the top main pole layer 42B. The magnetic flux flowing into the front end portion 42B1 is concentrated mainly on a trailing side portion of the front end portion 42B1. The magnetic flux concentrated on the trailing side portion of the front end portion 42B1 is emitted so as to generate a perpendicular magnetic field, thereby information is recorded on the recording medium by the perpendicular magnetic field.

In the thin film magnetic head according to the embodiment, the main pole layer 42 comprises a laminate including the bottom main pole layer 42A being disposed on the medium-incoming side and having the first saturated magnetic flux density J1 and the top main pole layer 42B being disposed on the medium-outgoing side and having the second saturated magnetic flux density J2 larger than the first saturated magnetic flux density J1, so writing by the main pole layer 42 is performed mainly by the front end portion 42B1 of the top main pole layer 42B with a larger saturated magnetic flux density, but not by the front end portion 42A1 of the bottom main pole layer 42A with a smaller saturated magnetic flux density. Therefore, in the embodiment, by the same effects as those in the first embodiment, substantial expansion of the recording track width when the skew occurs is reduced, thereby expansion and bending of the recording pattern are reduced, so recording performance can be improved.

The structure, actions, functions, effects and modifications in the embodiment are equivalent to those in the first embodiment, except for the above-described characteristic part.

Figure 25B:
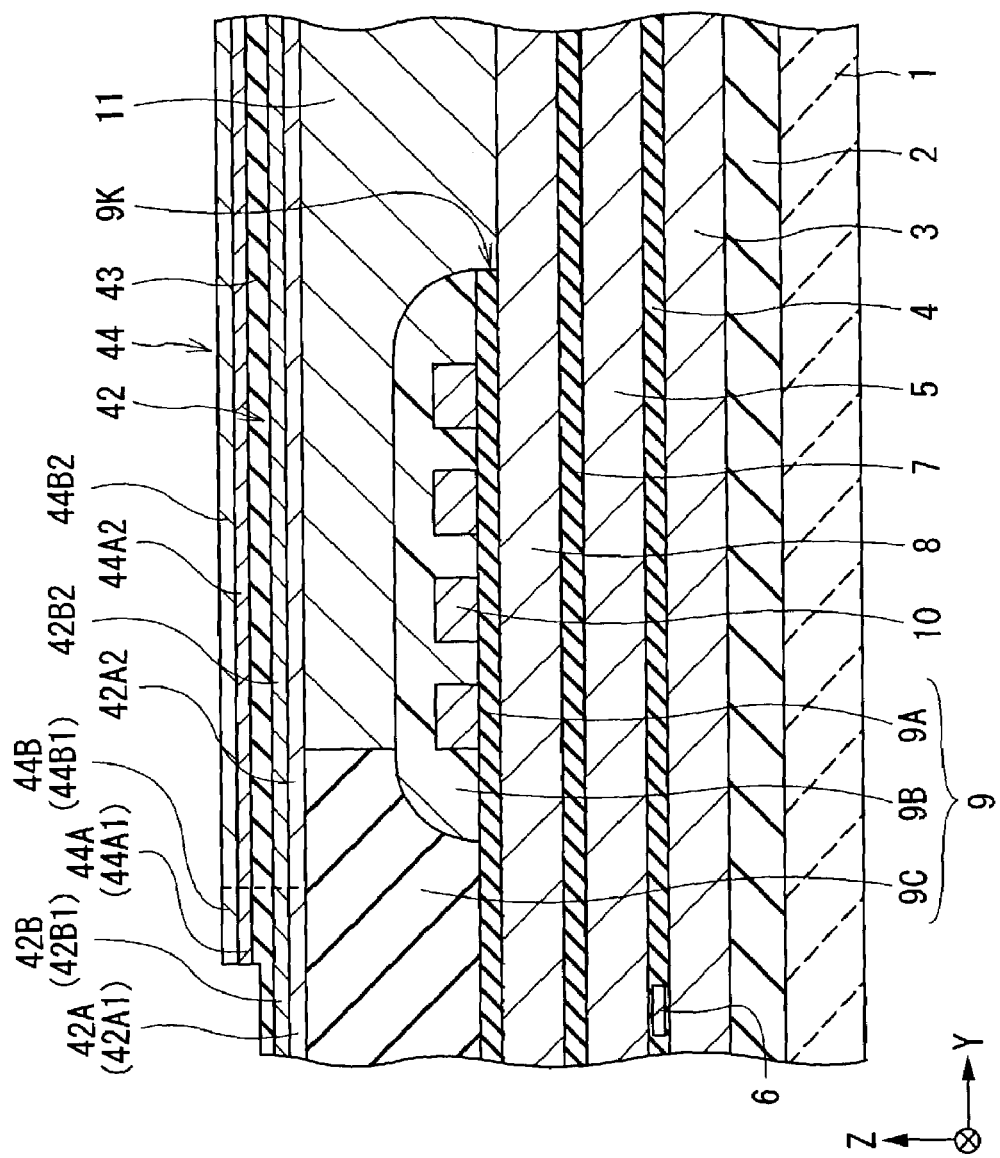
FIGS. 25A and 25B are sectional views for describing a step following the step of FIGS. 24A and 24B.
Figure 25A:
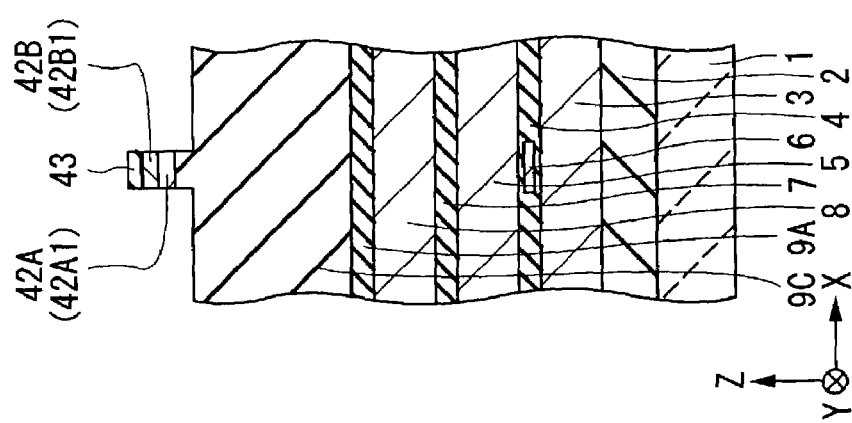
Figure 26:
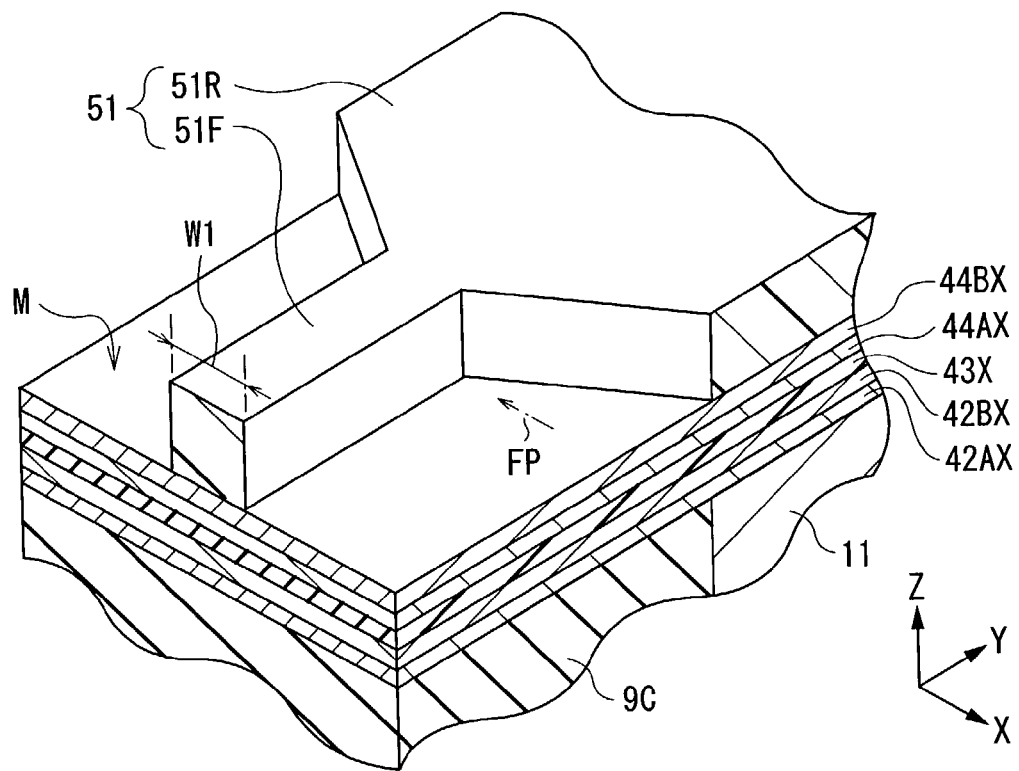
FIG. 26 is a perspective view corresponding to the sectional views shown in FIGS. 22A and 22B.
Figure 27:
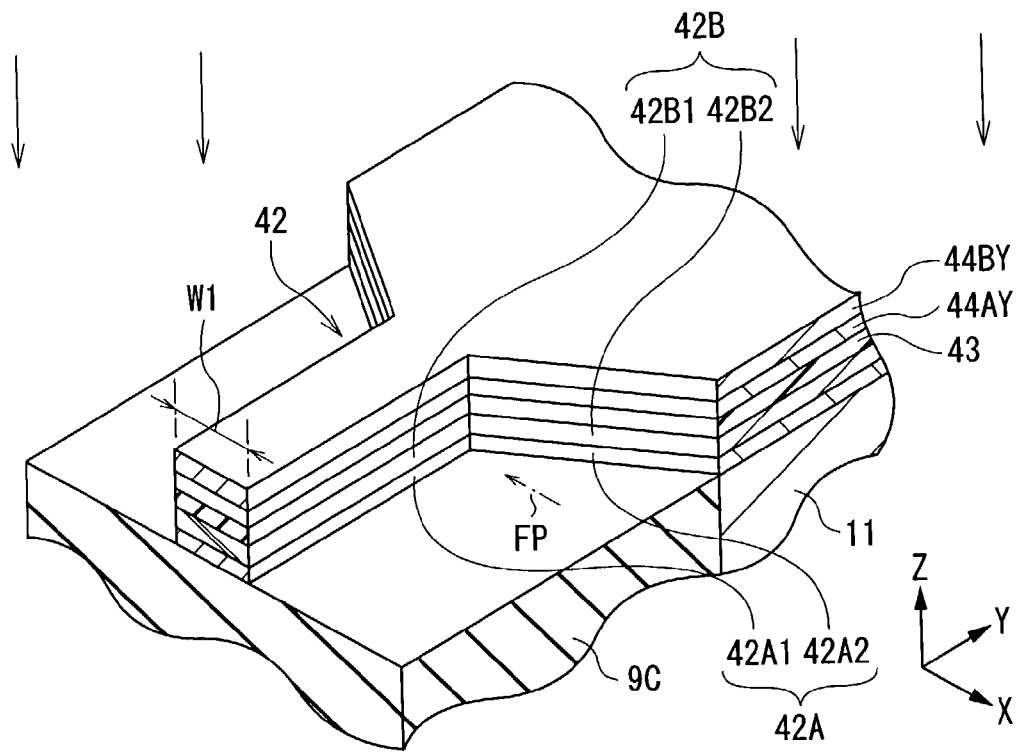
FIG. 27 is a perspective view corresponding to the sectional views shown in FIGS. 23A and 23B.
Figure 28:
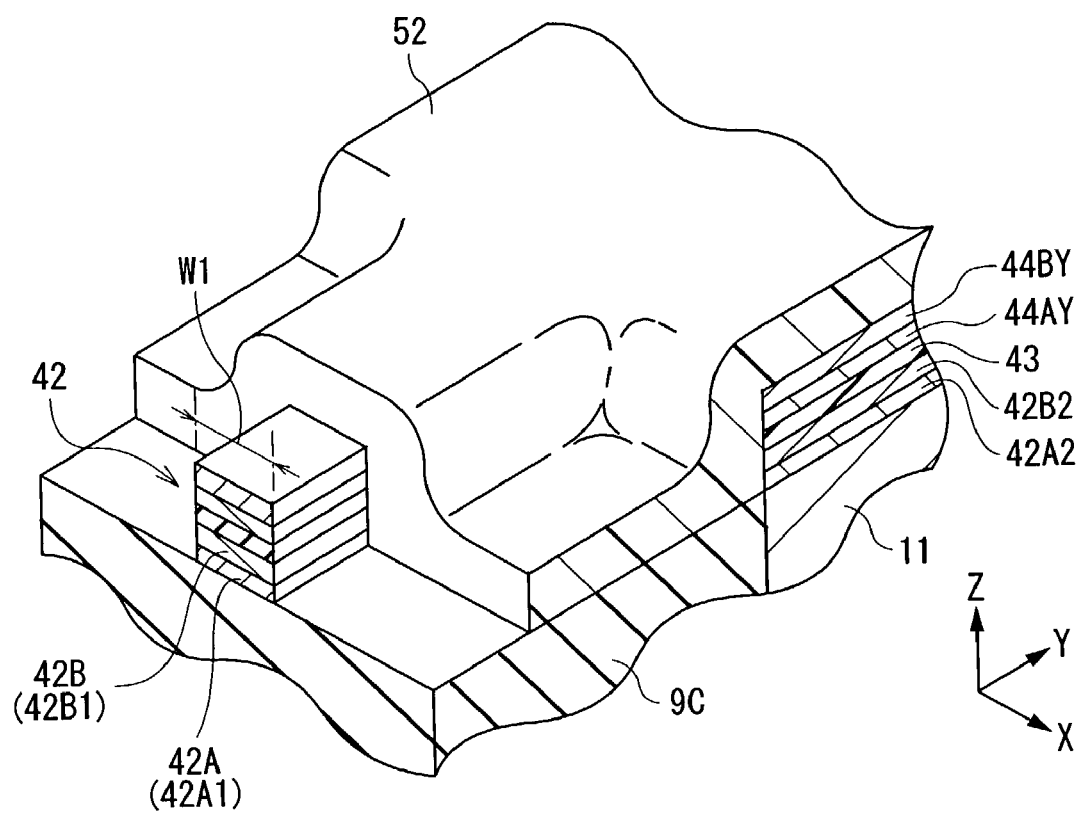
FIG. 28 is a perspective view corresponding to the sectional views shown in FIGS. 24A and 24B.

Next, referring FIGS. 19A through 28, a method of manufacturing the thin film magnetic head according to the embodiment will be described below. FIGS. 22A through 25B show sectional views of each step in the method of manufacturing the thin film magnetic head, and FIGS. 26 through 28 show perspective views corresponding to FIGS. 22A and 22B through 24A and 24B, respectively. Only a method of forming a main part of the thin film magnetic head to which the method of manufacturing the thin film magnetic head according to the invention is applied will be described below, and in the description, materials, forming positions and structural characteristics of components will not be further described.

Figures 22A, 22B:
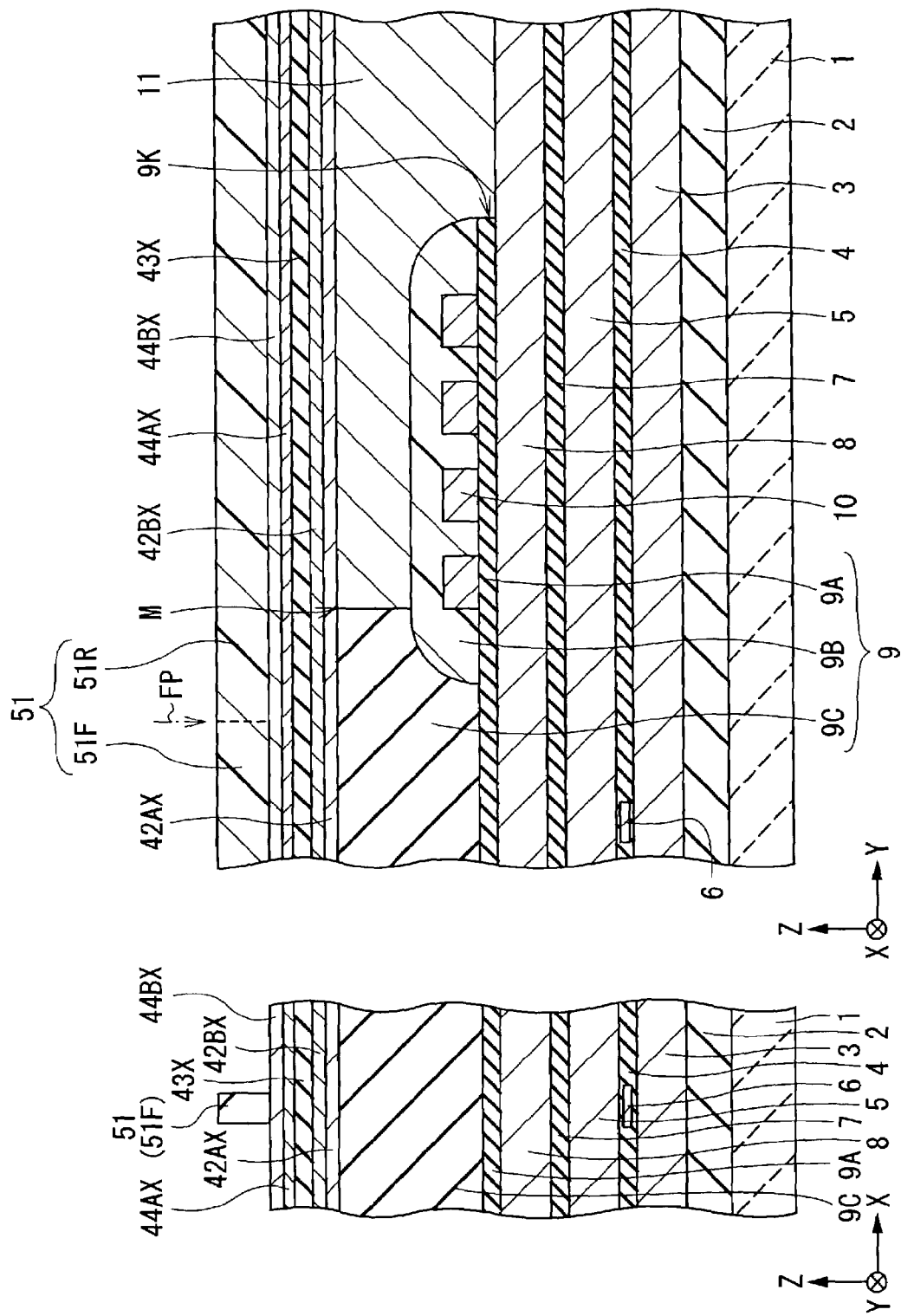
FIGS. 22A and 22B are sectional views for describing one step in a method of manufacturing the thin film magnetic head according to the second embodiment of the invention.

When the main part of the thin film magnetic head is formed, after the yoke 11 is formed so that the yoke 11 and the gap layer portion 9C constitute the flat surface M, at first, as shown in FIGS. 22A, 22B and 26, a precursory main pole layer 42AX, a precursory main pole layer 42BX, a precursory non-magnetic layer 43X made of, for example, alumina or the like, a precursory auxiliary pole layer 44AX and a precursory auxiliary pole layer 44BX are formed and laminated in this order on the flat surface M through, for example, sputtering. As a material of the precursory main pole layer 42AX, a material with the first saturated magnetic flux density J1 (approximately 1.0 T to 1.8 T) is used, and as a material of the precursory main pole layer 42BX, a material with the second saturated magnetic flux density J2 larger than the first saturated magnetic flux density J1 is used. Further, as a material of the precursory auxiliary pole layer 44BX, a material with the third saturated magnetic flux density J3 is used, and as a material of the precursory auxiliary pole layer 44AX, a material with the fourth saturated magnetic flux density J4 larger than the third saturated magnetic flux density J3, for example, a material with a saturated magnetic flux density larger than the first saturated magnetic flux density J1, more specifically equal to the second saturated magnetic flux density J2 is used. Herein, the above-described precursory layers correspond to precursory layers in the invention. More specifically, the precursory main pole layer 42AX, the precursory main pole layer 42BX, the precursory non-magnetic layer 43X, the precursory auxiliary pole layer 44AX and the precursory auxiliary pole layer 44BX correspond to specific examples of "a first precursory main pole layer", "a second precursory main pole layer", "a precursory non-magnetic layer", "a second precursory auxiliary pole layer" and "a first precursory auxiliary pole layer" in the invention, respectively.

Next, after a photoresist film (not shown) is formed on the precursory auxiliary pole layer 44BX, the photoresist film is patterned through photolithography so as to selectively form a mask layer 51 for etching as shown in FIGS. 22A, 22B and 26. The mask layer 51 is formed in a pattern shape corresponding to, for example, the plane shape of the main pole layer 42 (the bottom main pole layer 42A and the top main pole layer 42B) which is finally formed and including a front portion 51F with the same uniform width W1 as those of the front end portions 42A1 and 42B1 and a rear portion 51R with a larger width than that of the front portion 51F, and more specifically, the mask layer 51 is formed so that the forming position of the mask layer 51 is adjusted so that a position where the front portion 51F is connected with the rear portion 51R coincides with the flare point FP through adjusting an exposed area in the photoresist film during the photolithography. Herein, the mask layer 51 corresponds to a specific example of "a first mask layer" in the invention.

Figures 23A, 23B:
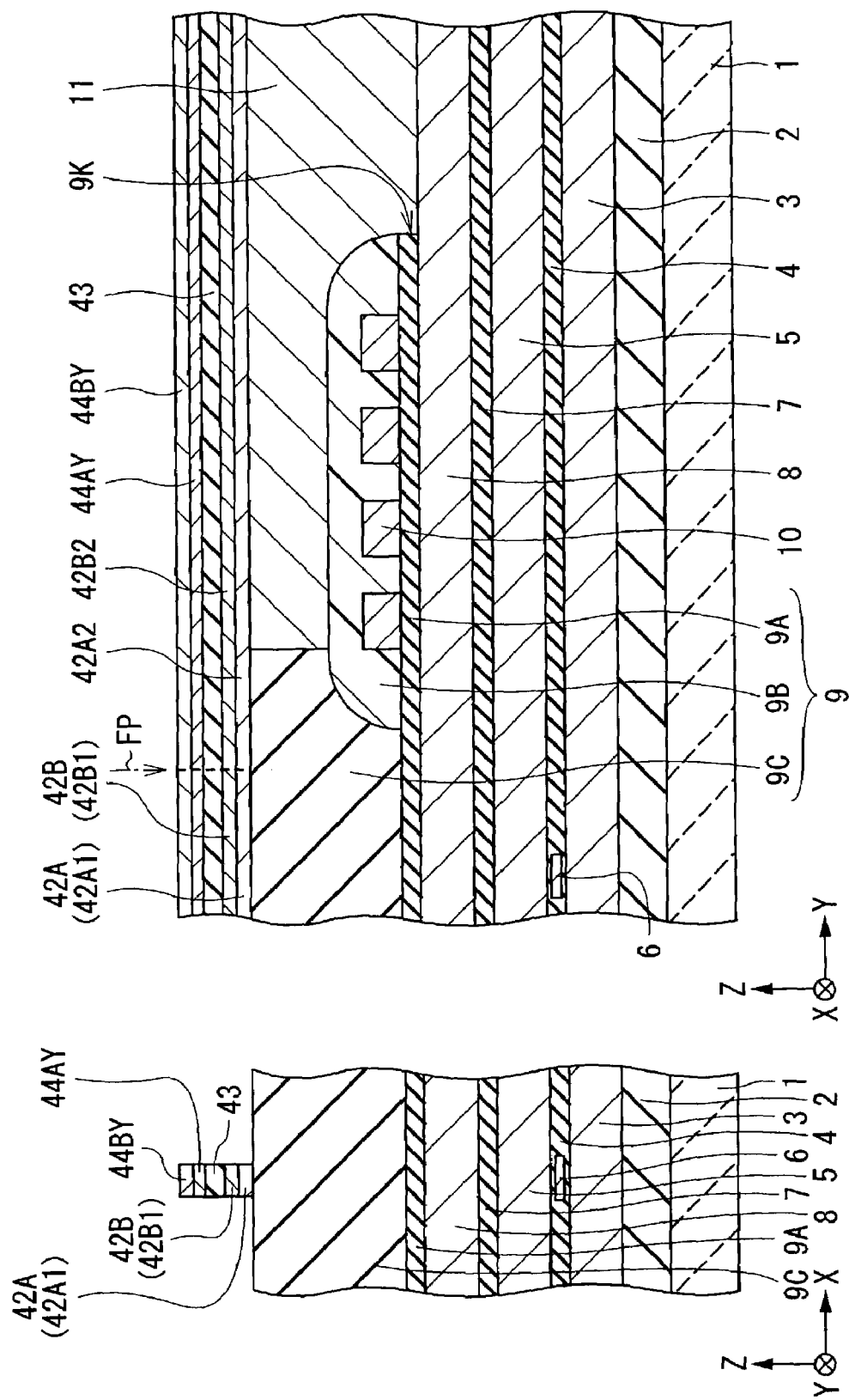
FIGS. 23A and 23B are sectional views for describing a step following the step of FIGS. 22A and 22B.

Next, the whole surface is etched by use of the mask layer 51 through, for example, ion milling so as to pattern the precursory auxiliary pole layers 44AX and 44BX, the precursory non-magnetic layer 43X and the precursory main pole layers 42AX and 42BX. Through etching, regions of the precursory auxiliary pole layers 44AX and 44BX, the precursory non-magnetic layer 43X and the precursory main pole layers 42AX and 42BX except for a portion corresponding to the mask layer 51 are selectively removed so as to form precursory auxiliary pole layer patterns 44AY and 44BY and the non-magnetic layer 43, and the main pole layer 42 comprising the laminate including the bottom main pole layer 42A having the front end portion 42A1 and the rear end portion 42A2, and the top main pole layer 42B having the front end portion 42B1 and the rear end portion 42B2 in this order as shown in FIGS. 23A, 23B and 27. Further, through etching, the mask layer 51 is also etched, thereby, the thickness thereof is reduced. When the bottom main pole layer 42A and the top main pole layer 42B are formed, the mask layer 51 may be remained or may not be remained (refer to FIGS. 23A, 23B and 27). Herein, the precursory auxiliary pole layer pattern 44BY corresponds to a specific example of "a first precursory auxiliary pole layer pattern" in the invention, and the precursory auxiliary pole layer pattern 44AY corresponds to a specific example of "a second precursory auxiliary pole layer pattern" in the invention.

Figures 24A, 24B:
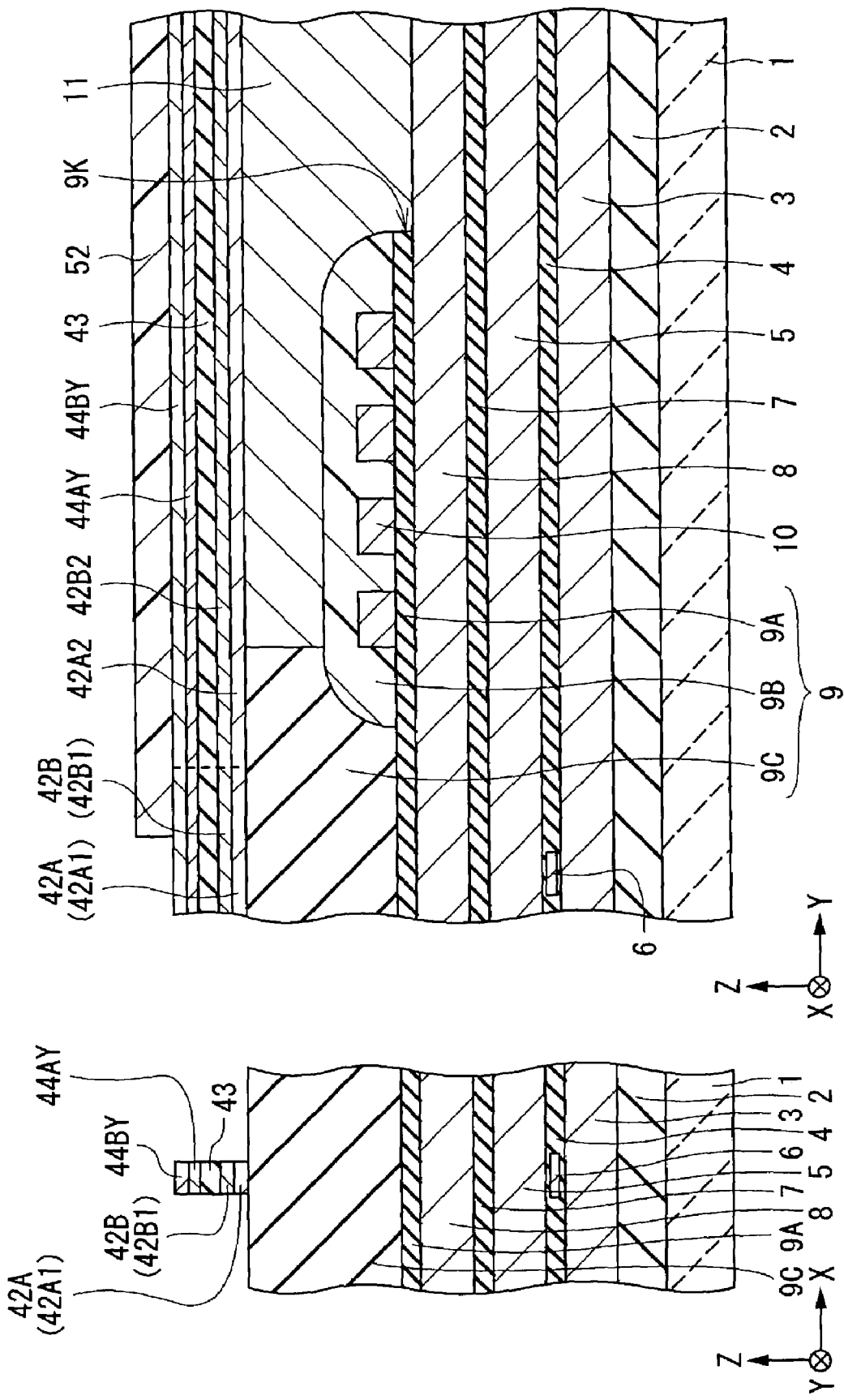
FIGS. 24A and 24B are sectional views for describing a step following the step of FIGS. 23A and 23B.

Then, as shown in FIGS. 24A, 24B and 28, a mask layer 52 for etching made of a photoresist film is selectively formed through photolithography so as to coat regions of the precursory auxiliary pole layer patterns 44AY and 44BY except for the front end portions thereof. When the mask layer 52 is formed, a front end of the mask layer 52 is aligned to a position capable of being recessed by the recessed distance L (=approximately 0.2 µm to 1.0 µm) from the air bearing surface 20 based on a position where the air bearing surface 20 (refer to FIGS. 19A, 19B and 21) is formed in a later step. Herein, the mask layer 52 corresponds to a specific example of "a second mask layer" in the invention.

Next, the whole surface is etched by use of the mask layer 52 through, for example, ion milling so as to pattern the precursory auxiliary pole layer patterns 44AY and 44BY. Through etching, portions of the precursory auxiliary pole layer patterns 44AY and 44BY which are not coated by the mask layer 52 are selectively removed, thereby, as shown in FIGS. 25A, 25B and 20, the auxiliary pole layer 44 is formed so as to comprise the laminate including the bottom auxiliary pole layer 44A having the front end portion 44A1 and the rear end portion 44A2 and the top auxiliary pole layer 44B having the front end portion 44B1 and the rear end portion 44B2 in this order. Further, when the bottom auxiliary pole layer 44A and the top auxiliary pole layer 44B are formed, the non-magnetic layer 43 functions as a stopper layer for etching, so a region of the non-magnetic layer 43 except for a portion corresponding to the mask layer 52 is selectively dug down in partway.

Finally, the whole surface is etched by use of the mask layer 52 through, for example, RIE. Through etching, as shown in FIGS. 25A, 25B and 20, the gap layer portion 9C in the neighborhood of the front end portions 42A1 and 42B1 in a region frontward of the flare point FP is selectively dug down. Thereby, a laminate including the main pole layer 42 (the bottom main pole layer 42A and the top main pole layer 42B), the non-magnetic layer 43 and the auxiliary pole layer 44 (the bottom auxiliary pole layer 44A and the top auxiliary pole layer 44B) is completed. Further, as described in the first embodiment, in actuality, the main pole layer 42, the non-magnetic layer 43 and the auxiliary pole layer 44 are completed through forming the air bearing surface 20.

As described above, in the method of manufacturing the thin film magnetic head according the embodiment, as a technique for forming the main pole layer 42 comprising a laminate including the bottom main pole layer 42A with the first saturated magnetic flux density J1 and the top main pole layer 42B with the second saturated magnetic flux density J2 larger than the first saturated magnetic flux density J1, only the existing thin film processes are used, so as in the case of the first embodiment, the thin film magnetic head according to the embodiment which has a characteristic structure mainly in the main pole layer 42 and is capable of reducing expansion and bending of the recording pattern resulting from the skew can be easily manufactured.

Functions, effects, modifications or the like in the thin film magnetic head and the method of manufacturing the same according to the embodiment except for those described above are equivalent to those in the first embodiment.

[Third Embodiment]

Next, a third embodiment of the invention will be described below.

Figures 29A, 29B:
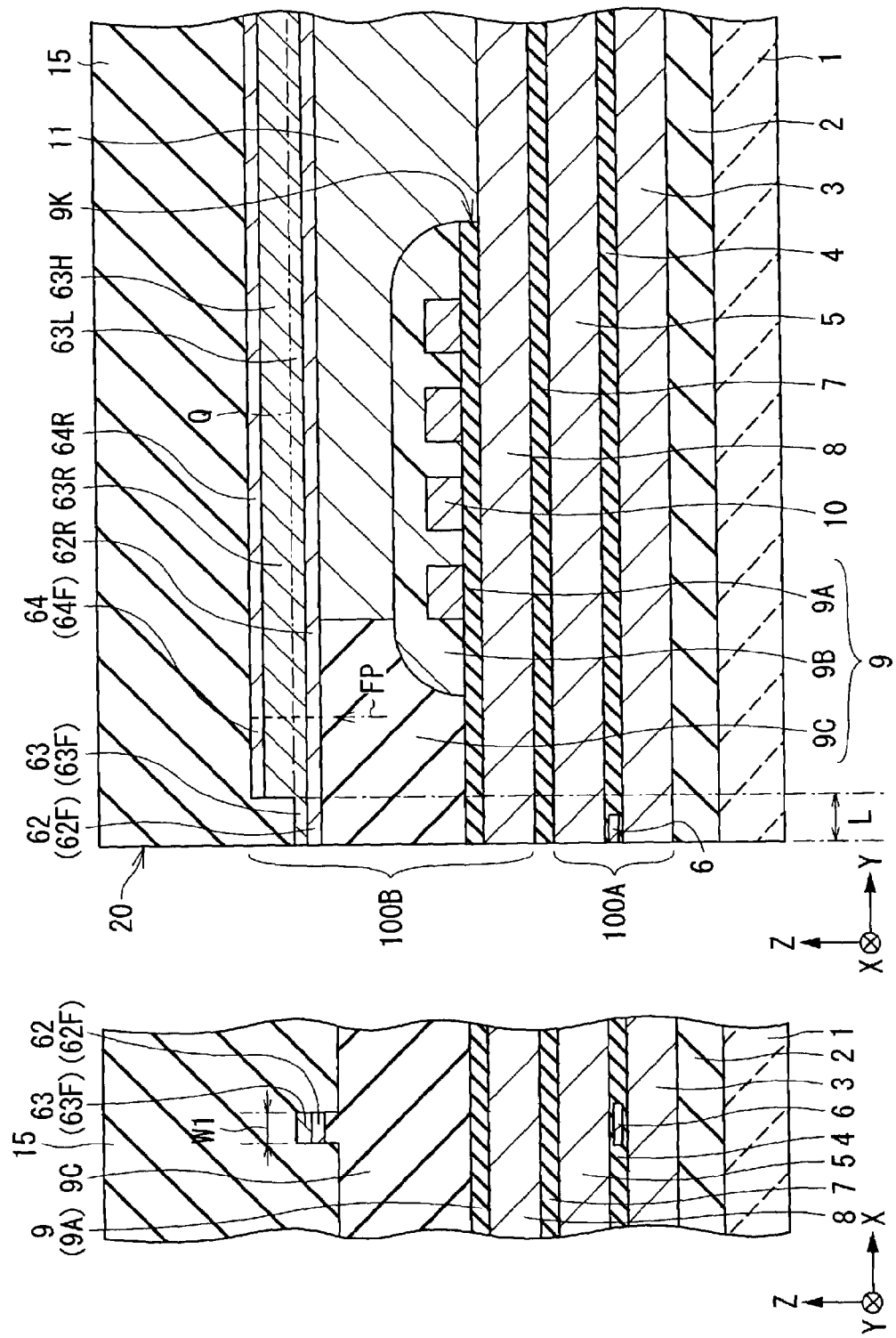
FIGS. 29A and 29B are sectional views of a thin film magnetic head according to a third embodiment of the invention.
Figure 30:
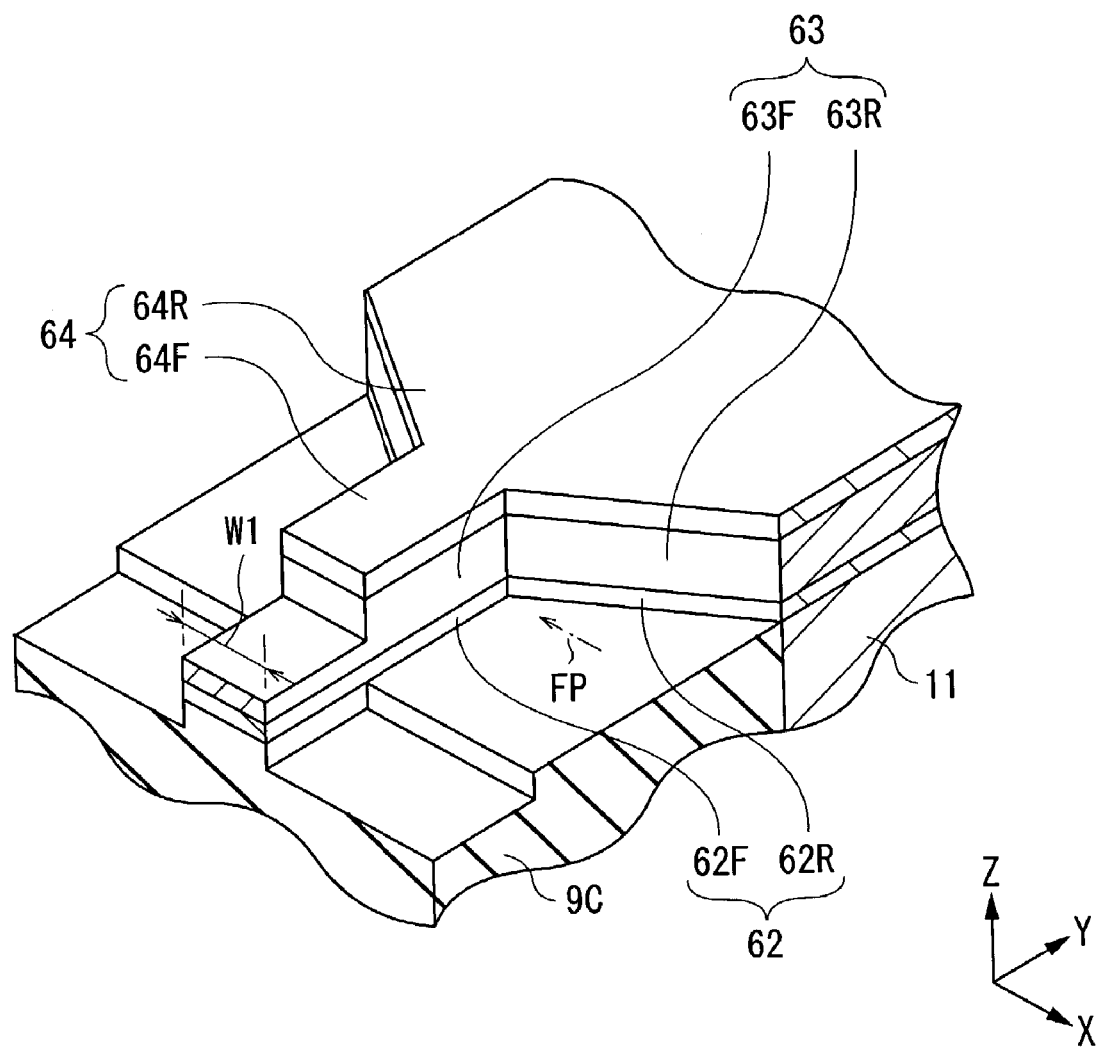
FIG. 30 is an enlarged perspective view of a main part of the thin film magnetic head shown in FIGS. 29A and 29B.

FIGS. 29A and 29B show sectional views of a thin film magnetic head according to the embodiment. FIG. 29A shows a sectional view parallel to the air bearing surface, and FIG. 29B shows a sectional view perpendicular to the air bearing surface. FIG. 30 shows an enlarged perspective view of a main part of the thin film magnetic head shown in FIGS. 29A and 29B.

The thin film magnetic head has a structure equivalent to that of the second embodiment except that the recording head 100B comprises a laminate including a bottom main pole layer 62, a middle pole layer 63 and a top auxiliary pole layer 64 instead of the laminate including the main pole layer 42 (the bottom main pole layer 42A and the top main pole layer 42B), the non-magnetic layer 43 and the auxiliary pole layer 44 (the bottom auxiliary pole layer 44A and the top auxiliary pole layer 44B) described in the second embodiment. Herein, a laminate including the bottom main pole layer 62, the non-magnetic layer 63 and the top auxiliary pole layer 64 in this order corresponds to a specific example of "a pole layer" in the invention.

The bottom main pole layer 62 corresponds to the bottom main pole layer 42A in the second embodiment. The bottom main pole layer 62 is made of the same material as that of the bottom main pole layer 42A (a material with the first saturated magnetic flux density J1), and has the same structure as that of the bottom main pole layer 42A. The bottom main pole layer 62 includes a front end portion 62F with the uniform width W1 and a rear end portion 62R with the width W2 larger than that of the front end portion 62F.

The middle pole layer 63 corresponds to an aggregate of the top main pole layer 42B and the bottom auxiliary pole layer 44A in the second embodiment, that is, the top main pole layer 42B and the bottom auxiliary pole layer 44A which are integrally formed of the same material. The middle pole layer 63 is made of the same material as those of the top main pole layer 42B and the bottom auxiliary pole layer 44A (a material with the second saturated magnetic flux density J2), and has the same structure as those of the top main pole layer 42B and the bottom auxiliary pole layer 44A. The middle pole layer 63 includes a front end portion 63F (with the width W1) and a rear end portion 63R (with the width W2) in order from the air bearing surface 20. The thickness of the front end portion 63F is changed around a position recessed by the recessed distance L from the air bearing surface 20. In other words, a front portion of the front end portion 63F is thinner than a rear portion thereof. The rear portion of the front end portion 63F has the same thickness as that of the rear end portion 63R. The flare point FP is determined by a front edge of the rear end portion 63R.

As a specific corresponding relationship among the above-described middle pole layer 63, the top main pole layer 42B and the bottom auxiliary pole layer 44A, as shown in FIGS. 29A and 29B, a portion of the middle pole layer 63 below a position of a surface of the front portion of the front end portion 63F, that is, a portion below a dashed line Q indicated in the middle pole layer 63 (a lower portion 63L) corresponds to the top main pole layer 42B, and a portion above the position of the surface of the front portion of the front end portion 63F, that is, a portion above the dashed line Q (a higher portion 63H) corresponds to the bottom auxiliary pole layer 44A.

The top auxiliary pole layer 64 corresponds to the top auxiliary pole layer 44B in the second embodiment, and extends rearward from a position recessed by the recessed distance L from the air bearing surface 20. The top auxiliary pole layer 64 is made of the same material as that of the top auxiliary pole layer 44B (a material with the third saturated magnetic flux density J3), and has the same structure as that of the top auxiliary pole layer 44B. The top auxiliary pole layer 64 includes a front end portion 64F (with the width W1) and a rear end portion 64R (with the width W2) in order from the air bearing surface 20.

Herein, the bottom main pole layer 62 corresponds to a specific example of "a first main pole layer portion" in the invention, and the top auxiliary pole layer 64 corresponds to a specific example of "a first auxiliary pole layer portion" in the invention. Further, the lower portion 63L of the middle pole layer 63 corresponds to a specific example of "a second main pole layer portion" in the invention, and the higher portion 63H corresponds to a specific example of "a second auxiliary pole layer portion" in the invention, and an aggregate of the front end portion 63F and the front end portion 62F corresponds to a specific example of "a uniform width portion" in the invention. In addition, an aggregate of the bottom main pole layer 62 and the lower portion 63L of the middle pole layer 63 corresponds to a specific example of "a main pole layer" in the invention, and an aggregate of the top auxiliary pole layer 64 and the higher portion 63H of the middle pole layer 63 corresponds to a specific example of "an auxiliary pole layer" in the invention.

In the thin film magnetic head, the same recording action as that in the second embodiment is performed. In other words, When magnetic flux generated in the thin film coil 10 is contained in the bottom main pole layer 62, the middle pole layer 63 and the top auxiliary pole layer 64, magnetic flux saturation occurs in the bottom main pole layer 62 and the top auxiliary pole layer 64 which have a smaller saturated magnetic flux density, however, no magnetic flux saturation occurs in the middle pole layer 63 with a larger saturated magnetic flux density, so the magnetic flux flows mainly in the middle pole layer 63, and the magnetic flux flows into a front portion of the middle pole layer 63. The magnetic flux flowing into the front portion of the middle pole layer 63 is concentrated mainly on a trailing side portion of the front portion. The magnetic flux is emitted from the trailing side portion of the front portion in the middle pole layer 63 so as to generate a perpendicular magnetic field, so information is recorded on the recording medium by the perpendicular magnetic field.

Figure 35:
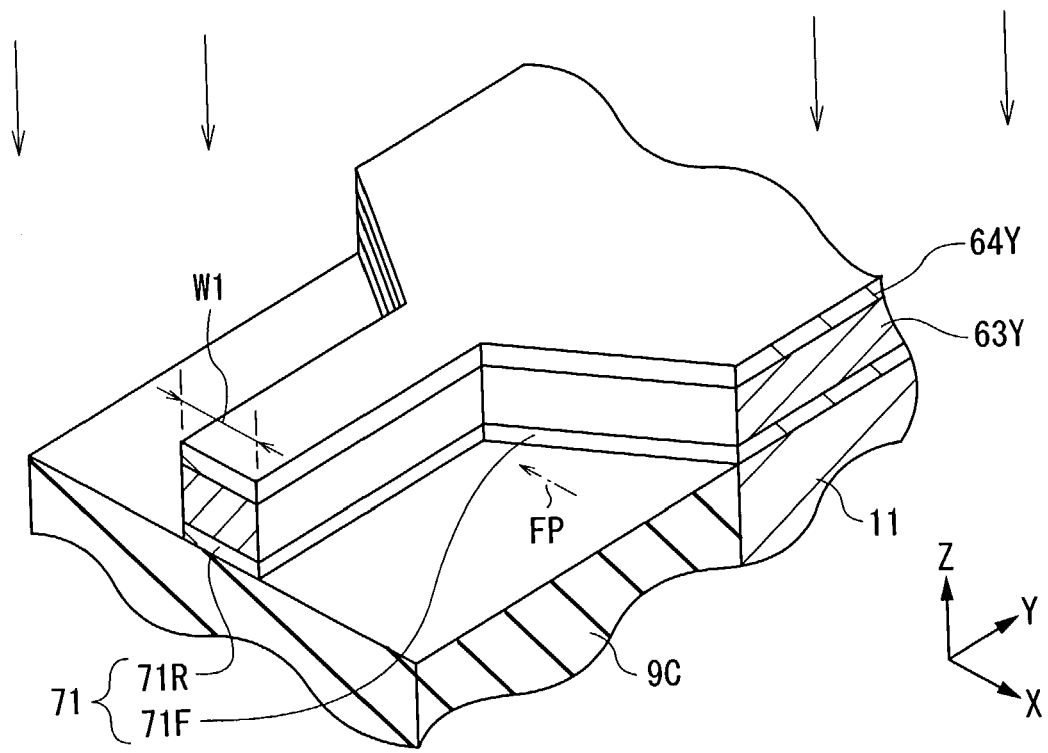
FIG. 35 is a perspective view corresponding to the sectional views shown in FIGS. 32A and 32B.
Figure 36:
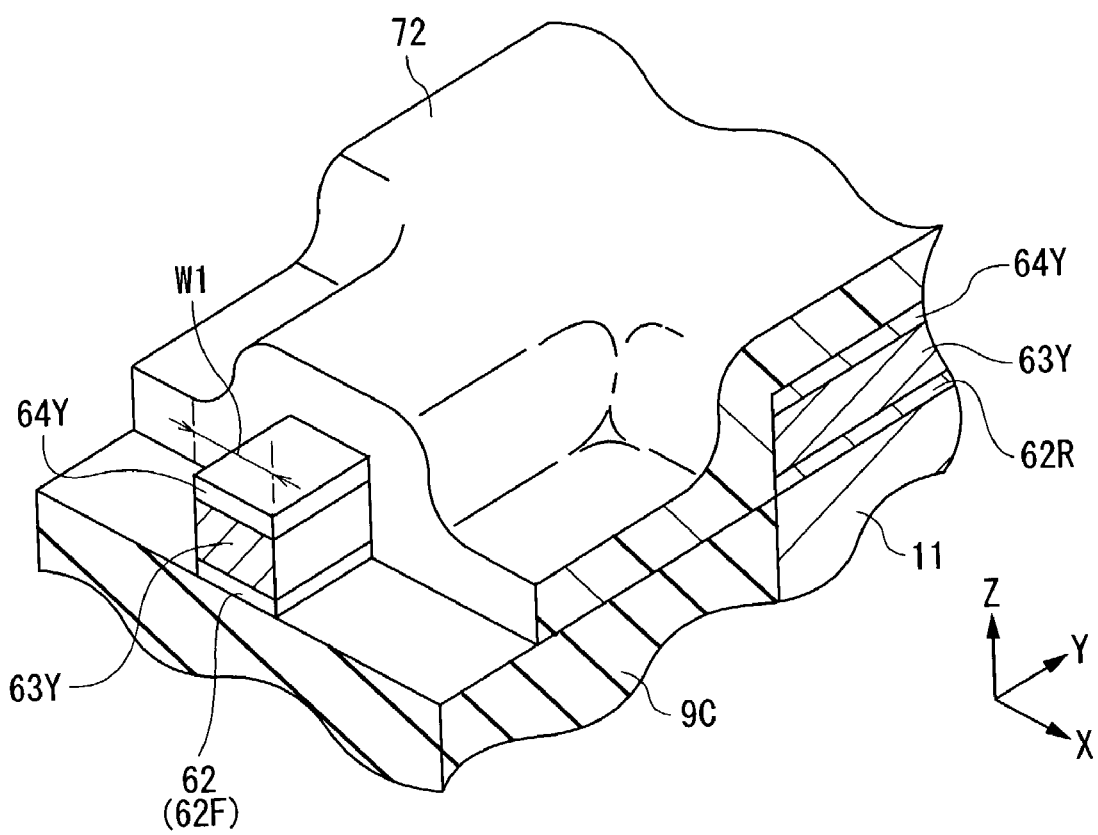
FIG. 36 is a perspective view corresponding to the sectional views shown in FIGS. 33A and 33B.

A main part of the thin film magnetic head, that is, the laminate including the bottom main pole layer 62, the middle pole layer 63 and the top auxiliary pole layer 64 is formed through the following steps. FIGS. 31A through 33B show sectional views of each step in the method of manufacturing the thin film magnetic head, and FIGS. 34 through 36 show perspective views corresponding to FIGS. 31A and 31B through 33A and 33B, respectively.

Figure 34:
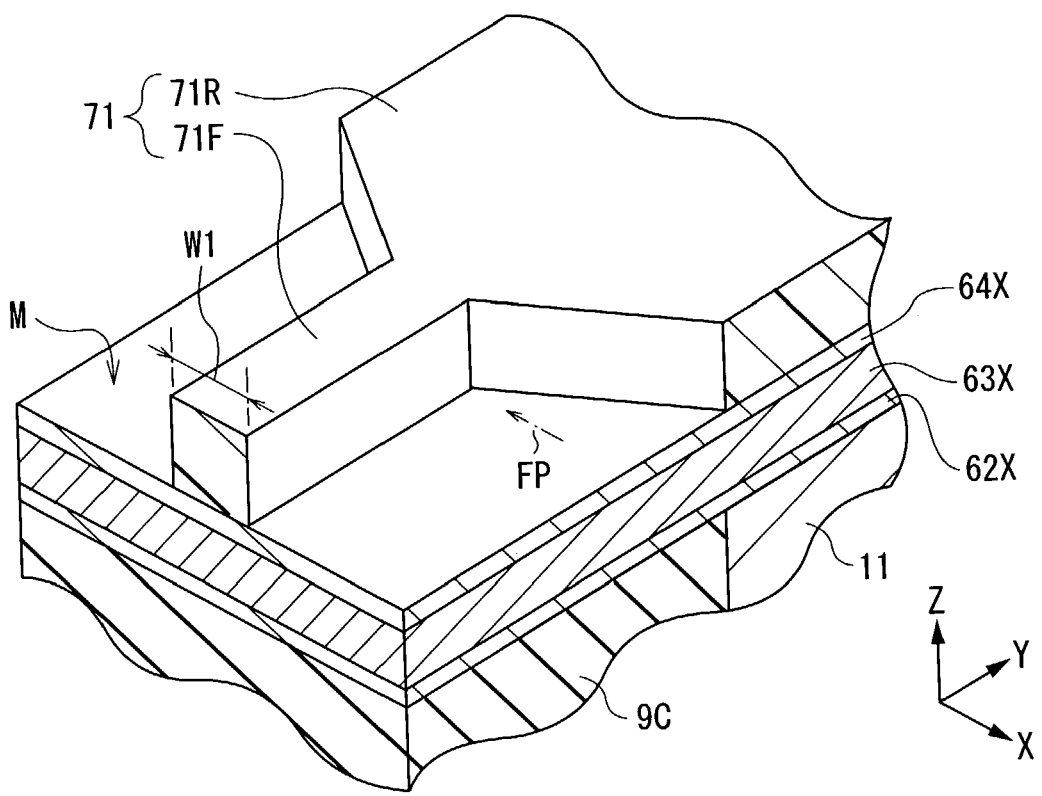
FIG. 34 is a perspective view corresponding to the sectional views shown in FIGS. 31A and 31B.

When the main part of the thin film magnetic head is formed, after the yoke 11 is formed so that the yoke 11 and the gap layer portion 9C constitute the flat surface M, at first, as shown in FIGS. 31A, 31B and 34, a precursory main pole layer 62X, a precursory middle pole layer 63X and a precursory auxiliary pole layer 64X are formed and laminated in this order on the flat surface M through, for example, sputtering. As a material of the precursory main pole layer 62X, a material with the first saturated magnetic flux density J1 (approximately 1.0 T to 1.8 T) is used, and as a material of the precursory auxiliary pole layer 64X, a material with the third saturated magnetic flux density J3 is used. Further, as a material of the precursory middle pole layer 63X, a material with the second saturated magnetic flux density J2 (approximately 2.0 T or over) larger than the first saturated magnetic flux density J1 is used. Herein, the above precursory layers correspond to precursory layers in the invention. More specifically, the precursory main pole layer 62X, the precursory middle pole layer 63X and the precursory auxiliary pole layer 64X correspond to specific examples of "a precursory main pole layer", "a precursory middle pole layer" and "a precursory auxiliary pole layer" in the invention.

Next, after a photoresist film (not shown) is formed on the precursory auxiliary pole layer 64X, the photoresist film is patterned through photolithography so as to selectively form a mask layer 71 for etching as shown in FIGS. 31A, 31B and 34. The mask layer 71 is formed in a pattern shape corresponding to, for example, the plane shape of the bottom main pole layer 62 which is finally formed and including a front portion 71F with the same uniform width W1 as that of the front end portion 62F and a rear portion 71R with a larger width than that of the front portion 71F, and the forming position of the mask layer 71 is adjusted so that a position where the front portion 71F is connected with the rear portion 71R coincides with the flare point FP. Herein, the mask layer 71 corresponds to a specific example of "a first mask layer" in the invention.

Then, the whole surface is etched by use of the mask layer 71 through, for example, ion milling so as to pattern the precursory auxiliary pole layer 64X, the precursory middle pole layer 63X and the precursory main pole layer 62X. Through etching, regions of the precursory auxiliary pole layer 64X, the precursory middle pole layer 63X and the precursory main pole layer 62X except for a portion corresponding to the mask layer 71 are selectively removed so as to form a precursory auxiliary pole layer pattern 64Y and a precursory middle pole layer pattern 63Y as well as the bottom main pole layer 62 including the front end portion 62F and the rear end portion 62R as shown in FIGS. 32A, 32B and 35. The mask layer 71 is also etched through the etching, so the thickness thereof is reduced. When the bottom main pole layer 62 is formed, the mask layer 71 may remain or may not remain (refer to FIGS. 32A, 32B and 35). Herein, the precursory auxiliary pole layer pattern 64Y corresponds to a specific example of "a precursory auxiliary pole layer pattern" in the invention, and the precursory middle pole layer pattern 63Y corresponds to a specific example of "a precursory middle pole layer pattern" in the invention.

Then, as shown in FIGS. 33A, 33B and 36, a mask layer 72 made of a photoresist film is selectively formed through photolithography so as to coat regions of the precursory auxiliary pole layer pattern 64Y and the precursory middle pole layer pattern 63Y except for front end portions thereof. When the mask layer 72 is formed, a front end of the mask layer 72 is aligned to a position capable of being recessed by the recessed distance L (=approximately 0.2 µm to 1.0 µm) from the air bearing surface 20 based on a position where the air bearing surface 20 (refer to FIGS. 29A, 29B and 30) is formed in a later step. Herein, the mask layer 72 corresponds to a specific example of "a second mask layer" in the invention.

Next, the whole surface is etched by use of the mask layer 72 through, for example, ion milling so as to pattern the precursory auxiliary pole layer pattern 64Y. Through etching, a portion of the precursory auxiliary pole layer pattern 64Y which is not coated by the mask layer 72 is selectively removed so as to form the top auxiliary pole layer 64 including the front end portion 64F and the rear end portion 64R as shown in FIGS. 29A, 29B and 30.

Finally, the precursory middle pole layer pattern 63Y is patterned by use of the mask layer 72 through, for example, ion milling so that as shown in FIGS. 29A, 29B and 30, the middle pole layer 63 is formed so as to include the front end portion 63F and the rear end portion 63R, and have a thinner thickness in a front portion of the front end portion 63F than in a rear portion thereof. When the middle pole layer 63 is formed, a region except for the main pole layer 62 in a region frontward of a region where the mask layer 72 is formed is selectively dug down through etching. Thereby, the laminate including the bottom main pole layer 62, the middle pole layer 63 and the auxiliary pole layer 64 is completed. Further, as described in the second embodiment, in actuality, the main pole layer 62, the middle pole layer 63 and the auxiliary pole layer 64 are completed through a step of forming the air bearing surface 20.

As described above, the thin film magnetic head according to the embodiment comprises the laminate including the bottom main pole layer 62 being disposed on the medium-incoming side and having the first saturated magnetic flux density J1 and the middle pole layer 63 being disposed on the medium-outgoing side and having the second saturated magnetic flux density J2 larger than the first saturated magnetic flux density J1 in the neighborhood of the air bearing surface 20, so writing during recording is performed mainly in a front portion of the front end portion 63F in the middle pole layer 63 with a larger saturated magnetic flux density. Therefore, in the embodiment, as in the case of the second embodiment, expansion and bending of the recording pattern resulting from the skew are reduced, so recording performance can be improved.

Moreover, in the embodiment, only the existing thin film processes are used to form the laminate including the bottom main pole layer 62 and the middle pole layer 63, so as in the case of the second embodiment, the thin film magnetic head according to the embodiment which is capable of reducing expansion and bending of the recording pattern resulting from the skew can be easily manufactured.

Further, in the embodiment, the middle pole layer 63 and the top auxiliary pole layer 64 are formed through film formation processing using sputtering and patterning using etching, but it is not necessarily limited to this technique. For example, the middle pole layer 63 and the top auxiliary pole layer 64 may be formed through, for example, plating. In the embodiment, for example, unlike the first embodiment, the non-magnetic layer 13 and the non-magnetic layer pattern 32P which function as stopper layers during etching do not exist, so when the middle pole layer 63 or the top auxiliary pole layer 64 is formed through etching, etching may be excessively performed, thereby a problem such as reduction in thickness may occur. However, when plating instead of etching is used, while a problem such as reduction in thickness resulting from excessive performance of etching can be prevented, the middle pole layer 63 and the top auxiliary pole layer 64 can be formed. Further, when the middle pole layer 63 is formed through plating, the lower portion 63L and the higher portion 63H of the middle pole layer 63 may be integrally formed through a single step, or may be separately formed through separate steps.

The structure, actions, functions, effects and modifications in the thin film magnetic head according to the embodiment except for those described above are equivalent to those in the first and the second embodiments.

Up to this point, descriptions about the thin film magnetic head according to the first, the second and the third embodiments of the invention are completed.

Figure 37:
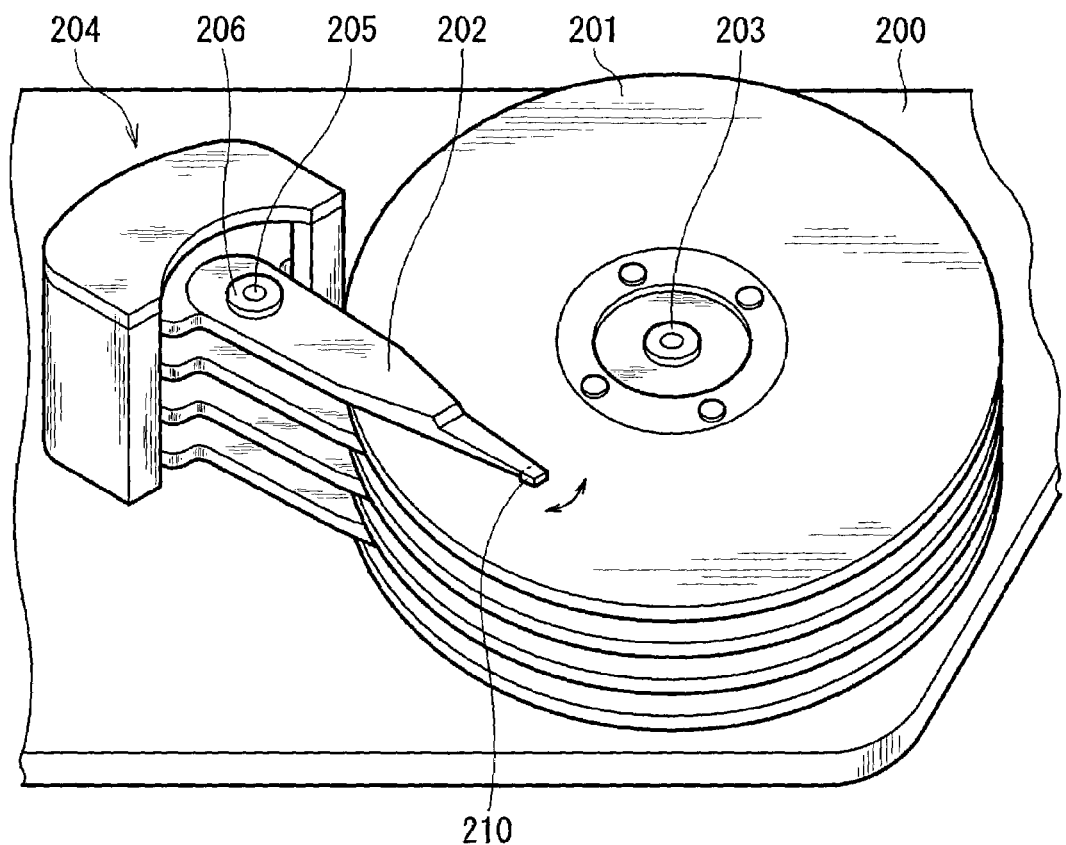
FIG. 37 is a cutaway outline view of a magnetic recording apparatus comprising the thin film magnetic head of the invention.
Figure 38:
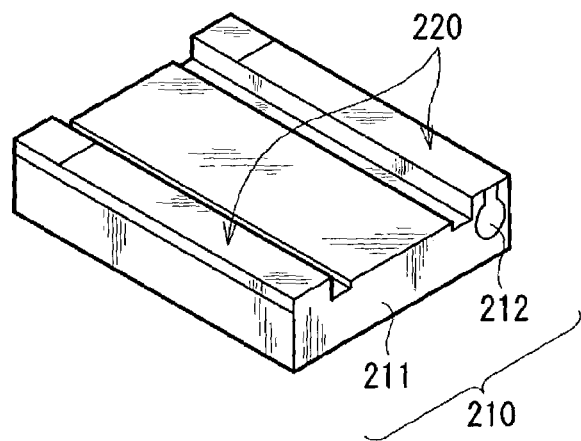
FIG. 38 is an enlarged outline view of a main part of the magnetic recording apparatus shown in FIG. 37.
Figure 39:
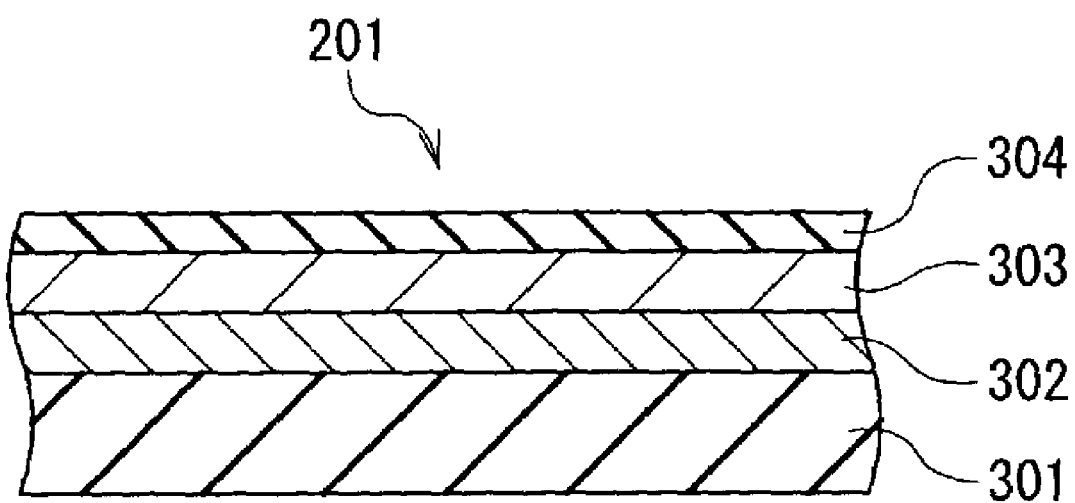
FIG. 39 is a sectional view of a magnetic disk.

Next, referring to FIGS. 37 through 39, a structure of a magnetic recording apparatus comprising the thin film magnetic head described in the first, the second and the third embodiments will be described below. FIG. 37 shows a cutaway outline view of the magnetic recording apparatus, and FIG. 38 shows an enlarged outline view of a main part (head slider) of the magnetic recording apparatus, and further FIG. 39 shows a sectional view of a magnetic disk (recording medium) mounted on a magnetic recording layer. The magnetic recording apparatus comprises the thin film magnetic head with the structure described in the first, the second and the third embodiments, and the magnetic recording apparatus is, for example, a hard disk drive.

The magnetic recording apparatus comprises a plurality of magnetic disks 201 as recording media on which information is recorded and a plurality of arms 202 each of which is disposed so as to correspond to each magnetic disk 201 and has a head slider 210 on an end of the arm 202 in an enclosure 200. The magnetic disks 201 are rotatable around a spindle motor 203 fixed on the enclosure 200 as a center. The arms 202 are connected with a driving portion 204 as a power source, and are pivotable about a fixed axis 205 fixed on the enclosure 200 as a center through a bearing 206. FIG. 37 shows, for example, a model that the plurality of arms 202 integrally pivot about the fixed axis 205 as a center.

The head slider 210 has such a structure that a perpendicular recording system thin film magnetic head 212 is disposed on a side surface perpendicular to an air bearing surface 220 (a surface on a front side in FIG. 38) of a substantially-rectangular-shaped substrate 211 having a groove portion so as to reduce air resistance while the arms 202 pivot. The thin film magnetic head 212 has, for example, the structure described in the first, the second and the third embodiments. In order to easily show a structure of the head slider 210 viewed from a side closer to an air bearing surface 220, FIG. 38 shows the head slider 210 turned upside down from a state of FIG. 37.

The magnetic disk 201 is a recording medium for perpendicular recording having, for example, a main part with a two-layer structure. The magnetic disk 201 comprises, for example, a magnetic flux return layer 302, a recording layer 303 and a cap layer 304 laminated in this order on a circular-plate-shaped substrate disk 301. The magnetic flux return layer 302 forms a flow path where magnetic flux having recorded information on the recording layer 303 returns to the thin film magnetic head 212, and is made of, for example, Permalloy, a cobalt-chromium-zirconium alloy (CoCrZr), an iron-aluminum alloy silicide (FeAlSi) (Sendust) or the like. The recording layer 303 is a layer where the information is magnetically recorded by the magnetic flux emitted from the thin film magnetic head 212, that is, a perpendicular magnetic field, and is made of, for example, a cobalt-chromium-platinum alloy (CoCrPt) or the like. The cap layer 304 is provided to protect the recording layer 303 from its surroundings.

The structure of the thin film magnetic head 212 has been already described in detail in the first, the second and the third embodiments, and will not be further described.

In the magnetic recording apparatus, the arm 202 pivots during recording information so that the head slider 210 moves to a predetermined region (recording region) of the magnetic disk 201. Then, when the thin film magnetic head 212 is electrically conducted in a state of facing the magnetic disk 201, the thin film magnetic head 212 acts as described in the first, the second and the third embodiments so as to record the information on the magnetic disk 201.

In the magnetic recording apparatus, the thin film magnetic head 212 according to the invention is comprised, so as described in the first, the second and the third embodiments, the thin film magnetic head comprising the main pole layer with a characteristic structure is used to perform recording, thereby, expansion and bending of the recording pattern resulting from the skew can be reduced. Therefore, the recording performance can be improved.

Functions, effects, modifications or the like regarding the magnetic recording apparatus except for those described above are equivalent to those in the first, the second and the third embodiments.

The invention is described with reference to some embodiments, but the invention is not limited to these embodiments, and can be variously modified. More specifically, details regarding the structure of the thin film magnetic head, the method of manufacturing the same and the magnetic recording apparatus in the embodiments are not necessarily limited to those described in the embodiments. The thin film magnetic head, the method of manufacturing the same and the magnetic recording apparatus can be freely modified, as long as the main part of the thin film magnetic head which has a main function during recording is configured so as to comprise a laminate including a layer being disposed on the medium-incoming side and having a smaller saturated magnetic flux density and a layer being disposed on the medium-outgoing side and having a larger saturated magnetic flux density, thereby expansion and bending of the recording pattern resulting from the skew can be reduced, and the recording performance can be improved.

Moreover, in the embodiments, the case where the invention is applied to "a single pole type head" is described, but it is not limited to this. For example, the invention may be applied to "a ring-type head".

Further, in the embodiments, the case where the invention is applied to a composite thin film magnetic head is described, but it is not limited to this. The invention is applicable to, for example, a thin film magnetic head for recording only comprising an inductive magnetic transducer for writing or a thin film magnetic head having an inductive magnetic transducer for recording/reproducing. In addition, the invention is applicable to a thin film magnetic head with a structure in which a device for writing and a device for reading are inversely laminated. Further, the invention is applicable to not only the perpendicular recording system thin film magnetic head but also a longitudinal recording system thin film magnetic head.

Moreover, in the embodiments, the case where the thin film magnetic head of the invention is applied to the hard disk drive is described, but it is not necessarily limited to this. For example, the thin film magnetic head is applicable to any other apparatus performing the same recording process as the hard disk drive.

As described above, according to the thin film magnetic head or the method of manufacturing the thin film magnetic head of the invention, the main pole layer comprises a laminate including the first main pole layer portion being disposed on the medium-incoming side and having the first saturated magnetic flux density and the second main pole layer portion being disposed on the medium-outgoing side and having the second saturated magnetic flux density larger than the first saturated magnetic flux density, so when magnetic flux generated in the thin film coil flows in the main pole layer, magnetic flux saturation occurs in the first main pole layer portion with a smaller saturated magnetic flux density, however, no magnetic flux saturation occurs in the second main pole layer portion with a larger saturated magnetic flux density. In this case, the magnetic flux flows in the second main pole layer portion, so writing by the main pole layer is performed mainly by the second main pole layer portion when the skew occurs. Thereby, expansion and bending of the recording pattern can be reduced, compared with the case where the whole main pole layer has a large saturated magnetic flux density, so the recording performance can be improved.

Moreover, the magnetic recording apparatus of the invention comprises the thin film magnetic head of the invention, so recording is performed by use of the thin film magnetic head of the invention comprising the main pole layer with a characteristic structure. Therefore, expansion and bending of the recording pattern resulting from the skew can be reduced, so the recording performance can be improved.

Further, according to the thin film magnetic head or the method of manufacturing the thin film magnetic head of the invention, the pole layer is configured so as to include the auxiliary pole layer on the medium-outgoing side of the main pole layer in a region recessed from the recording-medium-facing surface, so the "main magnetic flux incoming route" where the magnetic flux flows in the main pole layer to a front end of the main pole layer, and the "auxiliary magnetic flux incoming route" where the magnetic flux flows from the auxiliary pole layer to a front end portion of the main pole layer can be obtained. Therefore, compared with the case where only the main pole layer is included and the auxiliary pole layer is not included, an amount of the magnetic flux supplied to a medium-outgoing side (trailing side) portion of the front end portion in the main pole layer increases. Therefore, a sufficient amount of the magnetic flux is supplied to the medium-outgoing side portion of the front end portion in the main pole layer so that an emitting amount of the magnetic flux is increased, and a magnetic field gradient becomes steeper, so a generation intensity of a perpendicular magnetic field can be increased. Further, as the magnetic flux contained in the auxiliary pole layer is supplied to the main pole layer, the magnetic flux flowing in the auxiliary pole layer does not directly contribute to generation of a magnetic field for recording. Therefore, an adverse effect to the recording medium resulting from the existence of the auxiliary pole layer, for example, direct writing to the recording medium by the auxiliary pole layer or the like can be prevented.

Further, according to the thin film magnetic head or the method of manufacturing the thin film magnetic head of the invention, the auxiliary pole layer comprises a laminate including the first auxiliary pole layer portion being disposed on the medium-outgoing side and having the third saturated magnetic flux density and the second auxiliary pole layer portion being disposed on the medium-incoming side and having the fourth saturated magnetic flux density larger than the third saturated magnetic flux density, so an amount of the magnetic flux contained in the second auxiliary pole layer portion of the auxiliary pole layer which functions as a main magnetic flux flow path is increased. Therefore, an amount of the magnetic flux supplied to the main pole layer from the auxiliary pole layer is further increased, and a magnetic field gradient becomes steeper, so direct writing to the recording medium by the auxiliary pole layer can be more effectively prevented.

According to the method of manufacturing the thin film magnetic head of the invention, as a technique for forming the main pole layer, only existing thin film processes including film formation techniques, patterning techniques and etching techniques are used, so the thin film magnetic head of the invention having an advantage in an improvement in the recording performance can be easily manufactured.

Obviously many modifications and variations of the present invention are possible in the light of the above teachings. It is therefore to be understood that within the scope of the appended claims the invention may be practiced otherwise than as specifically described.

What is claimed is:

1. A thin film magnetic head used for a magnetic recording apparatus comprising a recording medium moving to a predetermined direction of medium movement, the thin film magnetic head comprising:

a thin film magnetic coil generating magnetic flux; and
a pole layer emitting the magnetic flux generated in the thin film coil to the recording medium,
wherein the pole layer comprises a main pole layer having an end surface exposed to a recording-medium-facing surface facing the recording medium, and a uniform width portion determining a recording track width of the recording medium, and
the main pole layer comprises a laminate including a first main pole layer portion being disposed on a medium-incoming side in the direction of medium movement and having a first saturated magnetic flux density, and a second main pole layer portion being disposed on a medium-outgoing side in the direction of medium movement and having a second saturated magnetic flux density larger than the first saturated magnetic flux density.

2. A thin film magnetic head according to claim 1, wherein the first saturated magnetic flux density is from 1.0 Tesla to 1.8 Tesla inclusive, and the second saturated magnetic flux density is 2.0 or over.

3. A thin film magnetic head according to claim 1, wherein the pole layer further comprises an auxiliary pole layer being disposed on a medium-outgoing side of the main pole layer in a region recessed from the recording-medium-facing surface.

4. A thin film magnetic head according to claim 3, wherein the auxiliary pole layer has the second saturated magnetic flux density as a whole.

5. A thin film magnetic head according to claim 3, wherein the auxiliary pole layer comprises a laminate including a first auxiliary pole layer portion being disposed on the medium-outgoing side and having a third saturated magnetic flux density, and a second auxiliary pole layer portion being disposed on the medium-incoming side and having a fourth saturated magnetic flux density larger than the third saturated magnetic flux density.

6. A thin film magnetic head according to claim 5, wherein the fourth saturated magnetic flux density is larger than the first saturated magnetic flux density.

7. A thin film magnetic head according to claim 3, wherein the auxiliary pole layer is disposed adjacent to the main pole layer.

8. A thin film magnetic head according to claim 7, wherein the auxiliary pole layer comprises a laminate including a first auxiliary pole layer portion being disposed on the medium-outgoing side and having a third saturated magnetic flux density, and a second auxiliary pole layer portion being disposed on the medium-incoming side and having a fourth saturated magnetic flux density larger than the third saturated magnetic flux density; and
the second auxiliary pole layer portion is made of the same material as that of the second main pole layer portion so as to be integrally formed.

9. A thin film magnetic head according to claim 3, wherein the auxiliary pole layer comprises a laminate including a first auxiliary pole layer portion being disposed on the medium-outgoing side and having a third saturated magnetic flux density, and a second auxiliary pole layer portion being disposed on the medium-incoming side and having a fourth saturated magnetic flux density larger than the third saturated magnetic flux density; and
the pole layer further comprises a non-magnetic layer being disposed between the second main pole layer portion and the second auxiliary pole layer portion so as to separate the portions from each other.

10. A thin film magnetic head according to claim 9, wherein
the fourth saturated magnetic flux density is equal to the second saturated magnetic flux density.

11. A thin film magnetic head according to claim 1, wherein
the pole layer is configured so as to emit magnetic flux for magnetizing the recording medium in a direction perpendicular to a surface of the recording medium.

12. A magnetic recording apparatus, comprising:
a recording medium; and
a thin film magnetic head magnetically recording information on the recording medium, the thin film magnetic head comprising a thin film coil generating magnetic flux, and a pole layer emitting the magnetic flux generated in the thin film coil to the recording medium,
wherein the pole layer comprises a main pole layer having an end surface exposed to a recording-medium-facing surface facing the recording medium, and a uniform width portion determining a recording track width of the recording medium, and
the main pole layer comprises a laminate including a first main pole layer portion being disposed on a medium-incoming side in a direction of medium movement and having a first saturated magnetic flux density, and a second main pole layer portion being disposed on a medium-outgoing side in the direction of medium movement and having a second saturated magnetic flux density larger than the first saturated magnetic flux density.

13. A magnetic recording apparatus according to claim 12, wherein
the pole layer is configured so as to emit magnetic flux for magnetizing the recording medium in a direction perpendicular to a surface of the recording medium.

14. A magnetic recording apparatus according to claim 13, wherein
the recording medium includes a recording layer where information is recorded by the magnetic flux emitted from the pole layer, and a magnetic flux return layer functioning as a flow path where the magnetic flux having recorded information on the recording layer returns to the pole layer.

* * * * *